United States Patent
Horikoshi et al.

(10) Patent No.: US 9,667,350 B2
(45) Date of Patent: May 30, 2017

(54) OPTICAL RECEIVING DEVICE AND PHASE CYCLE REDUCTION METHOD

(71) Applicant: NIPPON TELEGRAPH AND TELEPHONE CORPORATION, Tokyo (JP)

(72) Inventors: Kengo Horikoshi, Yokosuka (JP);
Kohki Shibahara, Yokosuka (JP);
Etsushi Yamazaki, Yokosuka (JP);
Mitsuteru Yoshida, Yokosuka (JP);
Koichi Ishihara, Yokosuka (JP);
Takayuki Kobayashi, Yokosuka (JP);
Yoshiaki Kisaka, Yokosuka (JP);
Takuya Ohara, Yokosuka (JP);
Masahito Tomizawa, Yokosuka (JP);
Tomoyoshi Kataoka, Yokosuka (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 0 days.

(21) Appl. No.: 14/758,941

(22) PCT Filed: Jan. 24, 2014

(86) PCT No.: PCT/JP2014/051501
§ 371 (c)(1),
(2) Date: Jul. 1, 2015

(87) PCT Pub. No.: WO2014/115840
PCT Pub. Date: Jul. 31, 2014

(65) Prior Publication Data
US 2015/0333838 A1 Nov. 19, 2015

(30) Foreign Application Priority Data

Jan. 25, 2013 (JP) .................... 2013-012403
Feb. 26, 2013 (JP) .................... 2013-036126

(51) Int. Cl.
*H04B 10/60* (2013.01)
*H04B 10/61* (2013.01)
(Continued)

(52) U.S. Cl.
CPC ....... *H04B 10/6165* (2013.01); *H04L 7/0041* (2013.01); *H04L 7/0075* (2013.01); *H04L 27/066* (2013.01); *H04L 27/389* (2013.01)

(58) Field of Classification Search
None
See application file for complete search history.

(56) References Cited

U.S. PATENT DOCUMENTS 8,311,417 B1  11/2012 Poggiolini et al.
8,331,805 B2  12/2012 Nakashima et al.
(Continued)

FOREIGN PATENT DOCUMENTS

CN  102439877 A  5/2012
CN  102820929 A  12/2012
(Continued)

OTHER PUBLICATIONS

Notice of Allowance, Japanese Patent Application No. 2014-558630, Feb. 9, 2016.
(Continued)

*Primary Examiner* — Tesfaldet Bocure
(74) *Attorney, Agent, or Firm* — Harness, Dickey & Pierce P.L.C.

(57) ABSTRACT

The optical receiving device with phase compensation apparatus uses coherent opto-electric conversion and is designed for receiving phase- or quadrature-amplitude-modulated optical signals. The phase compensation apparatus includes following elements: a carrier-phase estimation unit that estimates carrier phase errors in a received symbol string; a gain adjustment unit that adjusts weighting of each symbols
(Continued)

in phase error evaluation performed in the carrier-phase adjustment unit; a phase-cycle-slip reduction unit with a phase-cycle-slip detector using statistical processing performed on the output symbols from the carrier-phase estimation unit; and a phase compensation circuit that compensates carrier phase errors of the received signal using an output from the carrier phase estimation unit.

15 Claims, 36 Drawing Sheets

(51) Int. Cl.
*H04L 27/06* (2006.01)
*H04L 27/38* (2006.01)
*H04L 7/00* (2006.01)

(56) References Cited

U.S. PATENT DOCUMENTS

| | | | |
|---|---|---|---|
| 9,112,615 B1* | 8/2015 | Thesling | H04B 10/6165 |
| 2005/0123073 A1* | 6/2005 | Ginesi | H04L 27/0014 |
| | | | 375/326 |
| 2010/0138722 A1 | 6/2010 | Harley et al. | |
| 2014/0204992 A1* | 7/2014 | Jacobsen | H04L 25/03057 |
| | | | 375/233 |
| 2014/0219666 A1* | 8/2014 | Tselniker | H04L 25/03019 |
| | | | 398/208 |
| 2015/0365174 A1* | 12/2015 | Nazarathy | H04L 25/03019 |
| | | | 398/209 |

FOREIGN PATENT DOCUMENTS

| | | |
|---|---|---|
| CN | 102859908 A | 1/2013 |
| JP | 2008-278249 A | 11/2008 |
| JP | 2011-166597 A | 8/2011 |
| WO | WO-2012/111847 A1 | 8/2012 |
| WO | WO-2012/132103 A1 | 10/2012 |

OTHER PUBLICATIONS

A. J. Viterbi, A. M. Viterbi "Nonlinear Estimation of PSK-Modulated Carrier Phase with Application to Burst Digital Transmission," IEEE Trans. on Info. Theory, vol. IT-29, Jul. 1983.
T. Kobayashi et al, "160-Gb/s Polarization—Multiplexed 16-QAM long-haul transmission over 3,123 km using digital coherent receiver with digital PLL based frequency offset compensator", OTuD1 OFC/NFOEC2010.
Kazuyoshi Itoh, Applied Optics, vol. 21, No. 14, Jul. 15, 1982.
Kuschnerov. M. et al., DSP for Coherent Single-Carrier Receivers, Journal of Lightwave Technology, vol. 27, No. 16, pp. 3614-3622, 2009.
International Search Report for PCT/JP2014/051501, mailed Mar. 4, 2014.
Michael G. Taylor, Phase Estimation Methods for Optical Coherent Detection Using Digital Signal Processing, Journal of Lightwave Technology, vol. 27, pp. 901-914, 2009.
Mario A Castrillon et al: "A new cycle slip compensation technique for ultra high speed coherent optical communications", Photonics Conference (IPC), 2012 IEEE, IEEE, Sep. 23, 2012, pp. 175-176.
Robert Maher et al: "Widely Tunable Burst Mode Digital Coherent Receiver With Fast Reconfiguration Time for 112 Gb/s DP-QPSK WDM Networks", Journal of Lightwave Technology, IEEE Service Center, New York, NY, US, vol. 30, No. 24, Dec. 1, 2012, pp. 3924-3930.
CN Office Action for CN 201480005832.0, mailed Sep. 2, 2016, with partial translation of search report.
EP Search Report for EP14742856.9, mailed Sep. 28, 2016.

* cited by examiner (WHEN AVERAGE LENGTH K = 4)

OPTICAL RECEIVING DEVICE AND PHASE CYCLE REDUCTION METHOD

TECHNICAL FIELD

The present invention relates to a communication system, and to a technology that reduces the occurrence of cycle slips in a carrier synchronous circuit.

Priority is claimed on Japanese Patent Applications Nos. 2013-12403, filed Jan. 25, 2013, and 2013-36126 filed Feb. 26, 2013, the contents of which are incorporated herein by reference.

BACKGROUND ART

In a trunk optical transmission system there is a need to store high-speed client signals economically, and transmit huge volumes of information. As part of the process to achieve this objective, from the standpoint of improving the frequency utilization efficiency, a digital coherent transmission method which employs a combination of coherent detection and digital signal processing is being investigated, and it is anticipated that it will be possible to achieve high-speed, high-volume information transmissions by means of wavelength division multiplexing using the aforementioned transmission method. In this transmission method, carrier phase synchronization is established via digital signal processing. In consideration of the circuit scale and modulation format, various types of algorithms and packaging methods are being investigated for the structure of the carrier phase synchronization circuit (CPR: Carrier Phase Recovery).

In contrast, in an optical transmission system in which coherent detection is utilized, because amplitude and amplitude information are used, such a system is conspicuously affected by phase noise (i.e., noise in the phase direction). Main sources of such phase noise include phase noise arising from the line width of the lasers used in the transmission and receiving terminals, frequency offset caused by the frequency of the lasers used in the transmission and receiving terminals, and phase noise arising from a non-linear optical effect. For example, the Viterbi-Viterbi algorithm (see Non-patent document 1) is one algorithm for performing carrier phase synchronization blindly on the receiving side.

FIG. 38 is a block diagram showing the structure of a carrier phase synchronization circuit (CPR) that utilizes the Viterbi-Viterbi algorithm. Here, a description is given of when QPSK (Quadrature Phase Shift Keying) is used as the modulation format. In this case, M corresponds to 4. The input symbols are shown as complex values having an in-phase component I and a quadrature component Q.

This CPR is formed by a carrier phase estimation unit 150 and a carrier phase compensation unit 160. The carrier phase estimation unit 150 is formed by an M-power circuit 151, an averaging circuit 152, an angle calculation circuit 153, an unwrapping circuit (not shown), a divider circuit 154, and a complex number calculation circuit 155. The carrier phase compensation unit 160 is provided with a delay circuit 161 and a multiplier circuit 162.

The input symbols that are input sequentially into the CPR are shown by the following Formula (1).

[Formula 1]

$$r_k = A_k \exp(j\theta_k + \phi_k) + w_k \qquad (1)$$

Here, k is the time, $s_k = A_k \exp(j\theta_k)$ is the transmission symbol, wk is the additive noise, and $\phi_k$ is the phase noise.

In the Viterbi-Viterbi algorithm, by assuming an M-PSK (M-ary Phase Shift Keying) for the modulation technique, the fact that $A_k$ is constant and $\theta_k$ is expressed as $2\pi mk/M$ is utilized. Note that mk is an integer between 0 and M−1.

The input symbol $r_k$ is input into the M-power circuit 151 and the delay circuit 161. The M-power circuit 151 raises the input symbol to the M-th power. As a result of this M-power operation on the input symbol, when $w_k \approx 0$, the output is as is shown in Formula (2).

(Formula 2)

$$\begin{aligned} r_k^M &= A_k^M \exp(jM\theta_k + jM\phi_k) \\ &= A_k^M \exp(j2\pi m_k + jM\phi_k) \\ &= A_k^M \exp(jM\phi_k) \end{aligned} \qquad (2)$$

In actual fact, because $w_k \neq 0$, the output from the M-power circuit 151 is input into the averaging circuit 152, and the effects of noise are reduced. The averaging circuit 152 obtains an average, for example, by adding up the M-power values of the input symbols calculated by the M-power circuit 151 on a complex plane for every L number of averaged window widths which include the M-power values of the previous and subsequent input symbols, and thereby reduces the noise components. Next, the output from the averaging circuit 152 is input into the angle calculation circuit 153.

The angle calculation circuit 153 calculates the angle of deviation of the symbols (i.e., complex numbers) that have been averaged by the averaging circuit 152. If the noise has been sufficiently reduced by the averaging circuit 152, then the output from the angle calculation circuit 153 is M$\phi$k. In this calculation method, the symbols are converted into an angle by, for example, calculating in-phase components (I) and quadrature components (Q) in the output from the averaging circuit 152, and then calculating the arctan (Q/I). The unwrapping circuit corrects the arbitrariness (360°×n, wherein n is an integer) remaining in the angle calculated by the angle calculation circuit 153. Specifically, the unwrapping circuit corrects the angle such that the difference between the angle for the immediately prior input symbol and the current angle is reduced.

The divider circuit 154 calculates carrier phase estimation values by multiplying by (1/M) the angle that was corrected by the unwrapping circuit. The complex number calculation circuit 155 calculates a size 1 complex number in order to make the carrier phase estimation value calculated by the divider circuit 154 into an angle of deviation, and outputs this to the multiplier circuit 162.

The delay circuit 161 attaches to an input symbol a delay for the time required for the calculations from the M-power circuit 154 to the complex number calculation circuit 155, and outputs the input symbol to the multiplier circuit 162 at the same timing as it outputs the size 1 complex number which corresponds to that particular input symbol. The multiplier circuit 162 multiplies the input symbol to which a delay was attached by the delay circuit 161 by the complex number calculated by the complex number calculation circuit 155, and synchronizes the result with the carrier phase of the input symbol.

PRIOR ART DOCUMENTS

Non-Patent Documents

Non-patent document 1: A. J. Viterbi, A. M. Viterbi "Non-linear Estimation of PSK-Modulated Carrier Phase with Application to Burst Digital Transmission," IEEE Trans. On Info. Theory, vol. IT-29, July 1983.

SUMMARY OF THE INVENTION

Problems to be Solved by the Invention

Because the symbol phase is quadrupled (in the case of QPSK), the carrier phase estimation values estimated using the aforementioned algorithm can only be estimated in a range from 0 degrees to 90 degrees. Consequently, there are four possibilities for the angle where the estimation result will be contained: namely, between 0 degrees and 90 degrees, 90 degrees and 180 degrees, 180 degrees and 270 degrees, and 270 degrees and 360 degrees, and it is not possible to make a correct estimate from among these four possibilities for each input symbol. Even if the correct phase shift amount were already known as an initial value, and it were possible to perform carrier phase estimation continuously for each symbol, if there is a sudden incursion of sizable noise in the phase direction or interference from a non-linear optical effect, then a discontinuity that is not correct for the estimated phase amount is generated. If this type of discontinuity is generated, then it becomes impossible to correctly perform carrier phase estimation for any subsequent input symbols. This phenomenon is known as phase cycle slip.

In order to counter phase cycle slip, for example, a differential coding technique and a correction technique based on pilot symbols are considered to be effective. In a differential coding technique, the phase difference between adjacent symbols is transmitted as an optical phase modulation symbol so that, even if phase cycle slip is generated, the effects thereof can be restricted to the bit errors within the preceding and subsequent symbols. However, if a case in which the differential coding technique is applied is compared to a case in which it is not applied, then the former has the drawback that the bit error rate increases twofold. This drawback has the problem that it raises the signal to noise power ratio of the transmission path that is needed in order to establish trustworthy communication using forward error correction approximately 1.11 to 1.4 dB.

In contrast, the correction technique that is based on pilot symbols is a technique in which a phase cycle slip is detected and corrected by transmitting a known signal pattern. However, if a phase cycle slip is generated, burst errors are generated during the period up until the absolute phase is subsequently synchronized once again using a known signal pattern. If the cycle at which the known signal patterns are inserted is shortened in order to shorten the period during which burst errors are generated, the problem arises that overheads increase and there is a decrease in the transmission efficiency.

The present invention was conceived in view of the above-described circumstances, and it is an object thereof to provide a phase cycle slip reduction system and a phase cycle slip reduction method that make it possible to reduce the frequency of phase cycle slip occurrence without causing the bit error rate to increase or causing any deterioration in the transmission efficiency.

Means for Solving the Problems

In order to achieve the above-described objects, an aspect of the present invention is a phase cycle slip reduction system in which an optical signal that has been created from an electrical signal that has been modulated using phase modulation or quadrature amplitude modulation is received, the received optical signal is converted into an electrical signal using coherent detection, and phase compensation is performed on the received signal that is obtained by converting this electrical signal into a digital signal, the phase cycle slip reduction system comprising: a gain adjustment unit configured to perform gain adjustment using power and multiplication on the amplitude and phase of a symbol input from the CPR; a slip determination unit configured to determine whether or not a phase cycle slip exists using carrier phase estimation values output from a carrier phase estimation unit; and a slip compensation unit configured to compensate the phase cycle slip based on determination results from the phase cycle slip determination unit.

Advantageous Effects of the Invention

According to this invention, even if phase cycle slip does occur, by detecting and compensating this phase cycle slip in a phase cycle slip determination/compensation unit, it is possible to reduce the frequency of phase cycle slip occurrence. Furthermore, by using a gain adjustment circuit to improve the estimation accuracy of carrier phase estimation values created by the carrier phase estimation unit, it is possible to improve the accuracy of the detections of the phase cycle slip determination/compensation unit, and to further reduce the frequency of phase cycle slip occurrence.

As a consequence, because it is possible to accurately predict phases without having to transmit symbols that have undergone prior processing, it is possible to reduce the frequency of phase cycle slip occurrence without increasing the bit error rate or reducing the transmission efficiency.

EMBODIMENTS FOR CARRYING OUT THE INVENTION

Hereinafter, a phase cycle slip reduction system and phase cycle slip reduction method according to embodiments of the present invention will be described with reference made to the drawings.

First Embodiment

Figure 1:
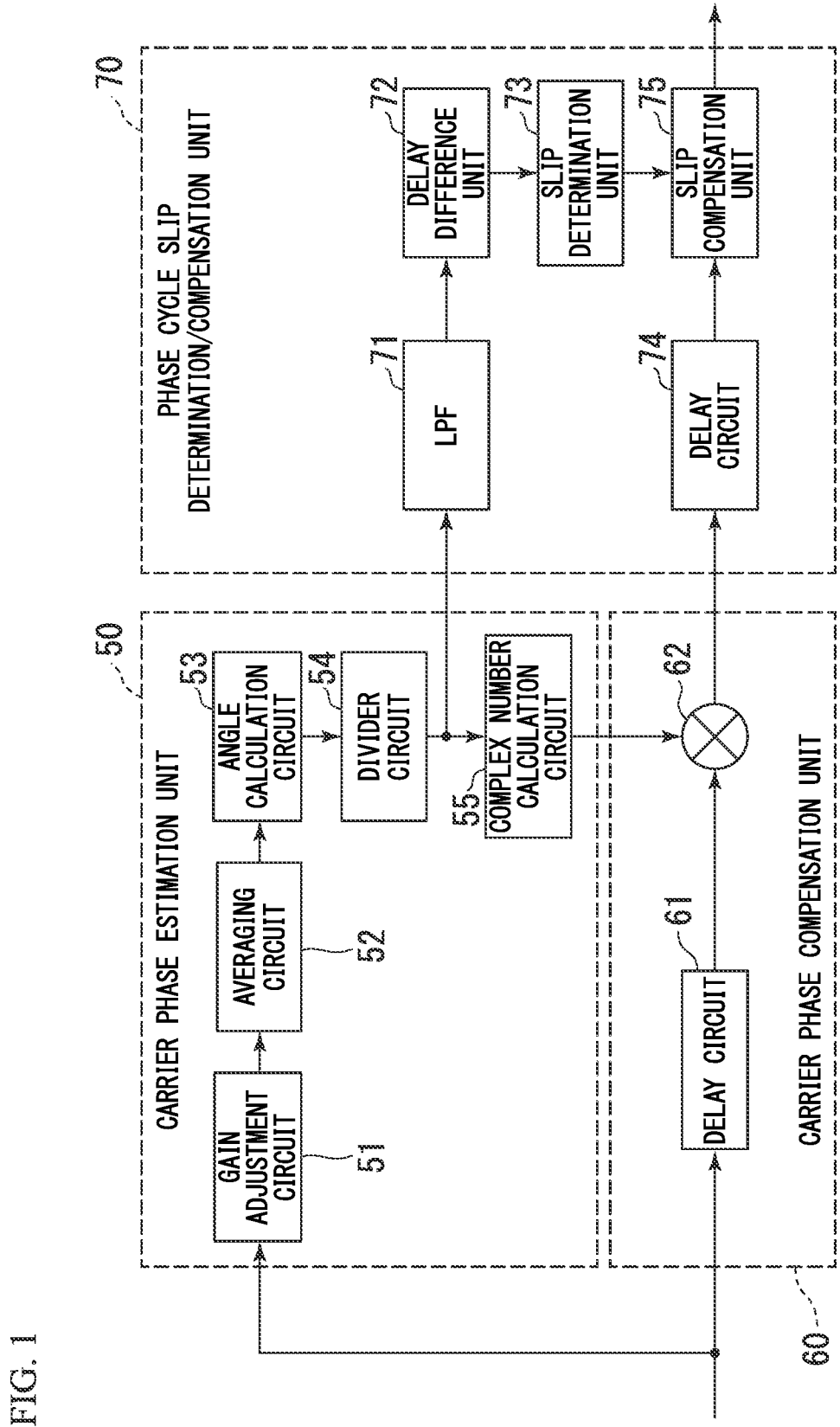
FIG. 1 is a block diagram showing a carrier phase synchronization circuit (CPR) according to a first embodiment of the present invention.

FIG. 1 is a block diagram showing the structures of a carrier phase synchronization circuit (CPR) and a phase cycle slip determination/compensation unit according to embodiments of the present invention.

Symbols input into the CPR are input into both a carrier phase estimation unit 50 and a carrier phase compensation unit 60. In the carrier phase estimation unit 50, the input symbols are input into a gain adjustment circuit 51.

Figure 2:
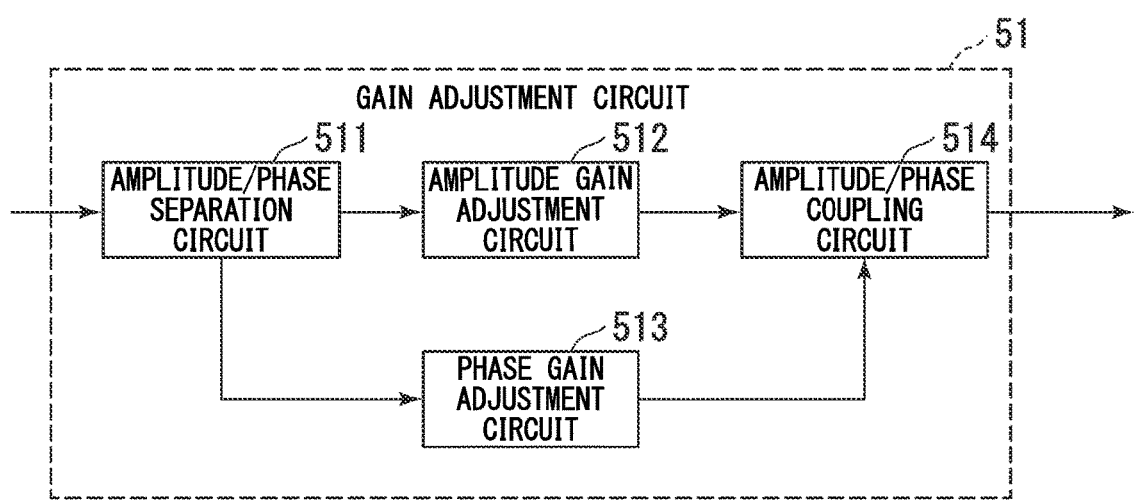
FIG. 2 is a block diagram showing the gain adjustment circuit shown in FIG. 1.

As is shown in FIG. 2, the gain adjustment circuit 51 is formed by an amplitude/phase separation circuit 511 that calculates and separates amplitude values and phase values of input symbols, an amplitude gain adjustment circuit 512 into which the amplitude values separated by the amplitude/phase separation circuit 511 are input, a phase gain adjustment circuit 513 into which the phase values separated by the amplitude/phase separation circuit 511 are input, and an amplitude/phase recombination circuit 514 that recombines the output from the amplitude gain adjustment circuit 512 with the output from the phase gain adjustment circuit 513, and converts the result into a complex number.

For example, in the amplitude gain adjustment circuit 512, the amplitude is raised to the M-th power, and if the phase is multiplied M-times in the phase gain adjustment circuit 513, then the operation becomes equivalent to one performed in the M-power circuit in the CPR to which the Viterbi-Viterbi algorithm has been applied. In this example, by holding, for example, amplitude values in the amplitude gain adjustment circuit 512, and multiplying the phase M-times in the phase gain adjustment circuit 513, the detection accuracy of the phase cycle slip determination/compensation unit 70 (described below) is improved. Namely, the operation of the present example is different from that of the M-power circuit in the CPR to which the Viterbi-Viterbi algorithm has been applied.

Here, the setting values in the gain adjustment circuit 51 are not limited solely to the aforementioned setting values. The setting values for the gain in the amplitude gain adjustment circuit 512 and the phase gain adjustment circuit 513 are set based on the averaged window width of an averaging circuit 52, on the tap length and band width of a low-pass filter (LPF) 71 of a phase cycle slip determination/compensation circuit 70, and on the delay width of a delay difference unit.

The output from the gain adjustment circuit 51 is input into the averaging circuit 52. In the averaging circuit 52, for example, averaging is performed by adding together the symbols calculated by the gain adjustment circuit 51 on a complex plane for every L number of averaged window widths which include the symbols calculated before and after that particular symbol, and the noise components are thereby reduced.

Next, the output from the averaging circuit 52 is input into the angle calculation circuit 53. The angle calculation circuit 53 calculates the angle of deviation of the symbols (i.e., complex numbers) that have been averaged by the averaging circuit 52. If the noise has been sufficiently reduced by the averaging circuit 52, then the output from the angle calculation circuit 53 is $M\phi k$.

In the calculation method performed by the angle calculation circuit 53, the symbols are converted into an angle by, for example, calculating an in-phase component (I) and a quadrature component (Q) in the output from the averaging circuit 52, and then calculating the arctan (Q/I). An unwrapping circuit corrects the arbitrariness (360°×n, wherein n is an integer) remaining in the angle calculated by the angle calculation circuit 53. Specifically, the unwrapping circuit corrects the angle such that the difference between the angle for the immediately prior input symbol and the current angle is reduced.

A divider circuit 54 calculates carrier phase estimation values by multiplying by (1/M) the angle that was corrected by the unwrapping circuit. The complex number calculation circuit 55 calculates a size 1 complex number that changes the carrier phase estimation value calculated by the divider circuit 54 into an angle of deviation, and outputs this to a multiplier circuit 62.

The delay circuit 61 attaches to an input symbol the delay for the length of time required for the operations from the gain adjustment circuit 51 to the complex number calculation circuit 55, and outputs the input symbol to the multiplier circuit 62 at the same timing as it outputs the size 1 complex number which corresponds to that particular input symbol. The multiplier circuit 62 multiplies the input symbol to which a delay was attached by the delay circuit 61 by the complex number calculated by the complex number calculation circuit 55, and synchronizes the result with the carrier phase of the input symbol.

In contrast, the estimation error phase calculated by the divider circuit 54 is input into a delay difference circuit 72 via the LPF 71. The delay difference circuit 72 calculates temporal changes in the estimation error phases. A slip determination unit 73 determines, based on the temporal changes in the estimation error phases calculated by the delay difference unit 72, whether or not a phase cycle slip has been generated in the input signal. There are three types of determination of the phase cycle slip, namely, at 90 degrees, −90 degrees, and 180 degrees, and these can be determined using the polarity and absolute value of the temporal changes.

When it is determined in the slip determination unit 73 that a phase cycle slip has occurred, a slip compensation unit 75 compensates the phase cycle slip in an input signal in which the phase error has been reduced by the carrier phase compensation unit 60.

In this phase cycle slip compensation, in the case of a 90 degree slip determination, 90 degrees is subtracted from the phase estimation values subsequent to the time when the phase cycle slip occurred. In the case of a −90 degree slip determination, 90 degrees is added to the phase estimation values. In the case of a 180 degree slip determination, 180 degrees is added to (or subtracted from) the phase estimation values.

The slip compensation unit 75 outputs as output signals the signals obtained when it performs phase cycle slip compensation on input signals. Moreover, when it is determined in the slip determination unit 73 that a phase cycle slip has not occurred, the slip compensation unit 75 outputs as output signals the input signals in which the phase error has been reduced by the carrier phase compensation unit 60.

Figure 3:
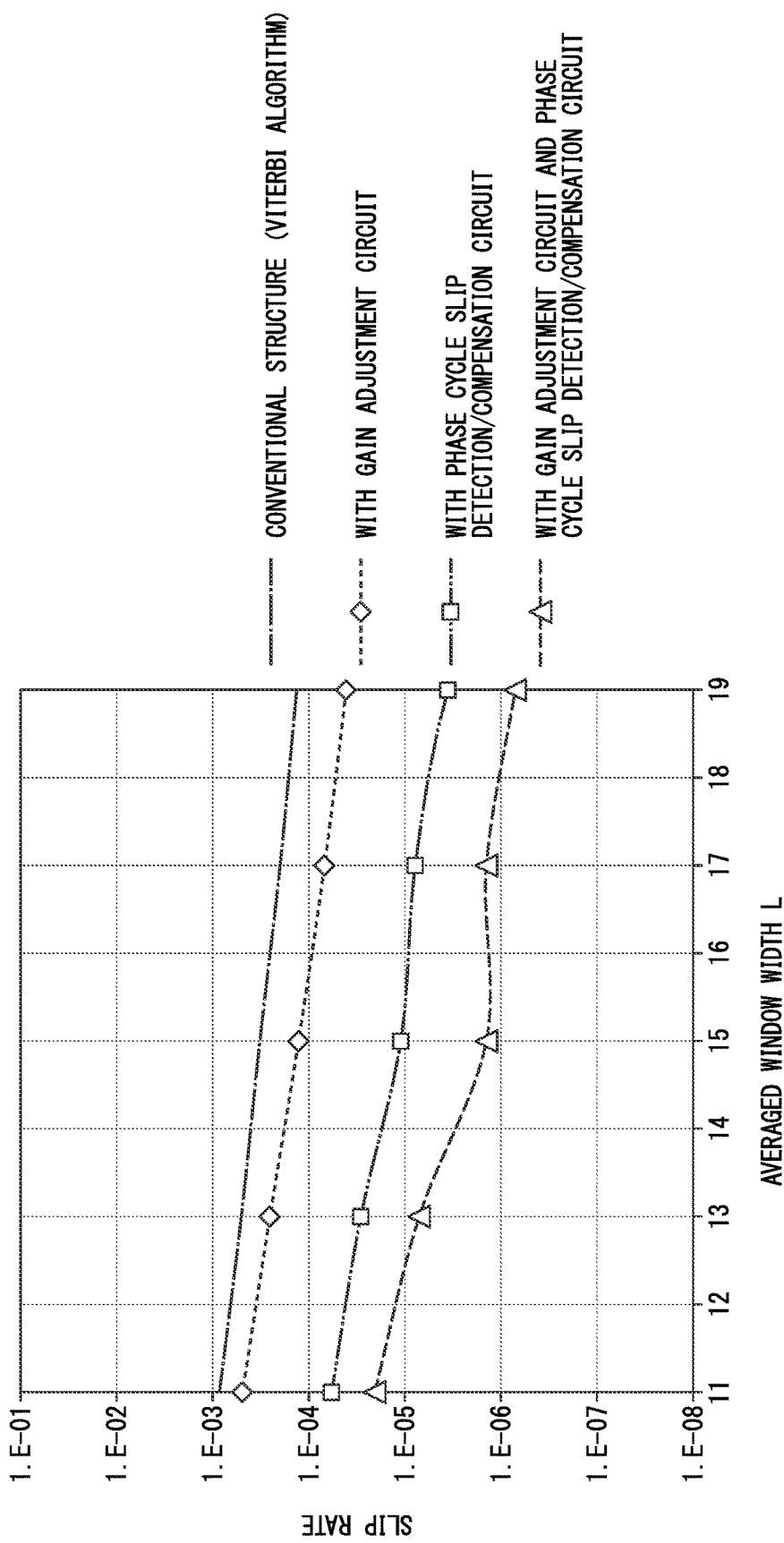
FIG. 3 is a graph showing the reduction effects of the phase cycle slip ratio of an embodiment of the present invention.

The effects of this example are shown in FIG. 3. FIG. 3 shows the reduction effect on the phase cycle slip rate when the present invention is applied to a conventional structure of a CPR.

Compared with a conventional structure in which the Viterbi-Viterbi algorithm has been applied, by providing the gain adjustment circuit 51, because the accuracy of the estimation of the carrier phase estimation values in the carrier phase estimation unit 50 is improved, the slip rate is reduced. Moreover, if a phase cycle slip determination/compensation unit 70 is provided without the gain adjustment circuit being provided, by compensating any phase cycle slip that occurs, the slip rate is reduced.

In the present example, by providing the gain adjustment circuit 51 and providing the phase cycle slip determination/compensation unit 70, the accuracy of the estimation of the carrier phase estimation unit 50 is improved and, furthermore, the accuracy of the phase cycle slip detection by the phase cycle slip determination unit 73 is also improved. Because of this, in a conventional structure, reduction to a slip rate of approximately $\frac{1}{100}^{th}$ is possible.

Second Embodiment

Figure 4:
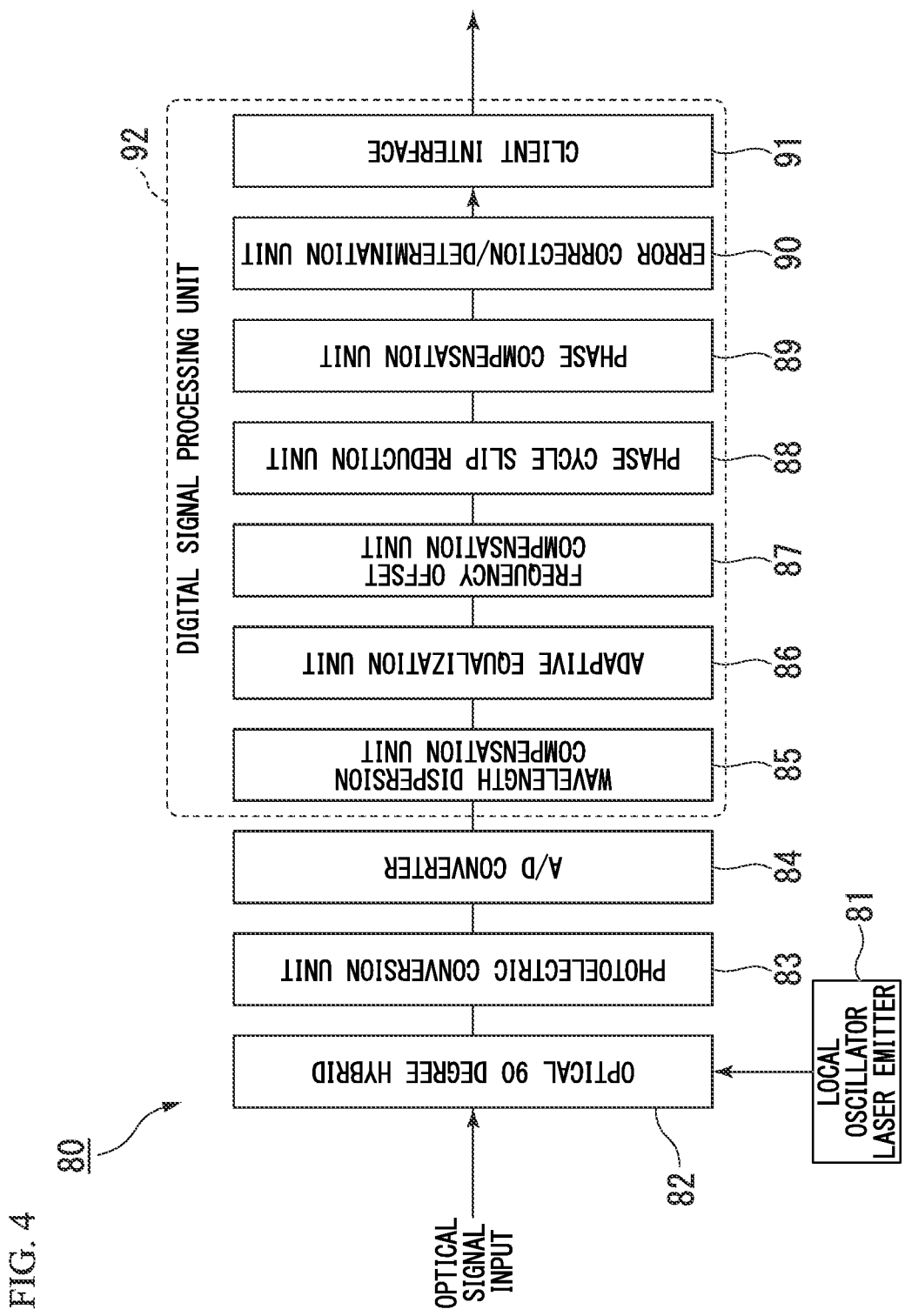
FIG. 4 is a block diagram showing a receiver device according to a second embodiment of the present invention.

FIG. 4 is a block diagram showing an example of the structure of a receiver device according to a second embodiment. In a receiver device 80 shown in FIG. 4, the present invention is applied to a digital coherent transmission system.

Optical signals transmitted on an optical fiber transmission path are input into the receiver device 80. The receiver device 80 acquires data contained in the input optical signals, and outputs this acquired data to devices and the like that are connected downstream from it. The receiver device 80 is equipped with a local oscillator laser emitter 81, an optical 90 degree hybrid 82, a photoelectric conversion unit 83, an A/D converter 84, a wavelength dispersion compensation unit 85, an adaptive equalization unit 86, a frequency offset compensation unit 87, a phase cycle slip reduction unit 88, a phase compensation unit 89, an error correction/determination unit 90, and a client interface 91.

The optical signals input into the receiver device 80 are input into the optical 90 degree hybrid 82. They are then mixed with a local oscillation laser output by the local oscillator laser emitter 81 in the optical 90 degrees hybrid 82 so as to form a homodyne detection wave or a heterodyne detection wave. The optical signal obtained from this detection wave is then converted into a baseband analog electrical signal in the photoelectric conversion unit 83. This analog electrical signal is then digitalized in the A/D converter 84, and is then output to the wavelength dispersion compensation unit 85. The digital signal output from the A/D converter 84 is a signal showing a symbol that is expressed as a complex number having an in-phase component I and a quadrature component Q.

The wavelength dispersion compensation unit 85 compensates waveform distortion that is caused by wavelength dispersion in the symbols that are input from the A/D converter 84. The adaptive equalization unit 86 compensates distortion that is generated by linear polarization crosstalk and by polarization mode dispersion and the like in the symbols whose waveform distortion has been compensated in the wavelength dispersion compensation unit 85. The frequency offset compensation unit 87 compensates the effects of frequency offset that occurs between transmitting devices that transmit optical signals and the receiver device 80 in the symbols whose distortion has been compensated by the adaptive equalization unit 86. This frequency offset, for example, is caused by frequency shift in the local oscillation lasers used by the transmission devices and the receiver device.

The phase cycle slip reduction unit 88 and the phase compensation unit 89 perform phase compensation on symbols whose frequency offset has been compensated by the frequency offset compensation unit 87, so as to reduce the occurrence of phase cycle slip. The error correction/determination unit 90 demodulates symbols whose phase has been compensated by the phase compensation unit 89, and after performing error detection and error correction on the data obtained from this demodulation, it inputs the data into the client interface 91. The client interface 91 converts data input from the error correction/determination unit 90 in accordance with the signal format and frame structure that are used in devices connected downstream from the receiver device, and then outputs the converted data.

In the receiver device 80, received optical signals are converted into electrical signals using coherent detection, and the reception signals obtained by converting these electrical signals into digital signals are then input into a digital signal processing unit 92, which includes the various units from the wavelength dispersion compensation unit 85 through to the client interface 91. The reception signals input into the digital signal processing unit 92 are signals that show a symbol string in which data has been mapped based on the modulation format used in the transmission device. In the receiver device 80, waveform distortion and noise that have been added by the optical fiber transmission path, the transmission device, and the receiver device are either reduced or compensated in the wavelength dispersion compensation unit 85 and the adaptive equalization unit 86.

The purpose of the phase compensation unit 89 of the present example is to estimate phase noise superimposed on the carrier wave, and to then remove or reduce this phase noise. Here, the phase cycle slip reduction unit 88 and the phase compensation unit 89 will be described in detail.

In the phase compensation unit 89, carrier phase estimation is performed from the received signal string. If what are known as outliers are mixed in with the symbols of the received symbol string that is used in the carrier phase estimation, then it is not possible for accurate carrier phase estimation to be performed, and phase cycle slips are generated. The phase compensation unit 89 performs the following function. Namely, it detects these so-called outliers by performing statistical processing on each symbol of the received symbol string, and after the effects of these outlier symbols have been reduced, it performs the carrier phase estimation.

In the phase cycle slip reduction unit 88, the occurrence of phase cycle slip is detected using the output from the frequency offset compensation unit 87, and, for those reception signals on which incorrect phase compensation was performed due to the phase cycle slip, phase compensation is performed on the incorrect portion that was caused by that phase cycle slip.

Third Embodiment

Figure 5:
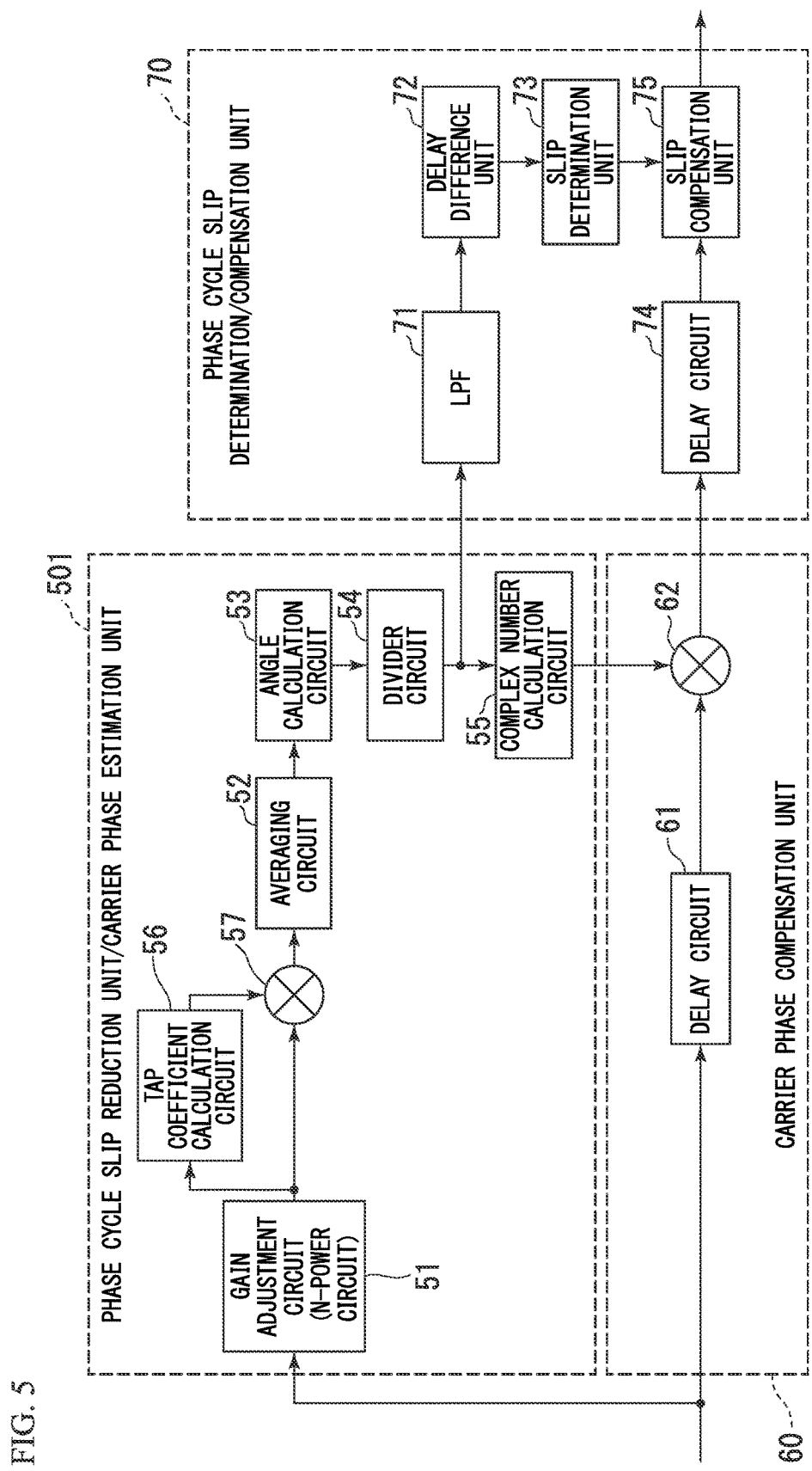
FIG. 5 is a block diagram showing a phase compensation circuit according to a third embodiment of the present invention.

FIG. 5 is a block diagram showing the structure of a phase compensation circuit according to a third embodiment. In this phase compensation unit, a phase cycle slip reduction unit/carrier phase estimation unit 501 and the carrier phase compensation unit 60 correspond to the phase cycle slip reduction unit 88 shown in FIG. 4, and the phase cycle slip determination/compensation unit 70 corresponds to the phase compensation unit 89 shown in FIG. 4.

Input symbols that are input in sequence into the phase compensation circuit are input into the gain adjustment circuit 51, which is functioning as an N-power circuit (hereinafter, referred to as an N-power circuit), and the delay circuit 61. It should be noted, however, that the N-power circuit is described simply as one example of the gain adjustment circuit 51, and the present invention is not limited to this. The N-power circuit 51 raises input symbols to the N-th power. This operation to raise input symbols to the N-th power is in order to eliminate the data dependency of two redundant bits (1, 1), (1, −1), (−1, 1), and (−1, −1) in each symbol.

A tap coefficient calculation circuit 56 detects outliers by performing statistical processing on the input symbols that have been raised to the N-th power. The tap coefficient calculation circuit 56 calculates tap coefficients that correspond to the symbols in the outliers in order to reduce the effects of these outliers, and then outputs the tap coefficients. After the tap coefficient has been multiplied by the N-th power values of the preceding and subsequent symbols by the multiplication circuit 57, the averaging circuit 52 obtains an average by adding up the N-th power values of the input symbols calculated by the N-power circuit on a complex plane for every M number of averaged window widths, and thereby reduces the noise component.

The angle calculation circuit 53 calculates the angle of deviation of the symbols (i.e., complex numbers) that have been averaged by the averaging circuit 52. In the angle calculation circuit 53, the symbols are converted into an angle using, for example, an arctan (Q/I). An unwrapping circuit that is included in the angle calculation circuit 53 corrects the arbitrariness (360°×n, wherein n is an integer) remaining in the angle calculated by the angle calculation circuit 53. Specifically, the unwrapping circuit corrects the angle such that the difference between the angle for the immediately prior input symbol and the current angle is reduced.

The divider circuit 54 calculates carrier phase estimation values by multiplying by (1/N) the angle that was corrected by the unwrapping circuit. The complex number calculation circuit 55 calculates a size 1 complex number that changes the carrier phase estimation value calculated by the divider circuit 54 into an angle of deviation, and outputs this to the multiplier circuit 62.

The delay circuit 61 attaches to an input symbol the delay for the time required for the calculations from the N-power circuit 51 to the complex number calculation circuit 55, and outputs the input symbol to the multiplier circuit 62 at the same timing as it outputs the size 1 complex number which corresponds to that particular input symbol. The multiplier circuit 62 multiplies the input symbol to which a delay was attached by the delay circuit 61 by the complex number calculated by the complex number calculation circuit 55, and compensates the phase noise and the like contained in the input symbol.

In contrast, the calculated estimation error phase is input into the delay difference circuit 72 via the LPF 71. The delay difference circuit 72 calculates temporal changes in the estimation error phases. The slip determination unit 73 determines, based on the temporal changes in the estimation error phases calculated by the delay difference unit 72, whether or not a phase cycle slip has occurred in the input signal. There are three types of determination of the phase cycle slip, namely, at 90 degrees, −90 degrees, and 180 degrees, and these can be determined using the polarity and absolute value of the temporal changes.

When it is determined in the slip determination unit 73 that a phase cycle slip has occurred, the slip compensation unit 75 compensates the phase cycle slip in an input signal in which the phase error has been reduced by the carrier phase compensation unit 60.

In this phase cycle slip compensation, in the case of a 90 degree slip determination, 90 degrees is subtracted from the phase estimation values subsequent to the time when the phase cycle slip occurred. In the case of a −90 degree slip determination, 90 degrees is added to the phase estimation values. In the case of a 180 degree slip determination, 180 degrees is added to (or subtracted from) the phase estimation values.

The slip compensation unit 75 outputs as output signals the signals obtained when phase cycle slip compensation is performed on input signals. Moreover, when it is determined in the slip determination unit 73 that a phase cycle slip has not occurred, the slip compensation unit 75 outputs as output signals the input signals in which the phase error has been reduced by the carrier phase compensation unit 60.

Fourth Embodiment

Figure 6:
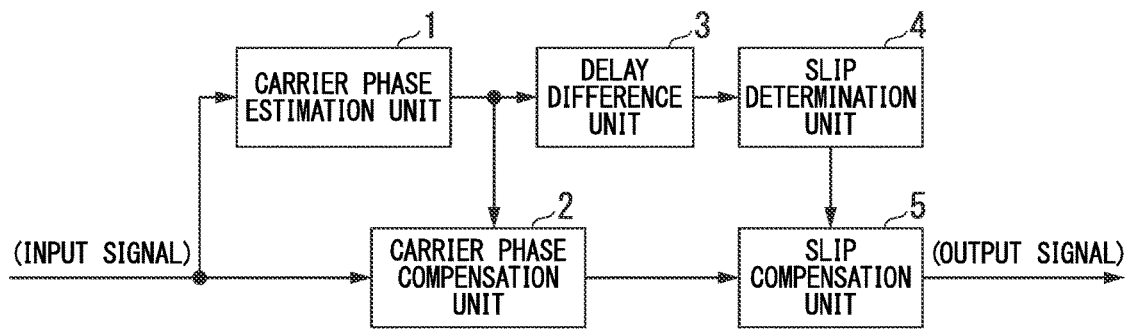
FIG. 6 is a block diagram showing the structure of a phase compensation circuit according to a fourth embodiment of the present invention

Next, an outline of a phase compensation circuit according to an embodiment of the present invention will be described. FIG. 6 is a block diagram showing the structure of a phase compensation circuit according to a fourth embodiment of the present invention. The phase compensation circuit is used in an optical receiver device in an optical communication system. As is shown in FIG. 6, the phase compensation circuit is provided with a carrier phase estimation unit 1, a carrier phase compensation unit 2, a delay difference unit 3, a slip determination unit 4, and a slip compensation unit 5.

Once photoelectric conversion has been performed on received optical signals, the signals undergo analog/digital conversion and the digital signals thereby obtained are input as input signals into the phase compensation circuit. If necessary, before the input signals are input into the phase compensation circuit, wavelength dispersion compensation and compensation for any distortion during transmission and the like may also be performed on the input signals.

The carrier phase estimation unit 1 performs either feedback or feed-forward carrier phase estimation on the input signals. The carrier phase estimation unit 1 outputs estimation error phases, which are estimated values for carrier phase errors, to the carrier phase compensation unit 2 and the delay difference unit 3. Based on these estimation error phases, the carrier phase compensation unit 2 reduces phase errors contained in the input signal.

The delay difference unit 3 calculates temporal changes in the estimation error phases. The slip determination unit 4 determines whether or not a phase cycle slip has occurred in the input signal based on the temporal changes in the estimation error phases calculated by the delay difference unit 3.

When it is determined in the slip determination unit 4 that a phase cycle slip has occurred, the slip compensation unit 5 performs phase cycle slip compensation on the input signal in which the phase errors have already been reduced by the carrier phase compensation unit 2. The slip compensation unit 5 outputs as an output signal the signal obtained as a result of the phase cycle slip compensation being performed on the input signal. Moreover, when it is determined in the slip determination unit 4 that a phase cycle slip has not occurred, the slip compensation unit 5 outputs as an output signal the input signal in which the phase errors have already been reduced by the carrier phase compensation unit 2.

Figure 7:
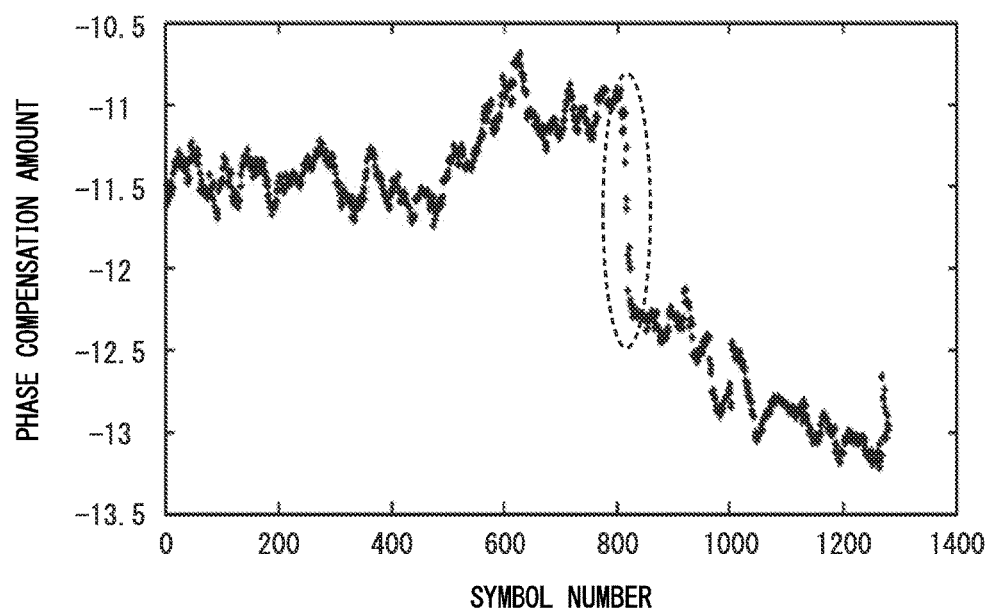
FIG. 7 is a graph showing an example of an estimation error phase output by the carrier phase estimation unit shown in FIG. 6.

FIG. 7 is a graph showing an example of estimation error phases output by the carrier phase estimation unit 1. Namely, FIG. 7 is a graph showing phase compensation amounts of the past 1280 symbols (corresponding to a protected section) when a phase slip is detected. In FIG. 7, the horizontal axis shows the symbol number in the input signal, while the vertical axis shows the phase compensation amount. The phase compensation amount is the phase amount when the phase errors are reduced based on the estimation error phases. In FIG. 7, in the area shown by the broken line, namely, in the area where the symbol number is 800, a steep change is generated in the estimation error phases. This steep change is due to the occurrence of a phase cycle slip.

As is shown in FIG. 7, looking at the variations in the estimation error phases, when the phase cycle slip occurs, a change of approximately ($\pi/2$) radian is generated in a short time of approximately several times the average of the tap length of the filter in the carrier phase estimation unit 1 (i.e., approximately 100 symbols when the tap length average is 17). In contrast, when a phase cycle slip has not occurred, a change in the estimation error phase in excess of one radian does not occur in a short time.

Phase cycle slip detection and phase cycle slip compensation are performed using these estimation error phase characteristics. Specifically, the estimation error phases output by the carrier phase estimation unit 1 are monitored, and it is determined that a phase cycle slip has occurred when a steep change is detected within a short time, and phase cycle slip compensation is then performed on the input signal. A steep change is, for example, a change that exceeds one radian. By compensating a phase cycle slip in the phase compensation circuit, it is possible to suppress the frequency at which phase cycle slips occur in signal processing performed downstream from the phase compensation circuit.

As a result of this, the substantial frequency at which phase cycle slips occur can be reduced to ((phase cycle slip occurrence frequency)×(1−(detection rate))+(number of incorrect detections)). The detection rate is the proportion of phase cycle slips that were detected in the slip determination unit 4, while the number of incorrect detections is the number of times that the slip determination unit 4 incorrectly determined that a phase cycle slip had occurred.

Fifth Embodiment

Figure 8:
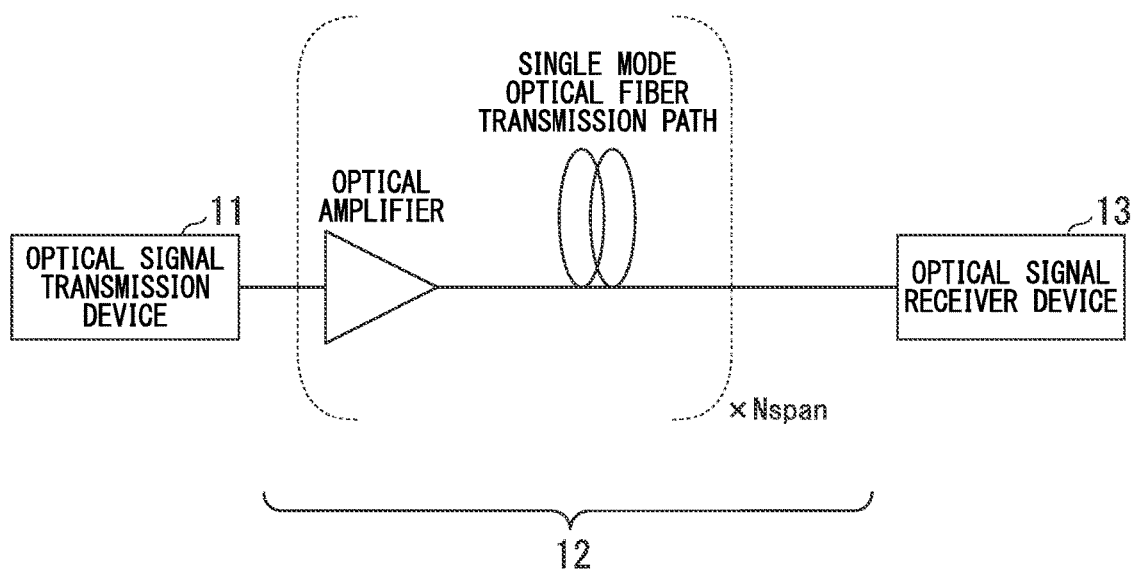
FIG. 8 is a block diagram showing an example of the structure of an optical communication system according to a fifth embodiment of the present invention.

FIG. 8 is a block diagram showing an example of the structure of an optical communication system according to a fifth embodiment of the present invention. An optical communication system of the present embodiment is equipped with an optical signal transmission device 11, a transmission path 12 that is formed by a single mode optical fiber transmission path and by an optical amplifier, and an optical signal receiver device 13. The optical signal transmission device 11 outputs via the transmission path 12 to the optical signal receiver device 13 optical signals obtained by performing polarization multiplexing on signals obtained using, for example, a QPSK modulation format.

In the optical communication system of the present embodiment, differential encoding is not performed. Note that in the following description, a structure is described in which QPSK is used for the modulation format, and signals that have undergone polarization multiplexing are transmitted and received. However, it is also possible to use an m-QAM modulation format such as BPSK (Binary Phase Shift Keying) and 16 QAM (Quadrature Amplitude Modulation), or to employ a structure in which single polarization signals are transmitted and received.

Figure 9:
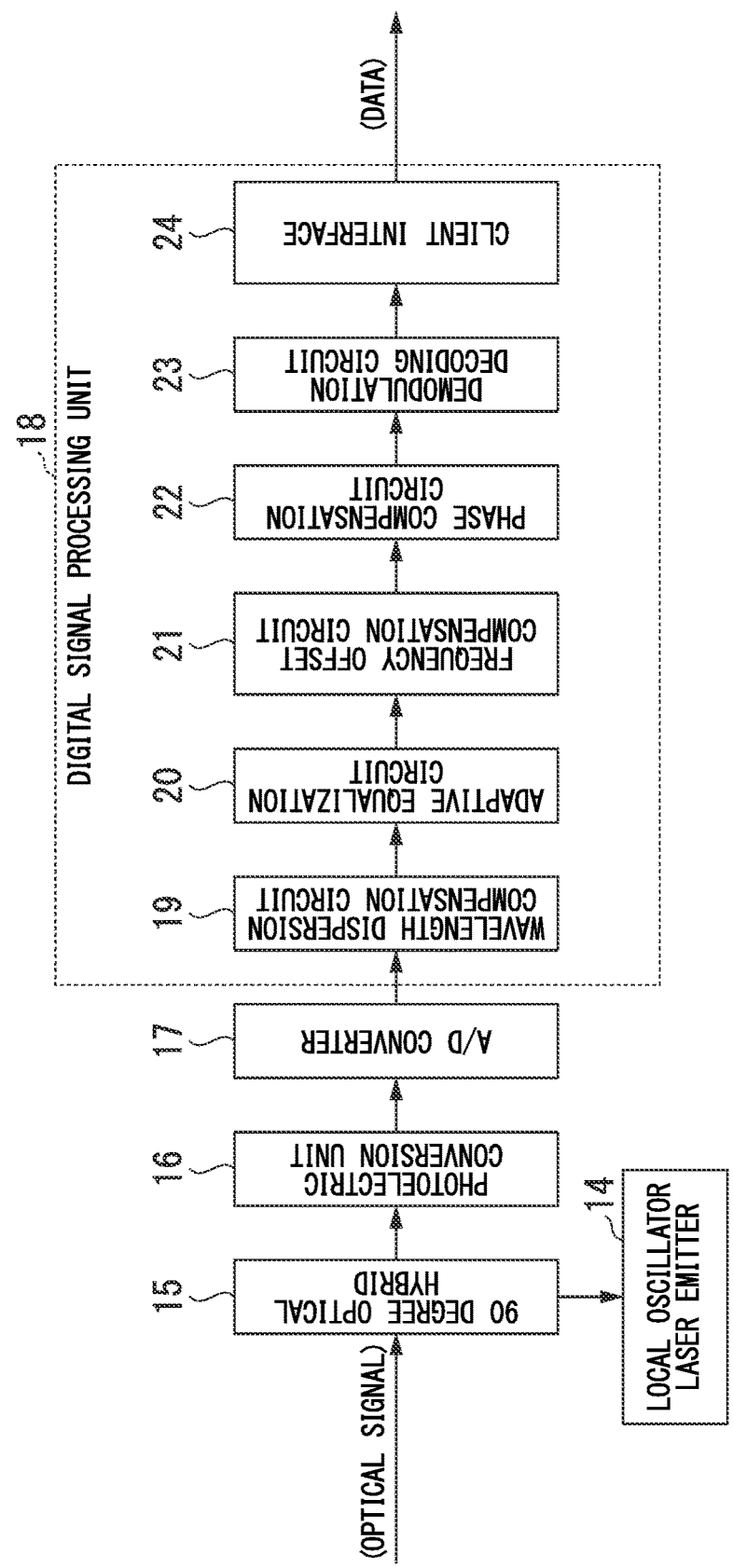
FIG. 9 is a block diagram showing an example of the structure of an optical signal receiver device according to the fifth embodiment.

FIG. 9 is a block diagram showing an example of the structure of the optical signal receiver device 13 according to the present embodiment. The optical signal receiver device 13 acquires data that has been converted into an optical signal by the optical signal transmission device 11 from optical signals that it receives via the transmission path 12. The optical signal receiver device 13 is provided with a local oscillator laser emitter 14, an optical 90 degree hybrid 15, a photoelectric converter 16, an analog/digital converter (i.e., an A/D converter) 17, and a digital signal processing unit 18.

The optical signals input into the optical signal receiver device 13 are mixed with a local oscillation laser output by the local oscillator laser emitter 14 in the optical 90 degree hybrid 15 so as to form a homodyne detection wave or a heterodyne detection wave. The optical signal obtained from this detection wave is then converted into four-lane baseband analog electrical signals in the photoelectric conversion unit 16. These analog electrical signals are then digitalized in the A/D converter 17, and are then output to the digital signal processing unit 18 as two-lane (X-polarization and Y-polarization) complex digital signals. The digital signal processing unit 18 firstly performs linear waveform distortion compensation, and then performs demodulation decoding on the X-polarization and Y-polarization complex digital signals. The digital signal processing unit 18 then outputs the data obtained by this demodulation decoding to devices and the like that are connected downstream from it.

The digital signal processing unit 18 has a wavelength dispersion compensation circuit 19, an adaptive equalization circuit 20, a frequency offset compensation circuit 21, a phase compensation circuit 22, a demodulation decoding circuit 23, and a client interface 24. The X-polarization and Y-polarization complex digital signals (i.e., reception signals) input into the digital signal processing unit 18 are linearly mixed by the effects of the rotation of the polarization state in the transmission path 12 and the like.

The wavelength dispersion compensation circuit 19 uses wavelength dispersion to compensate linear waveform distortion in the X-polarization and Y-polarization complex digital signals that are input into the digital signal processing unit 18. The adaptive equalization circuit 20 compensates signals distorted on the transmission path by linear polarization crosstalk and polarization mode dispersion (PMD) in the X-polarization and Y-polarization complex digital signals whose wavelength dispersion has been compensated by the wavelength dispersion compensation circuit 19.

The frequency offset compensation circuit 21 compensates the effects from frequency offset that occurs between the optical signal receiving device and the optical signal transmitting device in the X-polarization and Y-polarization complex digital signals whose distortion has been compensated by the adaptive equalization circuit 20. This frequency offset, for example, is caused by the frequency shift in the local oscillation lasers used by the optical signal transmitting device 11 and the optical signal receiver device 13. The phase compensation circuit 22 performs phase cycle slip compensation on the X-polarization and Y-polarization complex digital signals in which the frequency offset has been compensated by the frequency offset compensation circuit 21.

The demodulation decoding circuit 23 performs demodulation that corresponds to the modulation format used in the optical signal transmitting device 11 and also performs error correction decoding on the X-polarization and Y-polarization complex digital signals in which the phase cycle slip has been compensated by the phase compensation circuit 22. The demodulation decoding circuit 23 then outputs the data obtained by this demodulation and error correction decoding to the client interface 24. The client interface 24 converts data input from the demodulation decoding circuit 23 in accordance with the signal format and frame structure that are used in devices connected downstream from the digital signal processing unit 18, and then outputs the converted data.

Figure 10:
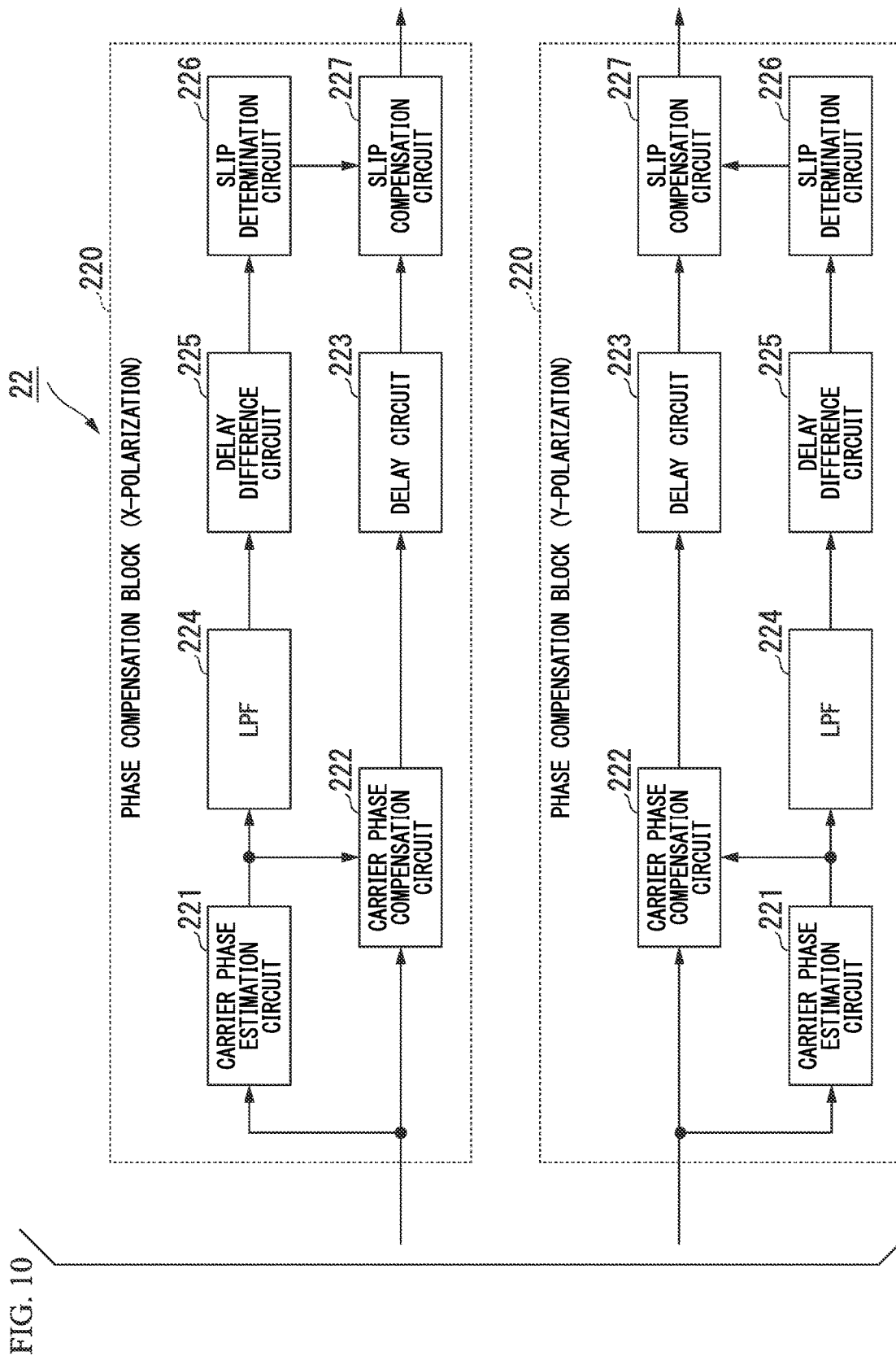
FIG. 10 is a block diagram showing an example of the structure of a phase compensation circuit according to the fifth embodiment.

FIG. 10 is a block diagram showing an example of the structure of the phase compensation circuit 22 according to the present embodiment. The phase compensation circuit 22 has a phase compensation block 220 for X-polarization, and a phase compensation block 220 for Y-polarization. In the following description, the phase compensation block 220 for X-polarization will be described, and a description of the phase compensation block 220 for Y-polarization which has the same structure is omitted.

The phase compensation block 220 has a carrier phase estimation circuit 221, a carrier phase compensation circuit 222, a delay circuit 223, a low-pass filter (LPF) 224, a delay difference circuit 225, a slip determination circuit 226, and a slip compensation circuit 227. X-polarization complex digital signals are input into the phase compensation block 220.

The carrier phase estimation circuit 221 performs either feed-forward carrier phase error estimation such as is described in Non-patent document 1, or feedback carrier phase error estimation such as is described in Reference document 1 (Reference document 1: T. Kobayashi et al, "160-Gb/s Polarization-Multiplexed 16-QAM long-haul transmission over 3,123 km using digital coherent receiver with digital PLL based frequency offset compensator", OTuD1 OFC/NFOEC2010).

The carrier phase estimation circuit 221 estimates phase differences that are caused by local oscillation lasers in the optical signal transmission device 11 and the optical signal receiver device 13. Because this phase difference changes temporally, the carrier phase estimation circuit 221 continuously performs carrier phase estimation, and this estimation tracks the changes in the phase difference. For example, when QPSK is used for the modulation format, feed-forward carrier phase estimation is performed based on the four squares method. When BPSK is used for the modulation format, carrier phase estimation is performed based on the two squares method, and when m-QAM is used for the modulation format, carrier phase estimation is performed based on the maximum likelihood (ML) method. Namely, in the carrier phase estimation circuit 221, a phase estimation method that is appropriate to the modulation format is used.

Moreover, the carrier phase estimation circuit 221 also estimates phase errors contained in the X-polarization complex digital signals. The carrier phase estimation circuit 221 outputs estimation error phases, which are the phase errors it has estimated, to the carrier phase compensation circuit 222 and the low-pass filter 224.

Based on the estimation error phases output from the carrier phase estimation circuit 221, the carrier phase compensation circuit 222 performs compensation on phase errors contained in the X-polarization complex digital signals. The carrier phase compensation circuit 222 outputs X-polarization complex digital signals in which the phase errors have been compensated to the delay circuit 223. Note that phase errors are phases from among the complex digital signal phases that are not dependent on modulation components. They are generated, for example, by phase differences between the optical signal transmission device 11, the optical signal receiver device 13, and the local oscillation laser, and by the non-linearity and the like of the transmission path.

Figure 11:
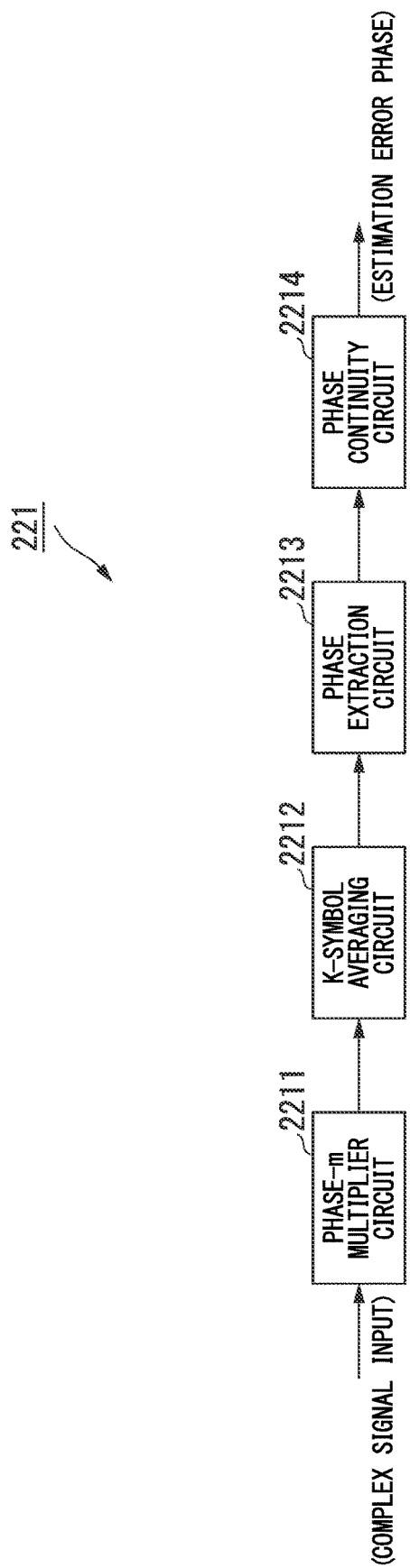
FIG. 11 is a block diagram showing an example of the structure of a carrier phase estimation circuit according to the fifth embodiment.

FIG. 11 is a block diagram showing an example of the structure of the carrier phase estimation circuit 221. As is shown in FIG. 11, the carrier phase estimation circuit 221 has a feed-forward type of structure. The carrier phase estimation circuit 221 has a phase-m multiplier circuit 2211, a K symbol averaging circuit 2212, a phase extraction circuit 2213, and a phase continuity circuit 2214. The phase-m multiplier circuit 2211 performs m-multiplication on phase components of the input complex signals that include phase errors. If QPSK is used as the modulation format, then m=4, if BPSK is used as the modulation format, then m=2. Because the signal components degenerate to a uniform value as a result of the phase components undergoing m-multiplication, the phase of output signals from the phase m-multiplier circuit 2211 contain only phase errors. The output from the phase m-multiplier circuit 2211 is input into the K symbol averaging circuit 2212.

Figure 12:
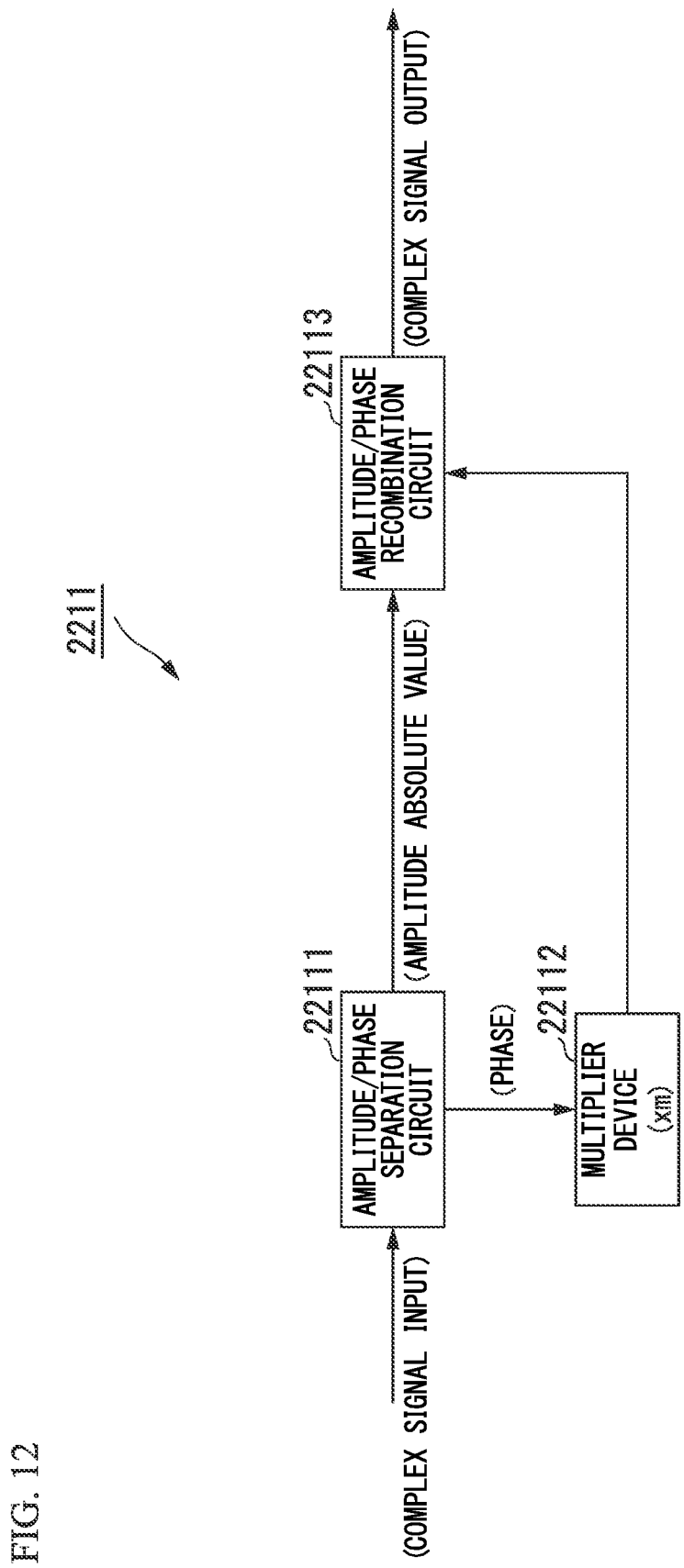
FIG. 12 is a block diagram showing an example of the structure of a phase-m multiplier circuit according to the fifth embodiment.

FIG. 12 is a block diagram showing an example of the structure of the phase m-multiplier circuit 2211 according to the present embodiment. The phase m-multiplier circuit 2211 has an amplitude/phase separation circuit 22111, a multiplier 22112, and an amplitude/phase recombination circuit 22113. Signals input into the phase m-multiplier circuit 2211 are separated into phase components and amplitude components by the amplitude/phase separation circuit 22111. The phase components separated by the amplitude/phase separation circuit 22111 are multiplied m-times by the multiplier circuit 22112. The phase components that are multiplied m-times by the multiplier circuit 22112 and the amplitude components that are separated by the amplitude/phase separation circuit 22111 are reconstructed into a complex signal by the amplitude/phase recombination circuit 22113, and are then output.

Figure 13:
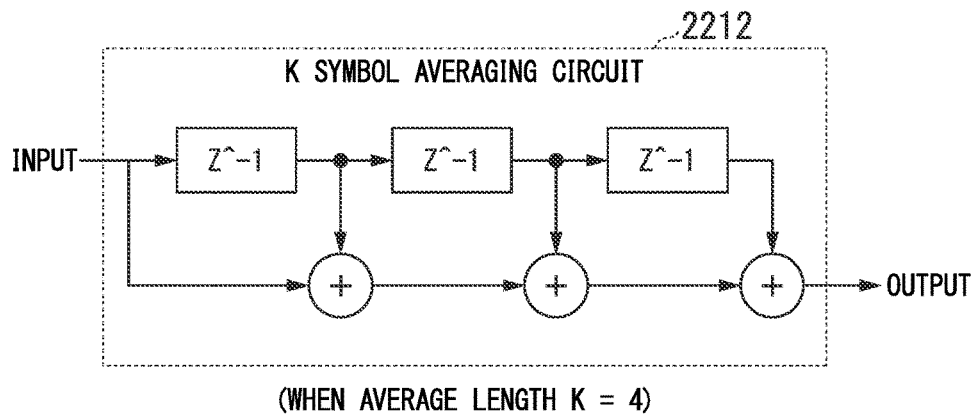
FIG. 13 is a block diagram showing an example of the structure of a K symbol averaging circuit according to the fifth embodiment.

FIG. 13 is a block diagram showing an example of the structure of the K symbol averaging circuit 2212. As is shown in FIG. 13, the K symbol averaging circuit 2212 is formed as a tap length K limited impulse response filter. In FIG. 13, an example of the structure of a K symbol averaging circuit 2212 in which the average length K=4 is shown.

Returning to FIG. 11, the description of the structure of the carrier phase estimation circuit 221 will now be continued.

The output from the K symbol averaging circuit 2212 is input into the phase extraction circuit 2213. The phase extraction circuit 2213 removes phase components of input signals which are complex numbers and outputs these. The output from the phase extraction circuit 2213 has a value of, for example, $2\pi$ the diameter of a radian of $\pi \sim +\pi$. At this time, when the phase changes beyond a point of $\pm\pi$, the output is discontinuous. Because of this, ideally, the range of the phase that can be extracted by the phase continuity circuit 2214 is increased to $\pm$infinity (in reality, to a sufficiently large range), and phase discontinuities are removed therefrom. A variety of methods have been proposed historically for the phase continuation algorithm, and the method disclosed, for example, in Reference document 2 can be used (Reference document 2: Kazuyoshi Itoh et al, APPLIED OPTICS/Vol. 21, No. 14/15 July 1982). Signals from which phase discontinuities have been removed by the phase continuity circuit 2214 are output as estimation error phases, which serve as the output from the carrier phase estimation circuit 221.

Returning to FIG. 10, the description of the phase compensation block 220 will now be continued.

The delay circuit 223 attaches a delay to the times (i.e., the number of symbols) required for the signal processing by the low-pass filter 224, the delay difference circuit 225, and the slip determination circuit 226 of the complex digital signals output from the carrier phase compensation circuit 222, and then outputs them to the slip compensation circuit 227. Namely, the delay circuit 223 attaches a delay such that the timing at which the complex digital signals output from the carrier phase compensation circuit 222 are input into the slip compensation circuit 227 matches the timing at which the determination results from the slip determination circuit 226 for these same complex digital signals are input into the slip compensation circuit 227. The delay circuit 223 can be constructed using, for example, a shift register. In this case, a single shift delay amount is taken as the time for a single symbol.

The low-pass filter 224 smoothes out changes in the estimation error phases output by the carrier phase estimation circuit 221, removes high-frequency components from these estimation error phases, and then outputs the result to the delay difference circuit 225. The delay difference circuit 225 outputs signals that are proportional to the temporal changes in the estimation error phases that have been smoothed out by the low-pass filter 224.

The signals output by the delay difference circuit 225 are signals that show a delay difference value d. The delay difference value d is calculated using the following Formula (3) by monitoring for N number of symbols estimation error phases ($\phi$(T)) that change over time. The delay difference circuit 225 outputs to the slip determination circuit 226 a signal showing the calculated delay difference value d. In Formula (3), n is the symbol number and is a natural number, T is the symbol time interval.

$$d = \phi(nT) - \phi((n-N)T) \quad (3)$$

Figure 14:
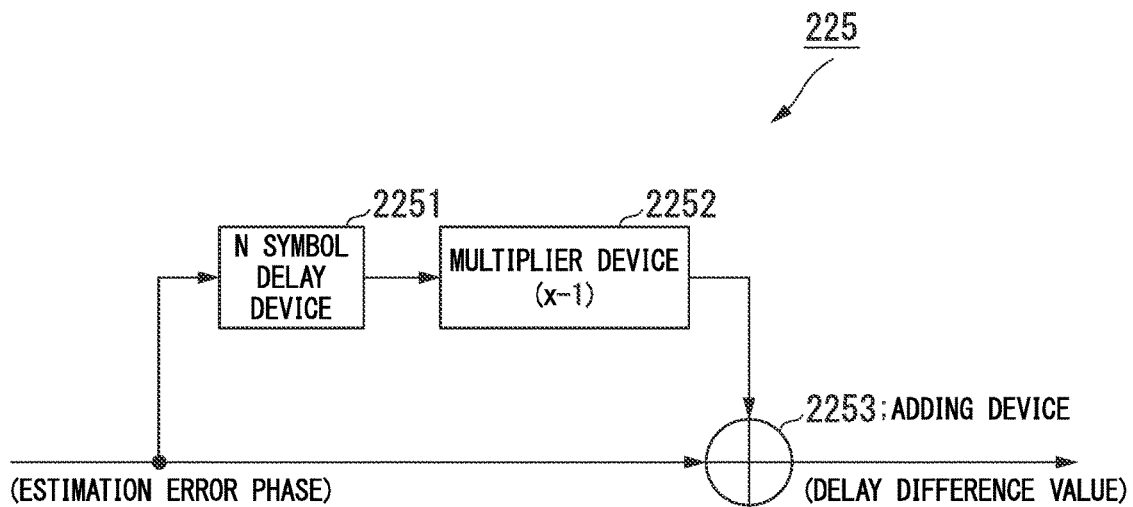
FIG. 14 is a block diagram showing an example of the structure of a delay difference circuit according to the fifth embodiment.

FIG. 14 is a block diagram showing an example of the structure of the delay difference circuit 225 according to the present embodiment. The delay difference circuit 225 has an N symbol delay device 2251, a multiplier device 2252, and an adding device 2253. The smoothed estimation error phases ($\phi$(n T)) in the low-pass filter 224 are input into the N symbol delay device 2251 and the adding device 2253. The N symbol delay device 2251 outputs the N symbol number of prior estimation error phases ($\phi$((n−N) T)). The N symbol delay device 2251 can be constructed using, for example, a shift register. In this case, a single shift delay amount corresponds to the time for a single symbol, and the range to be stored is approximately five times the filter tap length K in the K symbol averaging circuit 2212.

The multiplier device 2252 multiplies (−1) by the N symbol number of prior estimation error phases that are output from the N symbol delay device 2251, and outputs the result to the adding device 2253. The adding device 2253 adds together the estimation error phases output from the low-pass filter 24 and the values output from the multiplier device 2252. Namely, the adding device 2253 performs the operation given in Formula (3), and outputs the operation result as the delay difference value d.

N (i.e., the number of delay symbols) in the N symbol delay device 2251 is set in advance within a range of approximately 1 through 5 times the average value of the tap number of the filter in the K symbol averaging circuit 2212. N is set to a value such that it is possible to detect a steep change in the estimation error phases, for example, such as is shown in FIG. 7, and such that it is difficult for incorrect detections that are caused by changes arising from oscillations and the like in the estimation error phases to occur. Signals output from the delay differential circuit 225 which has this type of structure show a quantity that is in proportion to the temporal slope (i.e., the amount of change in the slope per unit time) of the estimation error phases. The optimum value for N can be determined by means of a simulation or the like. For example, when the tap length K of the filter in the K symbol averaging circuit 2212 is 17, then it can be inferred by means of simulation or the like that the optimum value lies in the vicinity of N=50 which is approximately three times K.

Returning to FIG. 10, the description of the phase compensation block 220 will be continued.

The slip determination circuit 226 compares the delay difference value d that is output from the delay difference circuit 225 with a previously set detection threshold value, and determines whether or not a phase cycle slip has occurred, and if a phase cycle slip has occurred, determines the direction thereof. As is shown in FIG. 7, if a steep change is generated in the estimation phase error, the absolute value of the delay difference value d increases. This determination of whether or not a phase cycle slip has occurred is performed based on whether or not d is continuously in excess of the threshold value over approximately L number of symbols. Here, L is a value that corresponds to a delay value N of the aforementioned delay difference circuit 225, and is set to a value that satisfies 0<L<N. For example, L may be set to approximately 60% of N (N×0.6). The slip determination circuit 226 outputs to the slip compensation circuit 227 a slip determination signal that shows the determination result as to whether or not a phase cycle slip has occurred, and when a phase cycle slip has occurred, it also shows the rotation direction thereof.

The detection threshold value for the delay difference value d varies depending on the modulation format. For example, when a QPSK format or QAM format is used, a value of approximately 1 radian is used. However, in actuality, in accordance with conditions such as the amount of phase noise and the like, it is appropriate to set a detection threshold value that minimizes the frequency of occurrence of phase cycle slip remaining in the complex digital signal (i.e., the remaining slip frequency) output by the phase compensation block 220. The frequency of occurrence of phase cycle slip is calculated, for example, by (number of times phase cycle slip has occurred)/(number of transmission symbols).

The detection threshold value for the delay difference value d is set, for example, based on simulations and measurement results. Note that for a modulation format where the phase difference between symbols in a constellation such as QPSK or QAM is ($\pi/2$) radians, the range where the most suitable value can be obtained is a range from 0 radians to ($\pi/2$) radians. For an m-PSK modulation format, the range is from 0 radians to ($2\pi/m$) radians.

Moreover, in cases such as when frequency offset that is generated by the difference between the local oscillation laser in the optical signal transmission device 11 and the local oscillation laser in the optical signal receiver device 13 is present, and this frequency offset cannot be adequately compensated by the frequency offset compensation circuit 21, then it is desirable for the detection threshold value to be altered in accordance with the remaining frequency offset.

Slip determination signals output from the slip determination circuit 226 and complex digital signals output from the delay circuit 223 are input into the slip compensation circuit 227. Based on the phase compensation amount which is switched in accordance with the slip determination signal, the slip compensation circuit 227 compensates the phase of the complex digital signal. When the modulation format is a QPSK format or a QAM format, the phase compensation amount of the slip compensation circuit 227 may be any of 0°, 90°, 180°, and 270°. The initial value for the phase compensation amount may be, for example, 0°, and the phase compensation amount is switched in either a positive rotation or a negative rotation in 90° units in accordance with the slip determination signal. Here, a positive rotation is a rotation in which the phase increases, while a negative rotation is a rotation in which the phase decreases.

Specifically, when the slip determination signal indicates that a phase cycle slip in a positive rotation direction has occurred, updating to switch the phase compensation amount to a value obtained by subtracting 90° from the current phase compensation amount is performed. Moreover, when the slip determination signal indicates that a phase cycle slip in a negative rotation direction has occurred, updating to switch the phase compensation amount to a value obtained by adding 90° to the current phase compensation amount is performed.

When m-PSK is used for the modulation format, the switching of the phase compensation amount for the complex digital signal is performed in (360°/m) units. In addition, the phase compensation amount that is switched in accordance with the slip determination signal is maintained until the next phase cycle slip occurrence is detected. The slip compensation circuit 227 constantly performs the compensating of the phase using phase compensation amounts switched by the slip determination signal for the complex digital signals output from the delay circuit 223.

Figure 15:
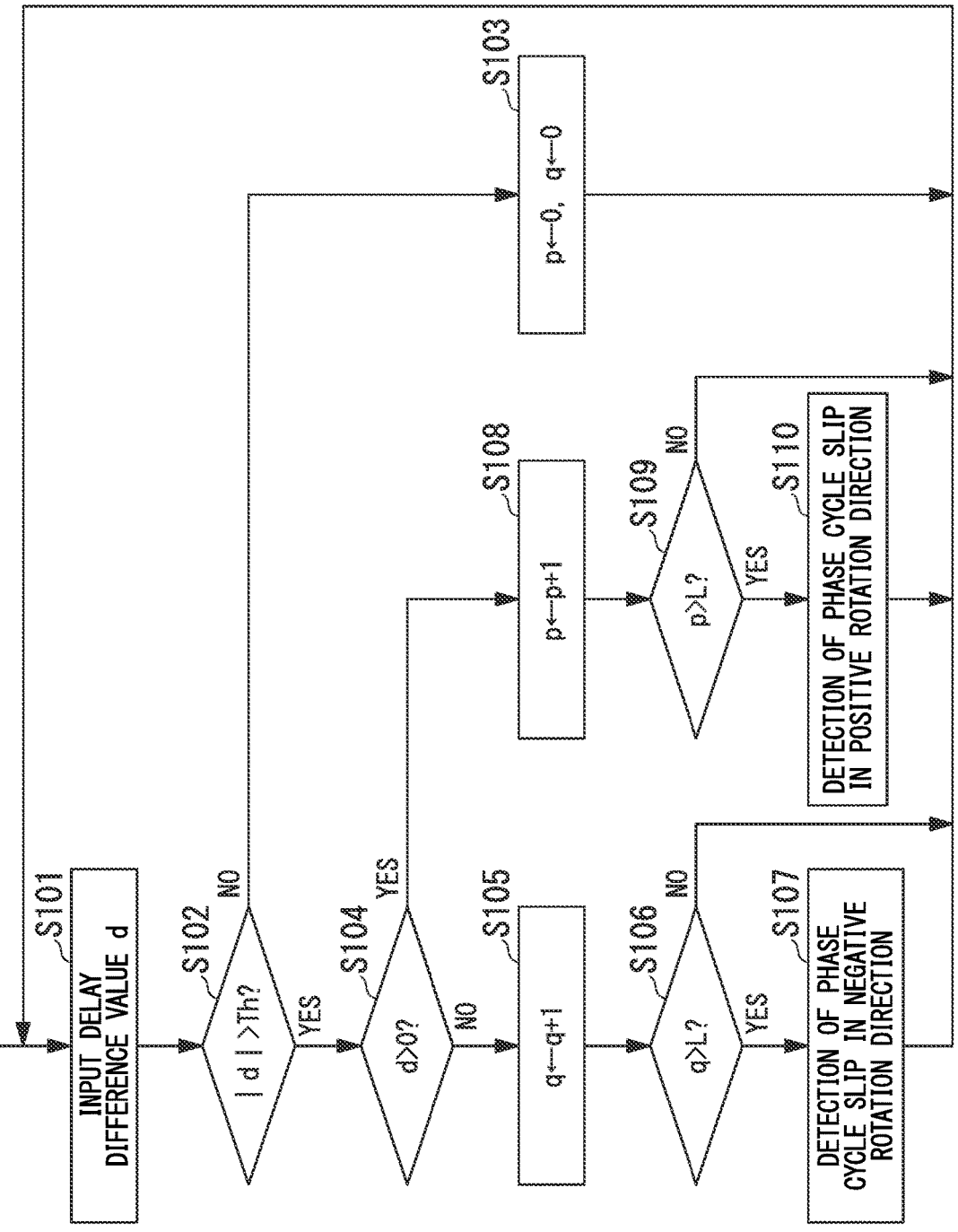
FIG. 15 is a flowchart showing slip determination processing performed by a slip determination circuit according to the fifth embodiment.

FIG. 15 is a flowchart showing the slip determination processing performed by the slip determination circuit 226 according to the present embodiment. When the processing is started, the slip determination circuit 226 receives an input of the delay difference value d output by the delay difference circuit 225 (step S101).

The slip determination circuit 226 then determines whether or not the absolute value of the input delay difference value d is greater than a predetermined detection threshold value Th (step S102).

If the absolute value is not greater than the detection threshold value Th (step S102: NO), the slip determination circuit 226 initializes by substituting 0 for the parameters p and q (step S103), and returns the processing to step S101. The parameter p is a parameter used for counting the number of symbols that the delay difference value d continuously exceeds the detection threshold Th in the positive rotation direction. The parameter q is a parameter used for counting the number of symbols that the delay difference value d continuously exceeds the detection threshold Th in the negative rotation direction.

If, on the other hand, the absolute value is larger than the detection threshold value Th (step S102: YES), the slip determination circuit 226 determines whether or not the delay difference value d is larger than 0 (step S104).

If the delay difference value d is not larger than 0 (step S104: NO), the slip determination circuit 226 increases the parameter q by 1 (step S105), and determines whether or not the parameter q has exceeded a determination threshold value L (step S106).

The determination threshold value L is determined in advance so as to correspond to the delay value N of the delay difference circuit 225, as is described above, and may be set, for example, to a value of approximately 60 percent of N (N×0.6). Note that the determination threshold value L may also be determined in accordance with the level of dispersion of the delay difference value d, or in accordance with the time interval between symbols or the like, or it may be determined based on simulations and measurement values such that phase cycle slip incorrect detections are not more than a predetermined value.

If the value of the parameter q does not exceed the determination threshold value L (step S106: NO), the slip determination circuit 226 returns the processing to step S101.

If the value of the parameter q does exceed the determination threshold value L (step S106: YES), the slip determination circuit 226 determines that a phase cycle slip has occurred in the negative rotation direction, and outputs to the slip compensation circuit 227 a slip determination signal indicating that a phase cycle slip in the negative rotation direction has occurred (step S107). It then returns the processing to step S101.

If, in step S104, it is determined that the delay difference value d is greater than 0 (step S104: YES), the slip determination circuit 226 increases the parameter p by 1 (step S108), and determines whether or not the parameter p exceeds the predetermined threshold value L (step S109).

If the value of the parameter p does not exceed the determination threshold value L (step S109: NO), the slip determination circuit 226 returns the processing to step S101.

If the value of the parameter p does exceed the determination threshold value L (step S109: YES), the slip determination circuit 226 determines that a phase cycle slip in the positive rotation direction has occurred, and outputs to the slip compensation circuit 227 a slip determination signal indicating that a phase cycle slip in the positive rotation direction has occurred (step S110). It then returns the processing to step S101.

As is described above, when the absolute value of the delay difference value d continuously exceeds the detection threshold value Th over L number of symbols, namely, when the delay difference value d has changed markedly, the slip determination circuit 226 determines that a phase cycle slip has occurred. At this time, the slip determination circuit 226 determines that a positive rotation phase cycle slip has occurred when the delay difference value d exceeds a detection threshold value Th having a positive value (i.e., Th>0; an upper-side detection threshold value). Moreover, the slip determination circuit 226 determines that a negative rotation phase cycle slip has occurred when the delay difference value d exceeds a detection threshold value Th having a negative value (i.e., −Th; a lower-side detection threshold value).

The slip compensation circuit 227 switches the phase compensation amount based on the slip determination signal indicating the determination result made by the slip determination circuit 226, and performs compensation on the complex digital signal output from the delay circuit 223.

A time lag is generated between when the phase cycle slip occurred and when it is detected by the slip determination circuit 226 and the phase compensation amount is switched by the slip compensation circuit 227. This time lag is the processing time required by the low-pass filter 224, the delay difference circuit 225, the slip determination circuit 226, and the slip compensation circuit 227. The delay circuit 223 compensates this time lag. As a consequence, compensation of the phase cycle slip based on the phase compensation amount that corresponds to the slip determination signal is performed by the slip compensation circuit 227 for the complex digital signals output from the carrier phase compensation circuit 222.

In this way, by monitoring the output from the carrier phase estimation circuit 221 in the phase compensation circuit 22, without using redundant signals such as pilot symbols and the like, it is possible to immediately detect and correct phase cycle slips that have occurred. As a consequence of this, it is possible to suppress the effective frequency of occurrence of phase cycle slips, and coherent optical communication utilizing absolute phases becomes possible, at the same time as signal redundancy using pilot symbols and the like is kept to a minimum. Note that this redundancy is calculated, for example, by means of (number of pilot symbols per unit time)/(total number of transmitted symbols per unit time).

Moreover, by providing the low-pass filter 224 in the phase compensation circuit 22 between the carrier phase estimation circuit 221 and the delay difference circuit 225, changes that are caused by fluctuations and noise in the estimation error phases are smoothed out. As a consequence, it is possible to improve the accuracy of phase cycle slip detection that uses the delay difference value d.

Figure 16:
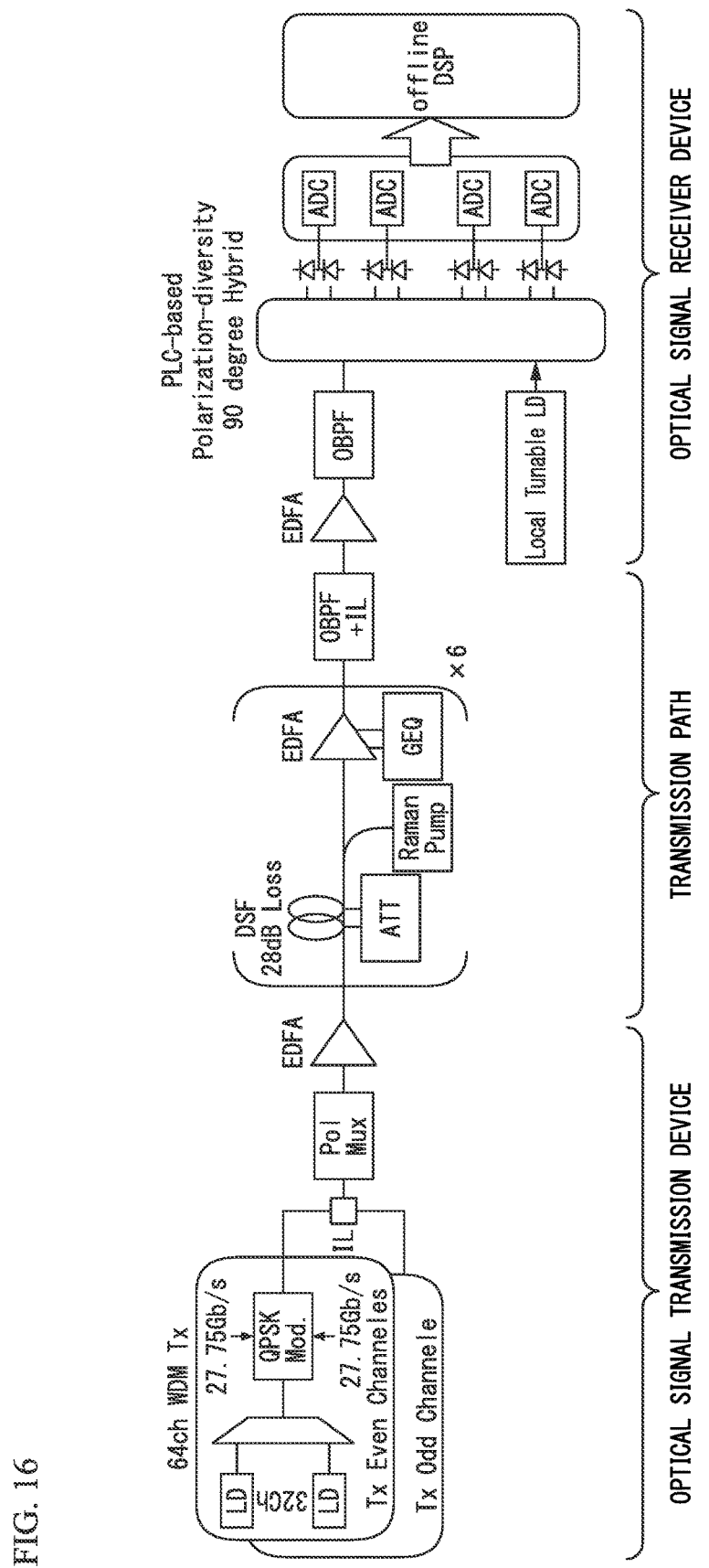
FIG. 16 is a schematic block diagram showing the structure of a test device used to acquire optical transmission test data.

The results when each circuit of the digital signal processing unit 18 according to the present embodiment was packaged on a computer, and the off-line demodulation of optical transmission test data was performed will now be shown. Here, the bit error rate and the symbol slip rate are evaluated. FIG. 16 is a schematic block diagram showing the structure of a test device used to acquire optical transmission test data. In FIG. 16, the block indicated by [off-line DSP] corresponds to the digital signal processing unit 18.

Figure 17:
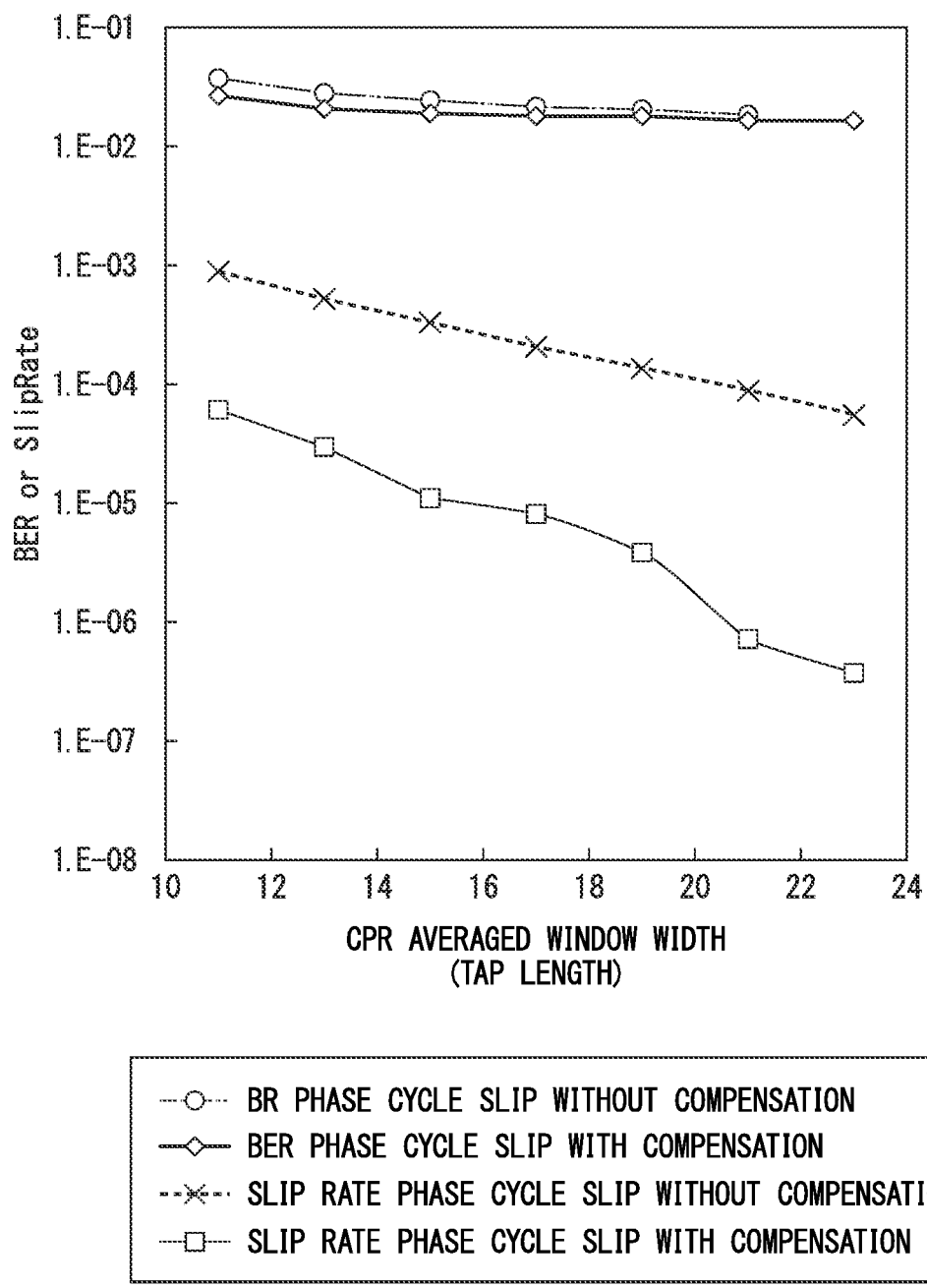
FIG. 17 is a graph showing the results when off-line demodulation was performed on the optical transmission test data obtained by the test device shown in FIG. 16.

FIG. 17 is a graph showing the results when the off-line demodulation of the optical transmission test data obtained by the test device shown in FIG. 16 was performed. In FIG. 17, the horizontal axis shows the tap length in the carrier phase estimation circuit 221 and the K symbol averaging circuit 2212, while the vertical axis shows the bit error rate (BER) and the symbol slip rate (SlipRate). In FIG. 17 the results when phase cycle slip compensation according to the present embodiment was performed are shown, with the results when phase cycle slip compensation was not performed being shown as a comparative example. As is shown in FIG. 17, by performing phase cycle slip compensation, the frequency of occurrence of phase cycle slips downstream from the phase compensation circuit 22 can be suppressed to approximately $1/20^{th}$. Moreover, even under severe conditions such as a bit error rate of $2 \times 10^{-2}$, the frequency of phase cycle slips can be limited to the $10^{-6}$ band.

If the frequency of phase cycle slip occurrence is suppressed in this way, then because the effects of burst errors caused by phase cycle slips are limited to less than the tolerance threshold value for forward error correction using pilot signals having a redundancy of approximately 1%, it is possible to avoid differential coding. For example, the optical signal-to-noise ratio conditions needed obtain a bit error rate of $1\times10^{-2}$ can be relaxed to approximately 1.1~1.4 decibels by avoiding differential coding.

Sixth Embodiment

In the slip determination circuit 226 according to the fifth embodiment, the detection threshold value used when detecting the occurrence of phase cycle slip was a fixed value. In the sixth embodiment, as a variant example of the fifth embodiment, a structure is described in which the detection threshold value is determined adaptively by changing the detection threshold value in accordance with the delay difference value d.

Figure 18:
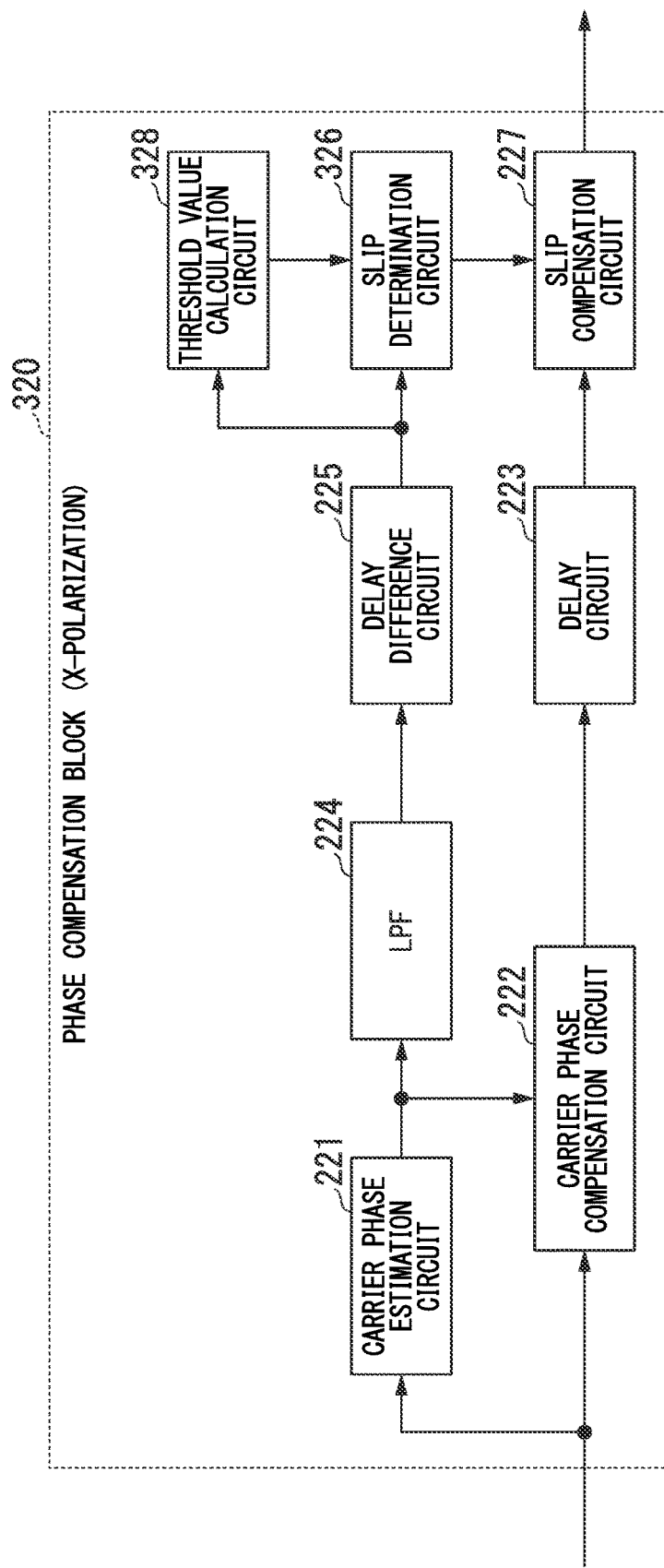
FIG. 18 is a block diagram showing the structure of a phase compensation block according to a sixth embodiment of the present invention.

FIG. 18 is a block diagram showing the structure of a phase compensation block 320 according to the sixth embodiment. Here, the phase compensation block 320 corresponding to X-polarization is shown, however, the same phase compensation block 320 is also used for Y-polarization.

The phase compensation block 320 according to the present embodiment has a carrier phase estimation circuit 221, a carrier phase compensation circuit 222, a delay circuit 223, a low-pass filter 224, a delay difference circuit 225, a slip determination circuit 326, a slip compensation circuit 227, and a threshold value calculation circuit 328. The phase compensation block 320 differs from the phase compensation block 220 according to the fifth embodiment (see FIG. 10) in that it has the slip determination circuit 326 instead of the slip determination circuit 226, and in that it has the threshold value calculation circuit 328. Note that in the phase compensation block 320, any structure that is the same as in the fifth embodiment is given the same descriptive symbols and a description thereof is omitted.

The delay difference values d output from the delay difference circuit 225, and the detection threshold values that include the upper-side detection threshold value and the lower-side detection threshold value calculated by the threshold value calculation circuit 328 are input into the slip determination circuit 326. When the delay difference value d exceeds the upper-side detection threshold value continuously over L number of symbols, the slip determination circuit 326 determines that a positive rotation phase cycle slip has occurred. On the other hand, when the delay difference value d drops below the lower-side detection threshold value continuously over L number of symbols, the slip determination circuit 326 determines that a negative rotation phase cycle slip has occurred. The slip determination circuit 326 outputs to the slip compensation circuit 227 the determination result as to whether or not a phase cycle slip has occurred, and when a phase cycle slip has occurred, it also outputs a slip determination signal showing the rotation direction thereof.

Figure 19:
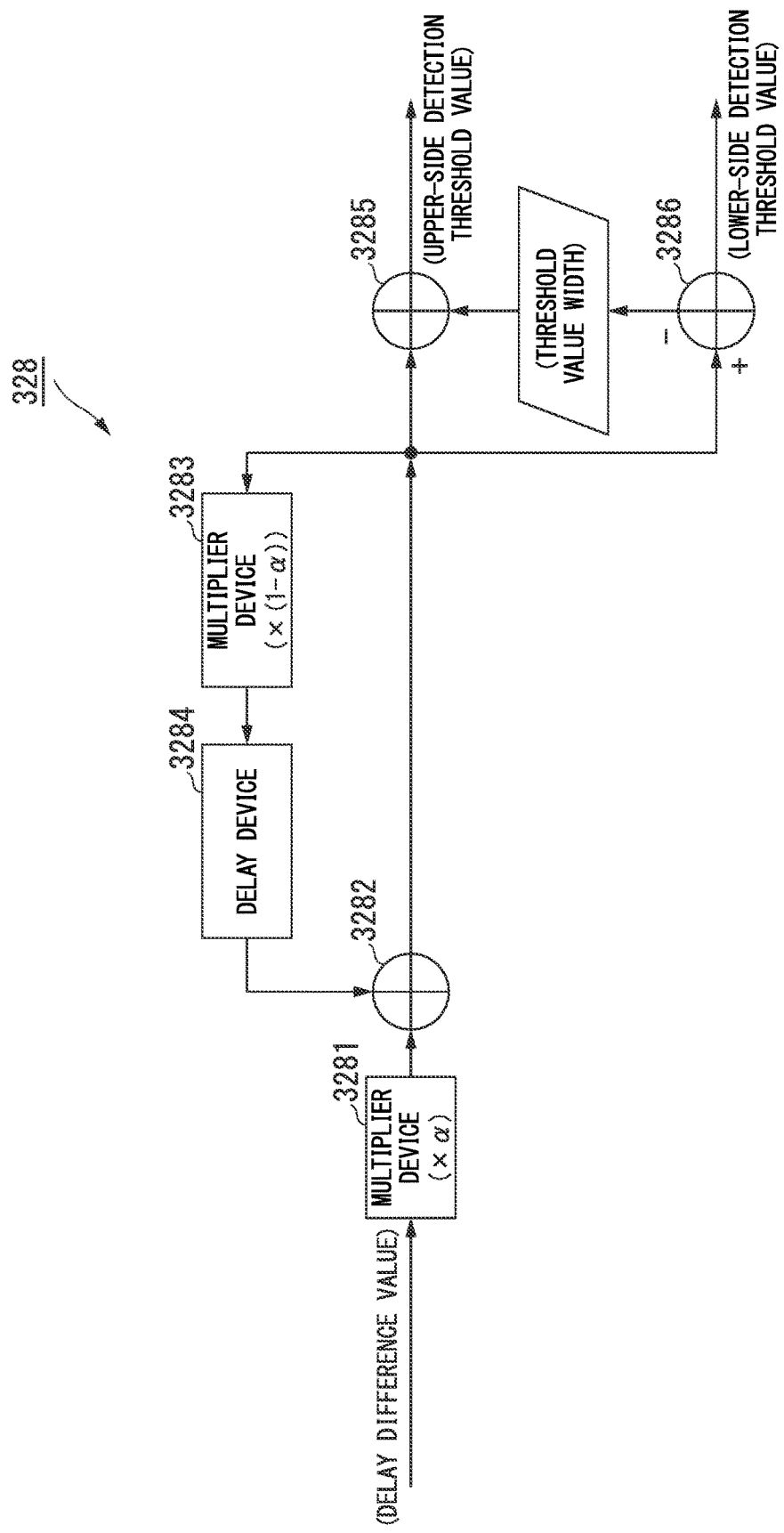
FIG. 19 is a block diagram showing an example of the structure of the threshold value calculation circuit according to the sixth embodiment.

The threshold value calculation circuit 328 receives the input of the delay difference value d output from the delay difference circuit 225, and calculates a detection threshold value in accordance with the delay difference value d. FIG. 19 is a block diagram showing an example of the structure of the threshold value calculation circuit 328 according to the present embodiment. The threshold value calculation circuit 328 has a multiplier device 3281, an adding device 3282, a multiplier device 3283, a delay device 3284, an adding device 3285, and a subtraction device 3286.

The delay difference value d is input into the multiplier device 3281. The multiplier device 3281 multiplies the input delay difference value d by a predetermined coefficient α, and outputs the multiplication result to the adding device 3282. The multiplication result from the multiplier device 3281, as well as the value output from the delay device 3284 are input into the adding device 3282. The adding device 3282 adds the value output from the delay device 3284 to the multiplication result, and outputs the result of this addition to the multiplier device 3283, the adding device 3285, and the subtraction device 3286.

The multiplier device 3283 multiplies the addition result output from the adding device 3282 by a coefficient (1−α), and outputs the result of this multiplication to the delay device 3284. The delay device 3284 delays the multiplication result output from the multiplier device 3283 by one symbol, and then outputs it to the adding device 3282.

Namely, an exponential moving average D of the delay difference value d is calculated in the threshold value calculation circuit 328 by the multiplier device 3281, the adding device 3282, the multiplier device 3283, and the delay device 3284 as is shown by the following Formula (4). n is the symbol number. α is the forgetting coefficient.

$$D(n+1)=(1-\alpha)D(n)+\alpha d(n) \quad (4)$$

The adding device 3258 adds the addition result (i.e., the exponential moving average D) output from the adding device 3282 to a predetermined threshold value width, and outputs the addition result as the upper-side detection threshold value. The subtraction device 3286 subtracts the threshold value width from the addition result (i.e., the exponential moving average D) output from the adding device 3282, and outputs the subtraction result as the lower-side detection threshold value. The threshold value width is, for example, approximately one radian. In the same way as for the detection threshold value Th according to the fifth embodiment, a value that corresponds to the modulation format is set for the threshold value width.

As a result of the threshold value calculation circuit 328, which has the above-described structure, adaptively calculating detection threshold values that include the upper-side detection threshold value and the lower-side detection threshold value based on the delay difference value d, the detection and compensation of phase cycle slip can be accurately performed even when frequency offset is remaining in a complex digital signal that is input into the phase compensation block 320.

Figure 20A:
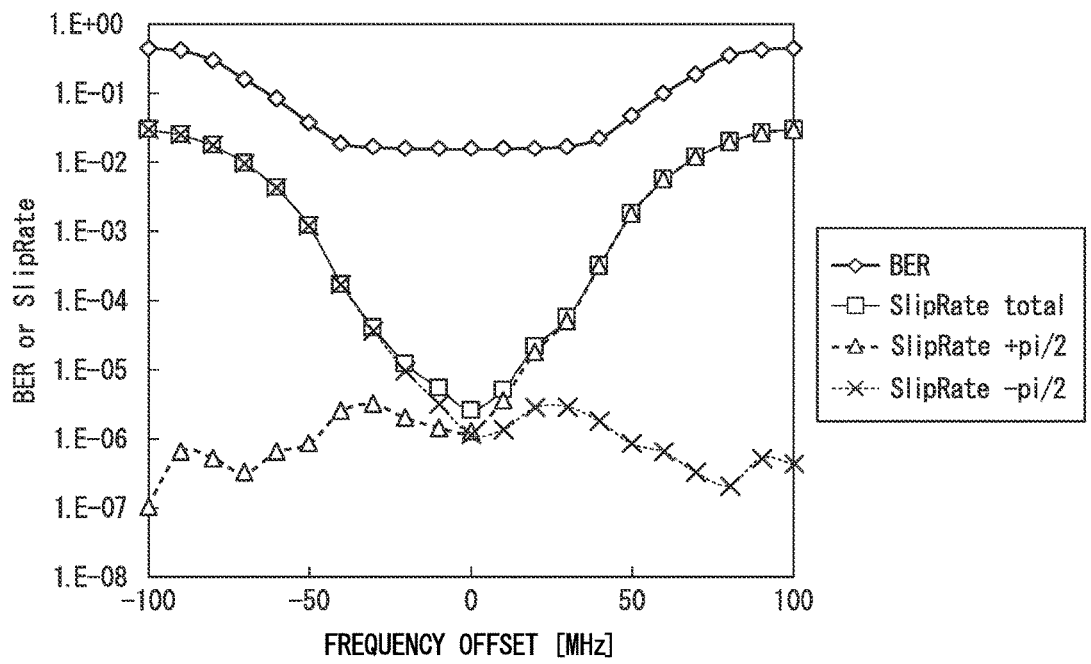
FIG. 20A is a graph showing a relationship between a bit error rate and symbol slip rate and a frequency offset when the detection threshold value is set as a fixed value according to the sixth embodiment.
Figure 20B:
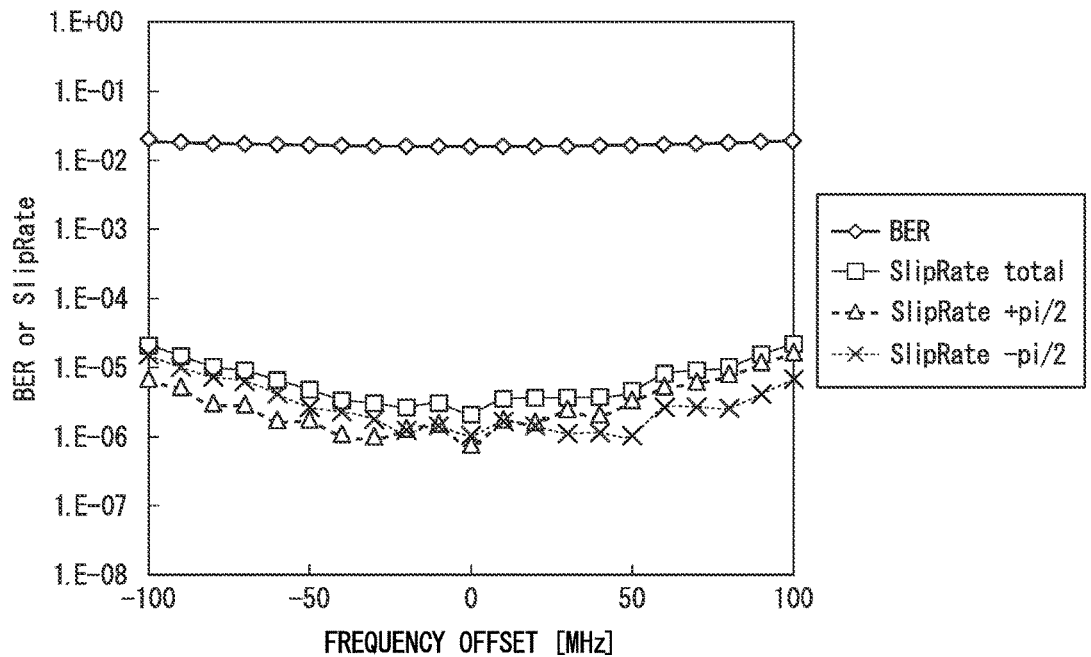
FIG. 20B is a graph showing a relationship between the bit error rate and symbol slip rate and the frequency offset when the detection threshold value is determined in accordance with a delay difference value according to the sixth embodiment.

FIGS. 20A and 20B are graphs showing a comparison between when the detection threshold value is a fixed value and when the detection threshold value is determined in accordance with the delay difference value d. In these drawings, examples of the bit rate error (BER) and the symbol slip rate (SlipRate) both when the detection threshold value is a fixed value and when the detection threshold value is determined in accordance with the delay difference value d are shown. In these drawings, the horizontal axis shows the frequency offset, and the vertical axis shows the bit rate error (BER) and the symbol slip rate (SlipRate). Note that the tap length K in the K symbol averaging circuit 2212 is set at 17, the delay amount in the delay difference circuit 225 is set at 60 symbols, and the optical signal to noise ratio (OSNR) is set at 12.5 dB. The remaining conditions correspond to the conditions in the test device shown in FIG. 16.

FIG. 20A shows a relationship between the bit error rate and symbol slip rate and the frequency offset when the detection threshold value is fixed at one radian. Note that the symbol slip rate shows the sum of the slip rates in a positive rotation direction and in a negative rotation direction. As is shown in FIG. 20A, when the frequency offset has a width of approximately 10 MHz, the (bit error rate/symbol slip rate) exhibits the excellent characteristics of $10^3$. However, when the frequency offset approaches 50 MHz, the symbol slip rate deteriorates by two or more decimal places.

FIG. 20B shows a relationship between the bit error rate and symbol slip rate and the frequency offset when the detection threshold value is determined in accordance with the delay difference value d. Note that the threshold value width is set at one radian, and the forgetting coefficient α is set at $1\times10^3$. By determining the upper-side detection threshold value and the lower-side detection threshold value in accordance with the delay difference value d, it is possible to obtain a (bit error rate/symbol slip rate) of $10^3$ or more even when the frequency offset approaches 50 MHz.

In this way, by determining the detection threshold value in accordance with the delay difference value d, is possible to improve the accuracy of the detection and compensation of phase cycle slip even when frequency offset is remaining in a complex digital signal that is input into the phase compensation block 320.

Seventh Embodiment

A slip determination circuit 226 according to the fifth embodiment is structured such that it determines whether or not a phase cycle slip has occurred based on the delay difference value d that is input into it from a single delay difference circuit 225. In the seventh embodiment, a plurality of delay difference circuits 225 having mutually different delay numbers (i.e., N symbols) are provided, and a determination as to whether or not a phase cycle slip has occurred is made for each of the delay difference values d that are output from the respective delay difference circuits 225. By making a majority determination based on the respective determination results, the accuracy of phase cycle slip detection is improved.

Figure 21:
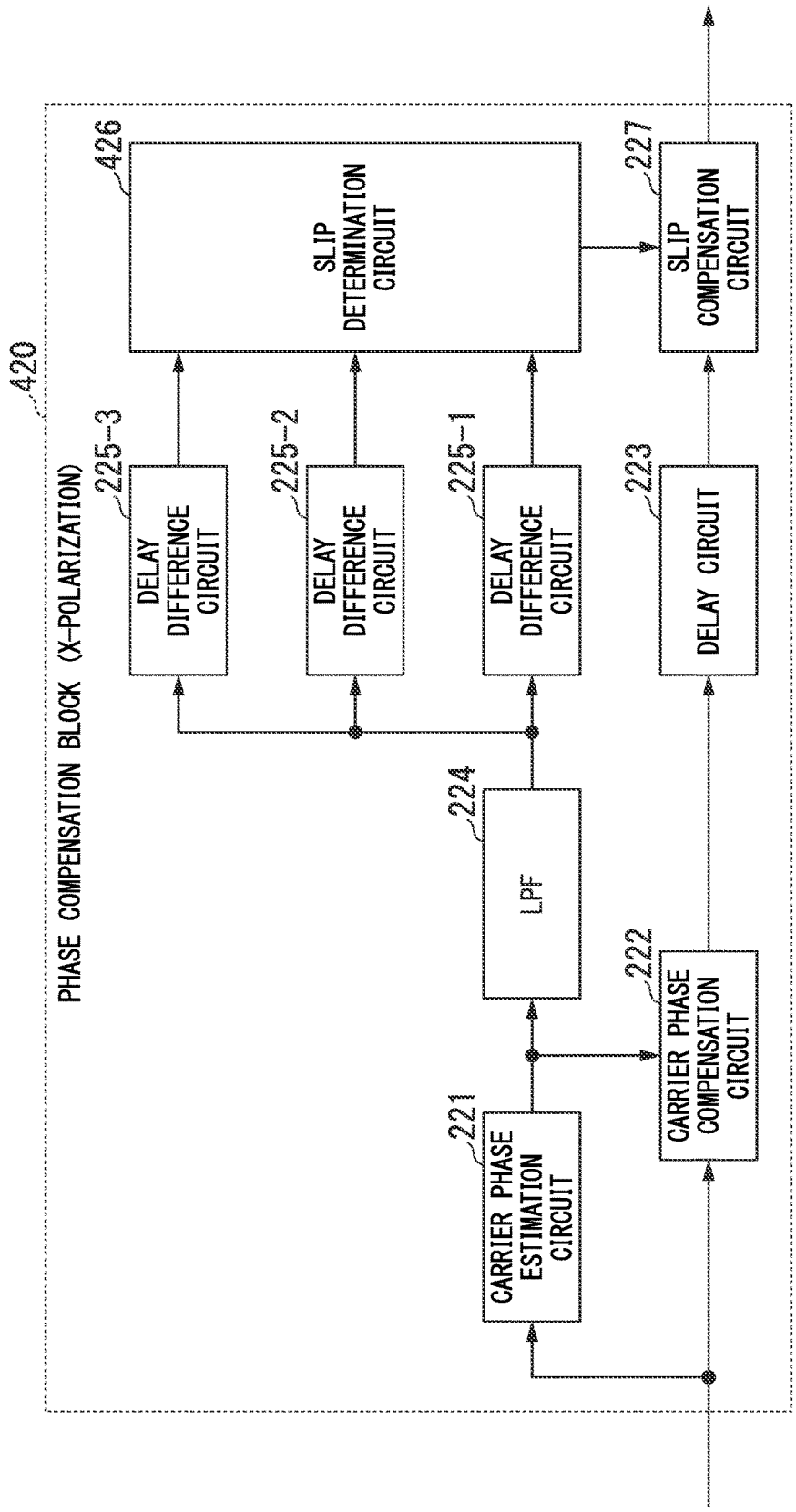
FIG. 21 is a block diagram showing the structure of a phase compensation block according to a seventh embodiment of the present invention.

FIG. 21 is a block diagram showing the structure of a phase compensation block 420 according to the seventh embodiment. Here, a phase compensation block 420 for X-polarization is shown, however, the same phase compensation block 420 is also used for Y-polarization. The phase compensation block 420 has a carrier phase estimation circuit 221, a carrier phase compensation circuit 222, a delay circuit 223, a low-pass filter 224, three delay difference circuits 225-1~225-3, a slip determination circuit 426, and a slip compensation circuit 227.

The phase compensation block 420 differs from the phase compensation block 220 according to the fifth embodiment (see FIG. 10) in that it has a plurality of the delay difference circuits 225, and in that it has the slip determination circuit 426 instead of the slip determination circuit 226. Note that in the phase compensation block 420, any structure that is the same as in the fifth embodiment is given the same descriptive symbols and a description thereof is omitted.

The delay difference circuits 225-1~225-3 have the same structure as the delay difference circuit 225 according to the fifth embodiment, however, the delay amount provided by the N symbol delay device 2251 is different.

The slip determination circuit 426 performs slip determination processing (see FIG. 15) for each of the delay difference values d output from the respective delay difference circuits 225-1~225-3. By performing a majority determination using the results of the determinations performed for the respective delay difference values d, the slip determination circuit 426 determines whether or not a phase cycle slip has occurred, and if it is determined that a phase cycle slip has occurred, it also determines the rotation direction thereof. Specifically, if it is determined that at least two results from among the results of the slip determination processing show a phase cycle slip has occurred in the same rotation direction, a slip determination signal indicating that a phase cycle slip has occurred is output to the slip compensation circuit 227.

In this way, by making a plurality of determinations for the delay difference values d, it is possible to suppress incorrect detections of phase cycle slips that are caused by the effects of noise and the like, and to thereby improve the accuracy of the detection and compensation of phase cycle slips.

Note that in the present embodiment, a structure is described in which the phase compensation block 420 has three delay difference circuits 225, however, it is also possible to employ a structure in which there are two delay difference circuits 225 or four or more delay difference circuits 225.

Eighth Embodiment

In each of the above-described embodiments, a structure is described in which when the occurrence of a phase cycle slip is detected, compensation of the phase cycle slip is performed using a phase compensation amount that is determined in accordance with the modulation format. Namely, the phase compensation amount is a predetermined discrete value. In the eighth embodiment, when a phase cycle slip is detected, the phase compensation amount in the phase cycle slip compensation that is performed for a complex digital signal is set to a value that corresponds to an estimation error phase.

Figure 22:
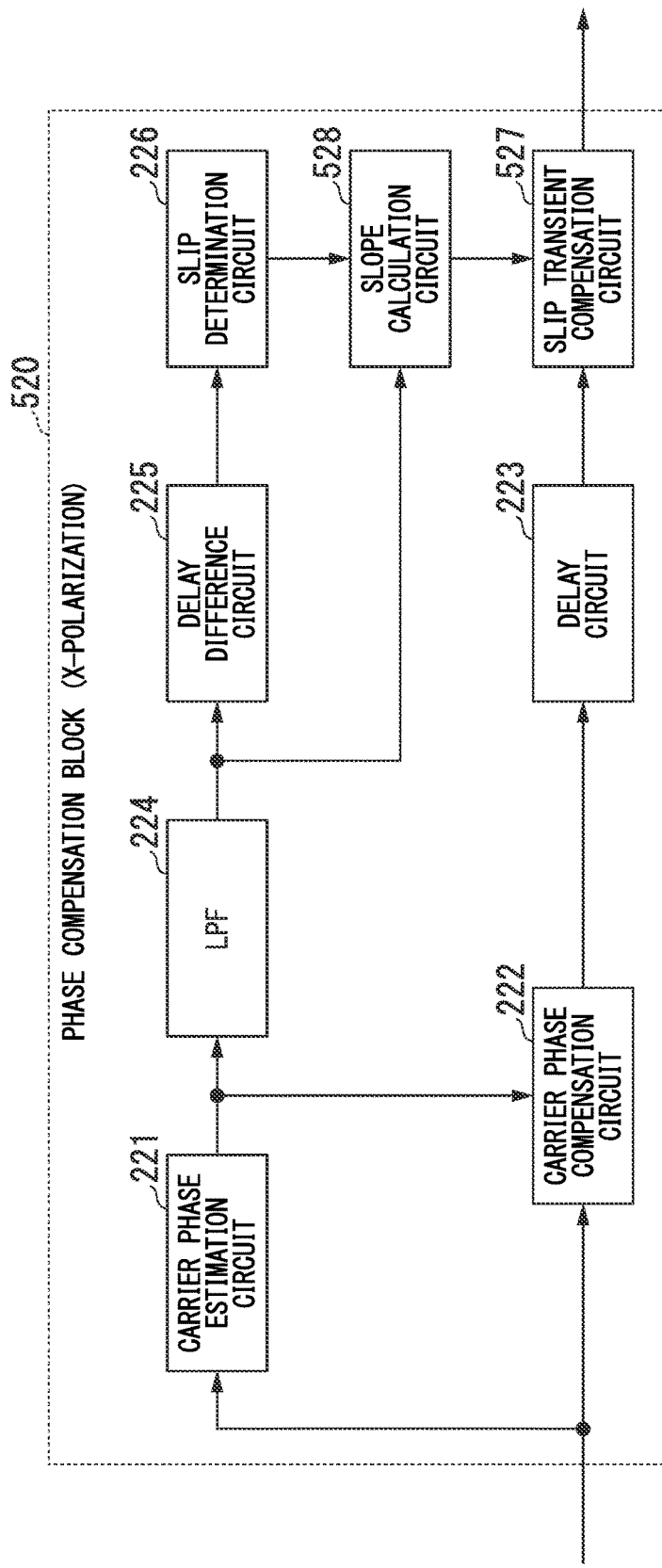
FIG. 22 is a block diagram showing the structure of a phase compensation block according to an eighth embodiment of the present invention.

FIG. 22 is a block diagram showing the structure of a phase compensation block 520 according to the eighth embodiment. Here, a phase compensation block 520 for X-polarization is shown, however, the same phase compensation block 520 is also used for Y-polarization. The phase compensation block 520 has a carrier phase estimation circuit 221, a carrier phase compensation circuit 222, a delay circuit 223, a low-pass filter 224, a delay difference circuit 225, a slip determination circuit 226, a slip transient compensation circuit 527, and a slope calculation circuit 528.

The phase compensation block 520 differs from the phase compensation block 220 according to the fifth embodiment (see FIG. 10) in that it has the slip transient compensation circuit 527 instead of the slip compensation circuit 227, and in that it has the slope calculation circuit 528. Note that in the phase compensation block 520, any structure that is the same as in the fifth embodiment is given the same descriptive symbols and a description thereof is omitted.

Based on compensation amount differences input from the slope calculation circuit 528, the slip transient compensation circuit 527 updates the phase compensation amount for the complex digital signals that are output from the delay circuit 223. The phase compensation amount has an initial value of, for example, 0°, and is updated based on the compensation amount differences.

Estimation error phases output from the low-pass filter 224, and slip determination signals output from the slip determination circuit 226 are input into the slope calculation circuit 528. When it is determined that a phase cycle slip has occurred, the slope calculation circuit 528 calculates the compensation amount difference in the rotation direction indicated by the slip determination signal, and outputs the calculated compensation amount difference to the slip transient compensation circuit 527. The slope calculation circuit 528 calculates the compensation amount difference based on the estimation error phase.

For example, the slope calculation circuit 528 sets as the compensation amount difference a value obtained by multiplying the estimation error phase by a predetermined coefficient. This predetermined coefficient may be 1. Moreover, the range over which a compensation amount difference can be obtained is a range that corresponds to the modulation format. For example, if the modulation format is QPSK or QAM, then this range is $0 \sim \pi/2$ for a phase cycle slip in a positive rotation direction, and is $-\pi/2 \sim 0$ for a phase cycle slip in a negative rotation direction.

In this way, by deciding the amount of change in the phase compensation amount when a phase cycle slip occurs in accordance with the estimation error phase, is possible to reduce the amount of change in the phase in a complex digital signal that is generated when the phase compensation is performed. As a consequence of this, it is possible to suppress the effects on signal processing downstream from the phase compensation circuit 22, and to improve the accuracy of detection and compensation of a phase cycle slip.

Note that in the present embodiment, the delay amount in the delay circuit 223 may also be a larger value than the time required for the processing from the low-pass filter 224 to the slope calculation circuit 528 (i.e., the number of symbols). By doing this, it is possible, over a period from before the point when it was determined that a phase cycle slip had occurred until after that point, to perform phase compensation using phase compensation amounts that correspond to the estimation error phase for complex digital signals output from the delay circuit 223. For example, phase compensation can be performed over the period enclosed by the broken line in FIG. 7.

Note also that in each of the above-described embodiments, a structure is described in which carrier phases are estimated and compensated blindly using only data symbols, however, it is also possible to use time-multiplexed pilot symbols in combination with the data symbols. By doing this, it is possible to improve the carrier phase estimation accuracy.

Moreover, in each of the above-described fourth through eighth embodiments, a structure is described in which the low-pass filter 224 smoothes out the delay difference values d. However, instead of this smoothing being performed by the low-pass filter 224 in the phase compensation circuit 22, it is also possible to take as the delay difference value d an average value of the difference between the current estimation phase error and a plurality of past estimation phase errors in the delay difference circuit 225. For example, the delay difference value d may be calculated from the N symbol number of prior estimation phase errors and a plurality of past estimation phase errors that include the estimation phase errors both before and after the N symbol number of prior estimation phase errors. By doing this, the same type of processing as is performed by the low-pass filter 224 can be achieved.

Moreover, in each of the above-described fourth through eighth embodiments, a structure is described in which phase compensation blocks having the same structure are used for both X-polarization and Y-polarization, however, it is also possible to employ a combination of phase compensation blocks having different structures from among the phase compensation blocks in the respective embodiments for the X-polarization and the Y-polarization.

Moreover, it is also possible to use a combination of the respective structures of each of the above-described fourth through eighth embodiments. For example, in the seventh and eighth embodiments it is also possible to employ a structure in which the threshold value calculation circuit 328 that was shown in the sixth embodiment is provided. If the threshold value calculation circuit 328 is utilized in the seventh embodiment, then a threshold value calculation circuit 328 is provided for each one of the plurality of delay difference circuits 225. Moreover, in the eighth embodiment, it is also possible for a plurality of delay difference circuits 228 to be provided.

Note that a program that is used to perform the functions of the digital signal processing unit 18 in each of the above-described fourth through eighth embodiments can be packaged onto a custom LSI (ASIC) or FPGA so as to enable these to be achieved.

Moreover, it is also possible to record this program on a computer-readable recording medium, and to perform processing to acquire data from complex digital signals by causing a computer system to read and execute the program recorded on this recording medium. Note that the term 'computer system' used here includes both OS and hardware such as peripheral devices and the like. Moreover, the term 'computer system' may also include a WWW system which is provided with a homepage providing environment (or display environment). Moreover, the term 'computer readable recording medium' also refers to portable media such as flexible disks, magneto-optical disks, ROM, and CD-ROM and the like, and storage devices such as hard disks that are built into a computer system. Furthermore, the term 'computer readable recording medium' also includes devices that hold a program for a fixed time such as the internal volatile memory (RAM) in a computer system which forms the server or client when the program is transmitted via a network such as the Internet or via a communication line such as a telephone line.

Moreover, the aforementioned program may also be transmitted from a computer system in which the program is stored on a storage device or the like to another computer system via a transmission medium, or via a transmission wave within the transmission medium. Here, the term 'transmission medium' which transmits the program refers to a medium having a function of transmitting information such as a network such as the Internet or a communication line such as a telephone line. Moreover, the above described program may also be designed to fulfill a portion of the above described functions. Furthermore, the aforementioned program may also achieve the above described functions in combination with a program which is already recorded on the computer system, namely, may be what is known as a differential file (i.e., a differential program).

Ninth Embodiment

Figure 23:
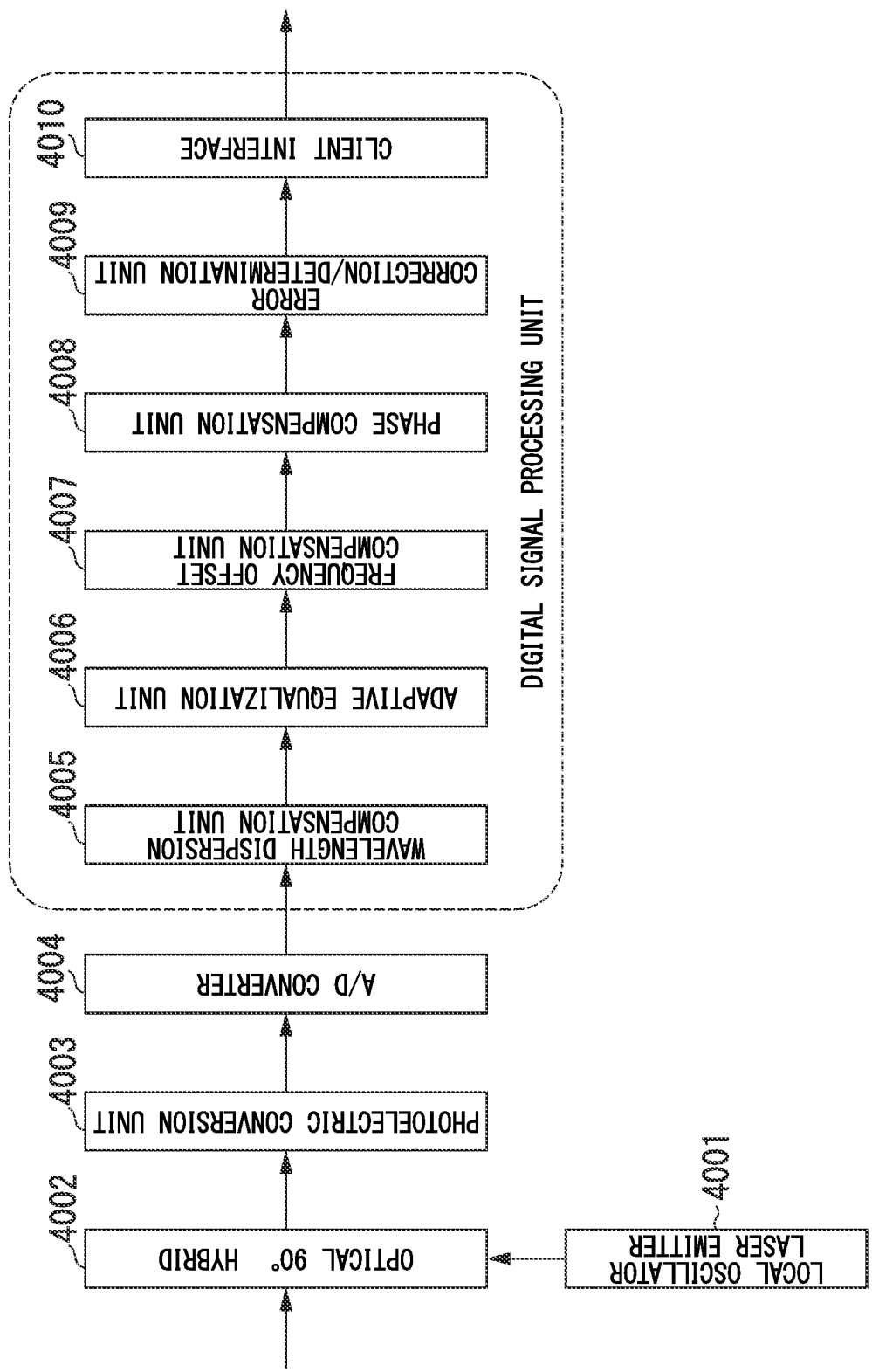
FIG. 23 is a block diagram showing an example of the structure of a receiver device according to a ninth embodiment of the present invention.

FIG. 23 is a block diagram showing an example of the structure of a receiver device according to a ninth embodiment. In the receiver device shown in FIG. 23, the present invention is applied to a digital coherent transmission system. Optical signals transmitted on an optical fiber transmission path are input into the receiver device. The receiver device acquires data contained in the input optical signals, and outputs this acquired data to devices and the like that are connected downstream from it. The receiver device is equipped with a local oscillator laser emitter 4001, an optical 90 degree hybrid 4002, a photoelectric conversion unit 4003, an A/D converter 4004, a wavelength dispersion compensation unit 4005, an adaptive equalization unit 4006, a frequency offset compensation unit 4007, a phase compensation unit 4008, an error correction/determination unit 4009, and a client interface 4010.

The optical signals input into the receiver device are input into the optical 90 degree hybrid 4002. They are then mixed with a local oscillation laser output by the local oscillator laser emitter 4001 in the optical 90 degree hybrid 4002 so as to form a homodyne detection wave or a heterodyne detection wave. The optical signal obtained from this detection wave is then converted into a baseband analog electrical signal in the photoelectric conversion unit 4003. This analog electrical signal is then digitalized in the A/D converter 4004, and is then output to the wavelength dispersion compensation unit 4005. The digital signal output from the A/D converter 4004 is a signal showing a symbol that is expressed as a complex number having an in-phase component I and a quadrature component Q.

The wavelength dispersion compensation unit 4005 compensates waveform distortion that is caused by wavelength dispersion in the symbols that are input from the A/D converter 4004. The adaptive equalization unit 4006 compensates distortion that is generated by linear polarization crosstalk and by polarization mode dispersion and the like in the symbols whose waveform distortion has been compensated in the wavelength dispersion compensation unit 4005. The frequency offset compensation unit 4007 compensates the effects of frequency offset that occurs between transmitting devices that transmit optical signals and the receiver device in the symbols whose distortion has been compensated by the adaptive equalization unit 4006. This frequency offset is caused, for example, by frequency shift in the local oscillation lasers used by the transmission devices and the receiver device.

The phase compensation unit 4008 performs phase compensation on symbols whose frequency offset has been compensated in the frequency offset compensation unit 4007, so as to reduce the occurrence of phase cycle slip. The error correction/determination unit 4009 demodulates symbols whose phase has been compensated in the phase compensation unit 4008, and after performing error detection and error correction on the data obtained from this demodulation, it inputs the data into the client interface 4010. The client interface 4010 converts data input from the error correction/determination unit 4009 in accordance with the signal format and frame structure that are used in devices connected downstream from the receiver device, and then outputs the converted data.

In the receiver device, in the digital signal processing unit that includes the wavelength dispersion compensation unit 4005 through to the client interface 4010, received optical signals are converted into electrical signals using coherent detection, and the reception signals obtained by converting these electrical signals into digital signals are input. The reception signals input into the digital signal processing unit are signals that show a symbol string in which data has been mapped based on the modulation format used in the transmission device. In the receiver device, waveform distortion and noise that have been added by the optical fiber transmission path, the transmission device, and the receiver device are either reduced or compensated in the wavelength dispersion compensation unit 4005 and the adaptive equalization unit 4006. The phase compensation unit 4008 to which the present invention has been applied is intended to estimate phase noise superimposed on the carrier wave, and then remove or reduce this phase noise.

Figure 24:
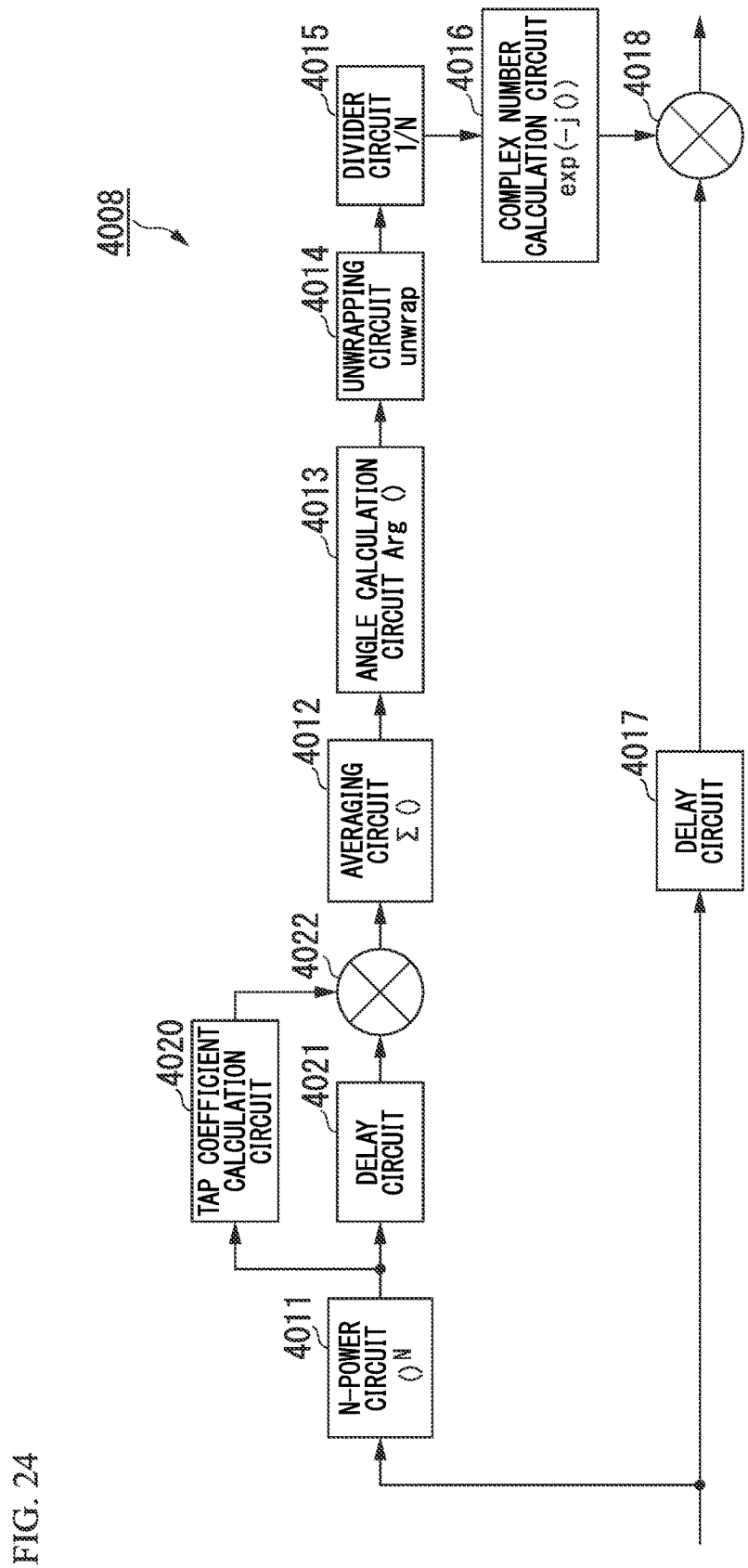
FIG. 24 is a block diagram showing an example of the structure of a phase compensation unit according to the ninth embodiment.

FIG. 24 is a block diagram showing an example of the structure of the phase compensation unit 4008 according to the present embodiment. The phase compensation unit 4008 is provided with an N-power circuit 4011, an averaging circuit 4012, an angle calculation circuit 4013, an unwrapping circuit 4014, a divider circuit 4015, a complex number calculation circuit 4016, a delay circuit 4017, a multiplier circuit 4018, a tap coefficient calculation circuit 4020, a delay circuit 4021, and a multiplier circuit 4022. Compared with a conventional phase compensation unit, the phase compensation unit 4008 is additionally provided with the tap coefficient calculation circuit 4020, the delay circuit 4021, and the multiplier circuit 4022.

Results of operations performed by the N-power circuit 4011 are input into the tap coefficient calculation circuit 4020. The tap coefficient calculation circuit 4020 calculates a tap coefficient based on the input operation results (i.e., on symbols raised to the N-th power). Operation results from the N-power circuit 4011 are input into the delay circuit 4021. The delay circuit 4021 attaches a delay to the input operation results, and inputs the operation results into the multiplier circuit 4022 at the same timing as the corresponding tap coefficient. The symbol to which the delay was attached in the delay circuit 4021 and the tap coefficient calculated by the tap coefficient calculation circuit 4020 are input into the multiplier circuit 4022.

The multiplier circuit 4022 multiplies the input symbol by the tap coefficient, and outputs the result of this multiplication to the averaging circuit 4012.

In the feed-forward-type tap coefficient calculation circuit 4020, a feed-forward structure is achieved by using a portion of the tap coefficients used in the X symbol number of prior carrier phase estimations for the current carrier phase estimation. For example, the tap coefficients used in the X symbol number of prior carrier phase estimations are shifted by X taps, and "1" is set as the initial value of the dropped X taps and these are used for the current carrier phase estimation. X is an integer of 1 or more, and the upper limit is roughly the storage length of the phase noise. Moreover, the tap coefficient is a real number of not less than 0 and not more than 1. The storage length of the phase noise corresponds to the length of time that coherence can be maintained. For example, the coherence time is used as an index to show the length of time that coherence can be maintained, and the coherence time is an inverse function of the width of the phase noise of the light source.

In the present specification, because the processing can be accomplished solely by means of the tap shift processing in the phase compensation unit 408 without the X symbol number of prior carrier phase estimations being used, this structure is referred to here as a feed-forward structure.

Figure 25:
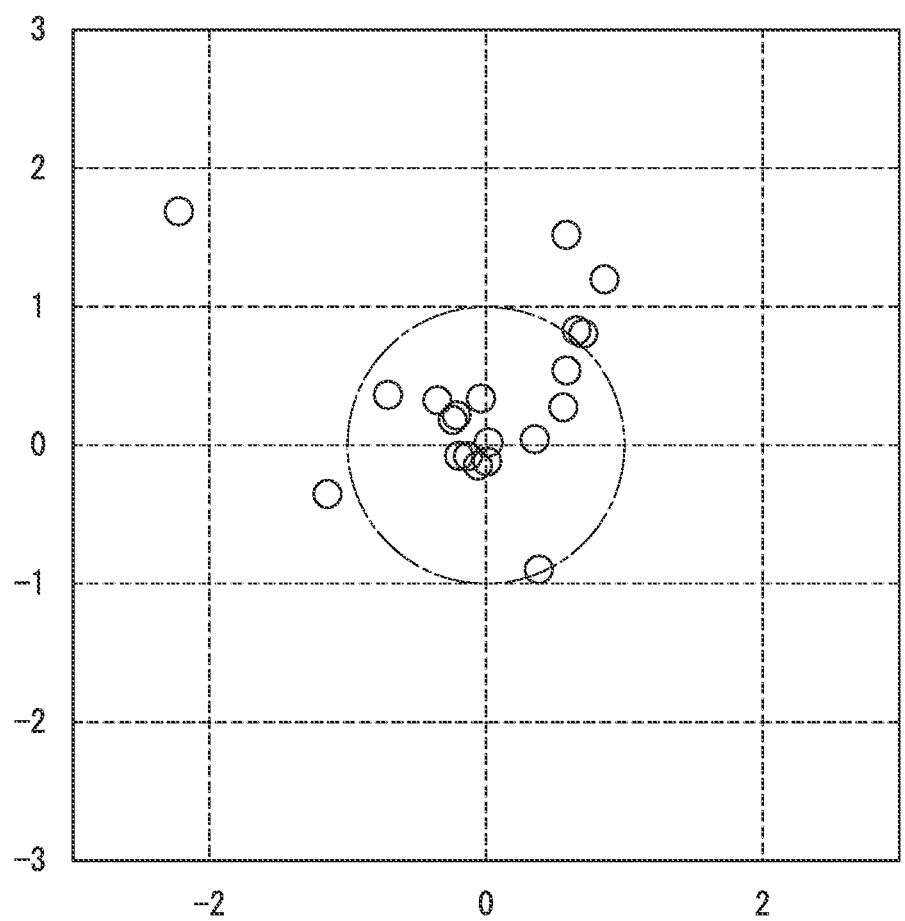
FIG. 25 is a graph showing an example of a constellation map after a symbol has been multiplied N times by an N multiplier circuit according to the ninth embodiment.

FIG. 25 shows an example of a constellation map after the symbols have been raised to the N-th power in the N-power circuit 4011 according to the present embodiment. In order to estimate the carrier phase of a single symbol, M number of symbols before and after that particular symbol are used and these have been plotted on the graph. This M number of symbols are subsequently arithmetically added together on a complex plane, however, in the amplitude shown by these symbols a disparity can be seen in the effects received during transmission from noise and interference and the like. In particular, when the amplitude of symbols that have been greatly affected by noise and interference and the like, is drastically greater than the amplitude of the other symbols, there is a considerable effect on the average of this M number of symbols. Because of this, there are cases when the carrier estimation phase values are hugely different from their true values, and this becomes one factor that causes phase cycle slip to occur.

Figure 26:
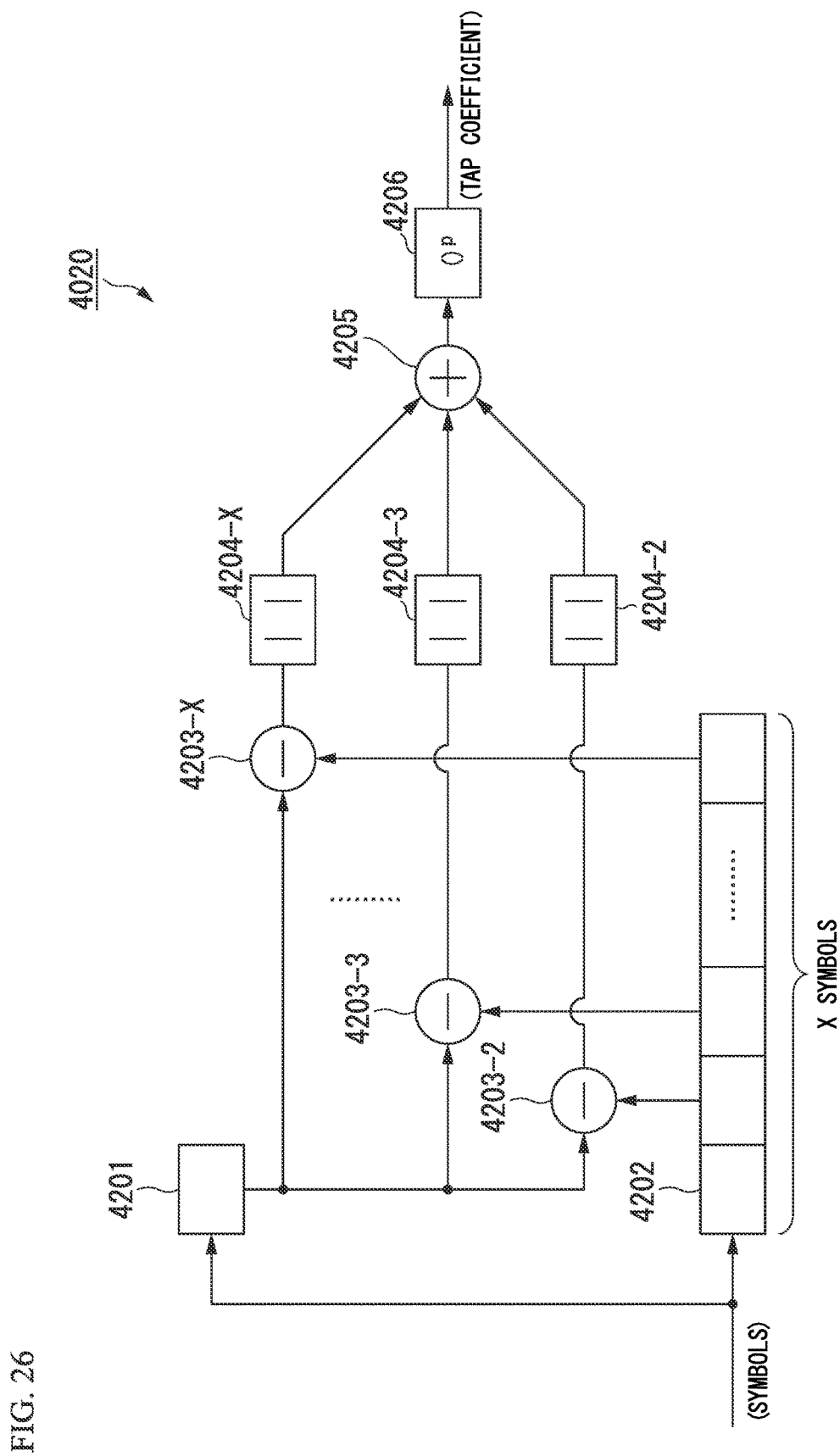
FIG. 26 is a block diagram showing an example of the structure of a tap coefficient calculation circuit according to the ninth embodiment.

FIG. 26 is a block diagram showing an example of the structure of the tap coefficient calculation circuit 4020 according to the present embodiment. The tap coefficient calculation circuit 4020 has buffers 4201 and 4202, (X−1) number of subtraction devices 4203-2~4203-X, (X−1) number of absolute value calculation devices 4204-2~4204-X, an adding device 4205, and a power device 4206. Symbols input from the N-power circuit 4011 (see FIG. 24) into the tap coefficient calculation circuit 4020 are input into the buffer 4201 and the buffer 4202. The buffer 4201 stores the input symbols, and when a new symbol is input, it updates the stored symbols with the new symbol. The buffer 4202 is able to store X number of input symbols, and when a new symbol is input, it deletes the oldest symbol from among its stored symbols so as to be able to store the new symbol. The buffer 4202 is formed, for example, by a shift register.

The subtraction devices 4203-2~4203-X, and the absolute value calculation devices 4204-2~4204-X are provided respectively for each one of the second newest symbol down to the oldest symbol (i.e., the $X^{th}$ newest symbol) that are stored in the buffer 4202. The subtraction device 4203-2 calculates the difference between the second newest symbol stored in the buffer 4202 and the symbol stored in the buffer 4201, and inputs the calculated difference value into the absolute value calculation device 4204-2. This calculation of the difference between the two symbols when the two calculated symbols are (1+2i) and (3+4i) is performed, for example, by finding the differential value (−2−2i) or (2+2i), wherein i is an imaginary unit. Namely, the calculation of the difference between two symbols represented by complex numbers refers to the respective subtractions of a real portion and an imaginary portion.

The absolute value calculation device 4204-2 calculates an absolute value of the input differential value and outputs this to the adding device 4205. In the same way, the subtraction device 4203-$i$ ($i=3, \ldots, X$) calculates the difference between the $i^{th}$ newest symbol that is stored in the buffer 4202 and the symbols stored in the buffer 4201, and outputs the calculated differential value to the absolute value calculation device 4204-$i$. The absolute value calculation device 4204-$i$ ($i=3, \ldots, X$) calculates the absolute value of the input differential value and outputs this to the adding device 4205.

The adding device 4205 calculates the total sum of the absolute values output from the absolute value calculation devices 4204-2~4204-X, and inputs the calculated total sum into the power device 4206. The power device 4206 outputs the value obtained by raising the input total sum to the $p^{th}$ power to the multiplier circuit 4022 (see FIG. 24) as a tap coefficient that corresponds to the symbols stored in the buffer 4201.

By providing the above-described structure, the tap coefficient calculation circuit 4020 firstly calculates the differences between the input symbol and the (X−1) number of symbols previous thereto, and then calculates the absolute values corresponding to a Euclidean distance on a complex plane, and then outputs the values obtained by raising the respective total sums to the $p^{th}$ power as tap coefficients for the input symbols. Note that in the present embodiment, the Euclidean distance is calculated using the newest symbol as a reference, however, it is also possible to use any one of the X number of symbols. Note also that a predetermined value is used for the exponent p in the power device 4206.

Tenth Embodiment

Figure 27:
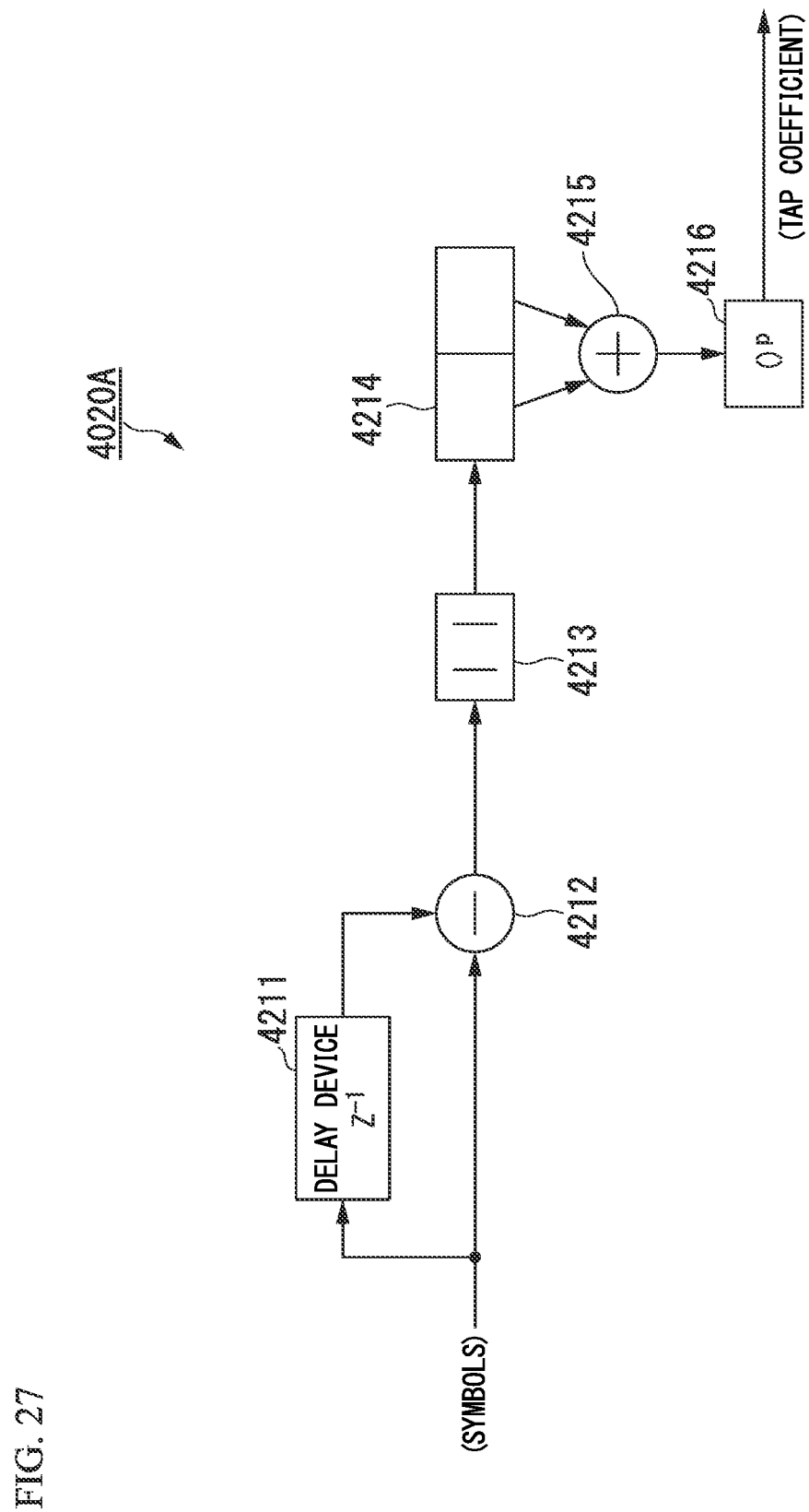
FIG. 27 is a block diagram showing an example of the structure of a tap coefficient calculation circuit according to a tenth embodiment of the present invention.

FIG. 27 is a block diagram showing an example of the structure of a tap coefficient calculation circuit 4020A according to a tenth embodiment. The tap coefficient calculation circuit 4020A is used instead of the tap coefficient calculation circuit 4020 in the phase compensation unit 4008 (see FIG. 24). The tap coefficient calculation circuit 4020A has a delay device 4211, a subtraction device 4212, an absolute value calculation device 4213, a buffer 4214, an adding device 4215, and a power device 4216. Symbols input from the N-power circuit 4011 (see FIG. 24) into the tap coefficient calculation circuit 4020A are input into the delay device 4211 and the subtraction device 4212. The delay device 4211 stores the input symbols, and inputs the symbol immediately before an input symbol into the subtraction device 4212. The subtraction device 4212 calculates a differential value between the symbol input from the N-power circuit 4011 and the symbol input from the delay device 4211, and inputs the calculated differential value into the absolute value calculation device 4213.

The absolute value calculation device 4213 calculates the absolute value of the differential value input from the subtraction device 4212, and outputs this to the buffer 4214. The buffer 4214 is able to store X number of absolute values calculated by the absolute value calculation device 4213. When a new absolute value is calculated, the buffer 4214 deletes the oldest absolute value from among the stored absolute values, and stores the new absolute value. The buffer 4214 may be formed, for example, by a shift register. Note that in FIG. 27, a structure in which X=2 is shown.

The adding device 4215 calculates the total sum of the absolute values stored in the buffer 4214, and inputs the calculated total sum into the power device 4216. The power device 4216 outputs the value obtained by raising the input total sum to the $p^{th}$ power to the multiplier circuit 4022 (see FIG. 24) as a tap coefficient that corresponds to the input symbol.

By providing the above-described structure, in the tap coefficient calculation circuit 4020A, the Euclidean distance between the previous and subsequent L=1 number of symbols is calculated, and the values obtained by raising the respective total sums to the $p^{th}$ power are then used as tap coefficients for the input symbols.

Eleventh Embodiment

Figure 28:
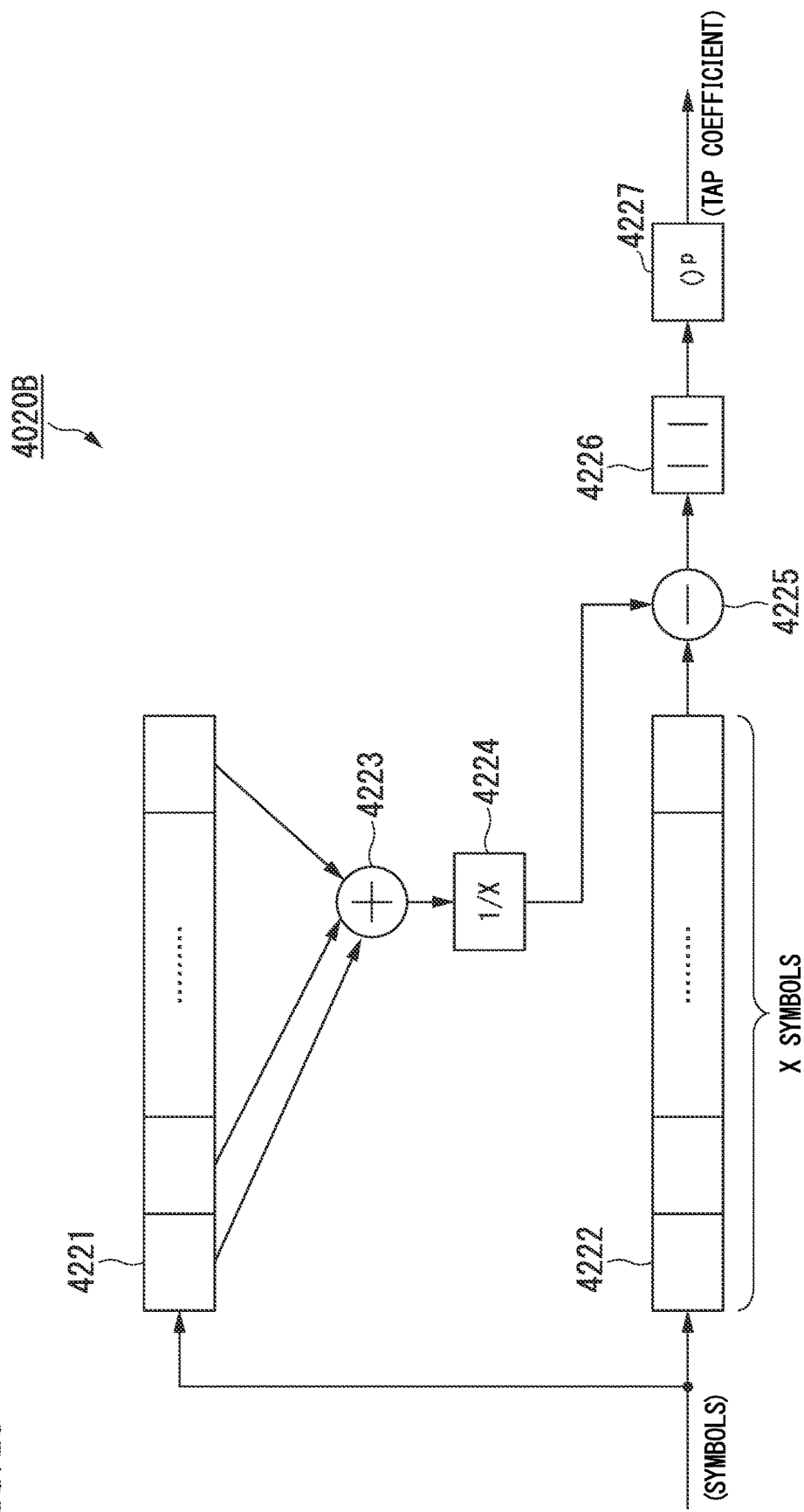
FIG. 28 is a block diagram showing an example of the structure of a tap coefficient calculation circuit according to an eleventh embodiment of the present invention.

FIG. 28 is a block diagram showing an example of the structure of a tap coefficient calculation circuit 4020B according to an eleventh embodiment. The tap coefficient calculation circuit 4020B is used instead of the tap coefficient calculation circuit 4020 in the phase compensation unit 4008 (see FIG. 24). The tap coefficient calculation circuit 4020B has buffers 4221 and 4222, an adding device 4223, a dividing device 4224, a subtraction device 4225, an absolute value calculation device 4226, and a power device 4227. Symbols input from the N-power circuit 4011 (see FIG. 24) into the tap coefficient calculation circuit 4020B are input into the buffers 4221 and 4222. Because the buffers 4221 and 4222 have the same structure as the buffer 4202 according to the ninth embodiment, a description thereof is omitted here.

The adding device 4223 calculates the total sum of the X number of symbols stored in the buffer 4221.

The dividing device 4224 divides the total sum of the X number of symbols calculated by the adding device 4223 by X. The result of this division corresponds to a central point on a complex plane of the X number of symbols.

The subtraction device 4225 calculates a differential value between the X number of symbols stored in the buffer 4222 and the calculated central point, and inputs the calculated differential value into the absolute value calculation device 4226. The absolute value calculation device 4226 calculates the absolute value of the input differential value, and inputs the calculated absolute value into the power device 4227. The power device 4227 outputs the value obtained by raising the input absolute value to the $p^{th}$ power to the multiplier circuit 4022 (see FIG. 24) as a tap coefficient for the $(X/2)^{th}$ central symbol from among the X number of symbols that are stored in the buffer 4221.

By providing the above-described structure, in the tap coefficient calculation circuit 4020B, duplicates of the input X number of symbols are created and are input into two branches. The total sum of the X number of symbols input into one branch is divided by X, and the central point on a complex plane is calculated. The absolute value of the difference between the central point and each one of the X number of symbols input into the other branch is then calculated, and the Euclidean distance between them and the central point is calculated. The values obtained by raising the calculated Euclidean distances to the $p^{th}$ power are then used as tap coefficients for the central symbol from among the X number of symbols.

Note that in the present embodiment, a structure is described in which the center of mass is calculated as the central point for the X number of symbols, however, it is also possible to calculate a weighted central point as this central point. Moreover, it is also possible to calculate a statistical value such as the mode, the median, or the mean of the X number of symbols instead of the central point. It is also possible for the subtraction device 4225 to calculate the difference between the central point and each one of the X number of symbols stored in the buffer 4222, and for the power device 4227 to calculate the $p^{th}$ power for the total sum of the absolute values of the calculated X number of differential values. Moreover, instead of calculating the tap coefficient for the central symbol from among the X number of symbols stored in the buffer 4222, it is also possible for the tap coefficient for an arbitrary symbol from among the X number of symbols to be calculated. Namely, it is also possible to calculate the tap coefficient based on consecutive X number of symbols that include the symbol whose tap coefficient is to be calculated.

Twelfth Embodiment

Figure 29:
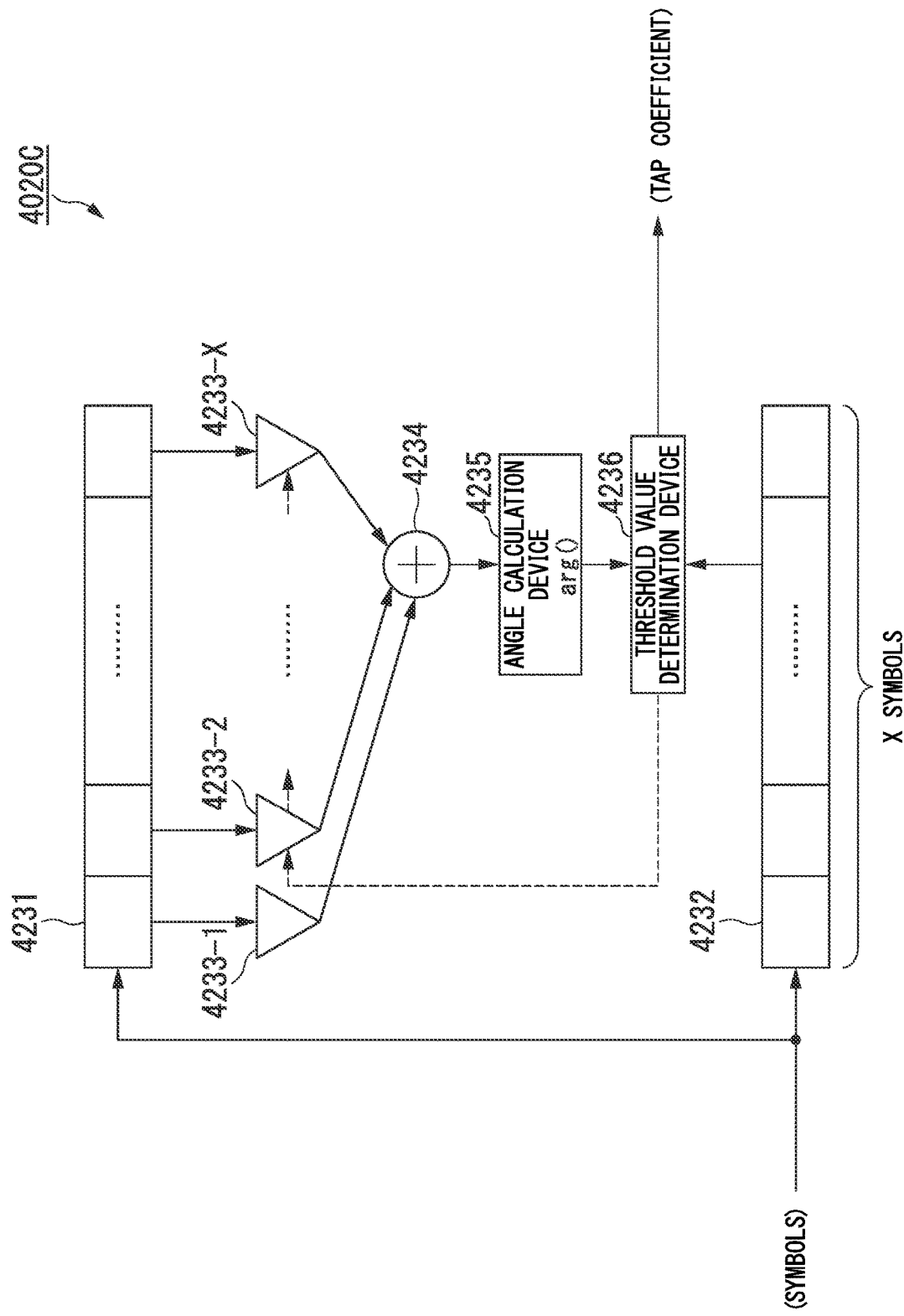
FIG. 29 is a block diagram showing the structure of a tap coefficient calculation circuit according to a twelfth embodiment of the present invention.

FIG. 29 is a block diagram showing an example of the structure of a tap coefficient calculation circuit 4020C according to a twelfth embodiment. The tap coefficient calculation circuit 4020C is used instead of the tap coefficient calculation circuit 4020 in the phase compensation unit 2008 (see FIG. 2423). The tap coefficient calculation circuit 4020C has buffers 4231 and 4232, X number of coefficient multiplier devices 4233-1~4233-X, an adding device 4234, an angle calculation device 4235, and a threshold value determination device 4236. Symbols input from the N-power circuit 4011 (see FIG. 24) into the tap coefficient calculation circuit 4020C are input into the buffers 4231 and 4232. Because the buffers 4231 and 4232 have the same structure as the buffer 4202 according to the ninth embodiment, a description thereof is omitted here.

The coefficient multiplier devices 4233-1~4233-X are provided so as to correspond to the X number of symbols stored in the buffer 4231. Here, the coefficient multiplier device 4233-1 corresponds to the newest symbol from among the X number of symbols, and the coefficient multiplier devices 4233-2~4233-X correspond to the second newest symbol through to the $X^{th}$ newest symbol. The coefficient multiplier device 4233-1 multiplies a predetermined tap coefficient, for example, 1 by the newest symbol and outputs the result to the adding device 4234. The coefficient multiplier device 4233-2 multiplies a tap coefficient determined by the threshold value determination device 4236 for the previous symbol by the second newest symbol, and outputs the result to the adding device 4234.

In the processing to calculate the tap coefficient for the previous symbol, the coefficient multiplier device 4233-$i$ ($i$=3, . . . , X) uses the tap coefficient that was multiplied by the symbol by the coefficient multiplier device 4233-($i$−1). The coefficient multiplier 4233-$i$ multiplies the tap coefficient by the corresponding symbol in the buffer 4231, and outputs the result to the adding device 4234. The adding device 4234 calculates the total sum of the multiplication results output from each of the coefficient multiplier devices 4233-1~4233-X, and inputs the calculated total sum to the angle calculation device 4235. The total sum calculated by the adding device 4234 is a symbol that shows a weighted central point that has been weighted using the tap coefficients for X number of symbols.

The angle calculation device 4235 calculates an angle of deviation of the symbols input from the adding device 4234, and inputs the calculated angle of deviation into the threshold value determination device 4236. The threshold value determination device 4236 makes determinations for the symbols stored in the buffer 4232 using the angle of deviation input from the angle calculation device 4235 as a reference angle. In the determination performed by the threshold value determination device 4236, the angle of deviation of the symbols stored in the buffer 4232 is calculated, and a determination is made as to whether or not the calculated angle of deviation is separated from the reference angle by more than a threshold angle. If the calculated angle of deviation is separated from the reference angle by more than the threshold angle, the threshold value determination device 4236 sets the tap coefficient to 0, while if the calculated angle of deviation is not separated from the reference angle by more than the threshold angle, the threshold value determination device 4236 sets the tap coefficient to 1. The tap coefficient set by the threshold value determination device 4236 is output to the multiplier circuit 4022 (see FIG. 24), and is also output to the coefficient multiplier circuit 4233-2.

By providing the above-described structure, in the tap coefficient calculation circuit 4020C, duplicates of the input X number of symbols are made, and are input into two branches. In one branch, the tap coefficient used for the carrier phase estimation of the previous symbol is multiplied by each one of the X number of symbols. Next, the total sum of the respective multiplication results is obtained and the angle of deviation is calculated. The calculated angle of deviation is used as a reference angle for symbols input into the other branch. In the threshold value determination device 4236, a determination is made as to whether or not the angle of deviation in each input symbol is separated from the reference angle by more than a threshold angle. If it is separated from the reference angle by more than the threshold angle, then 0 is output as the tap coefficient, and if it is not separated from the reference angle by more than the threshold angle, then 1 is output as the tap coefficient. The output tap coefficient is used for the carrier phase estimation of the current symbol. Moreover, the tap coefficient takes over as the tap coefficient that is used to calculate the reference angle for the next symbol.

Note that the threshold angle is determined, for example, in accordance with the line width of the transmission laser light or the reception local oscillation laser (i.e., the extent of the spectrum in the frequency region), and it may also be a variable value.

Thirteenth Embodiment

Figure 30:
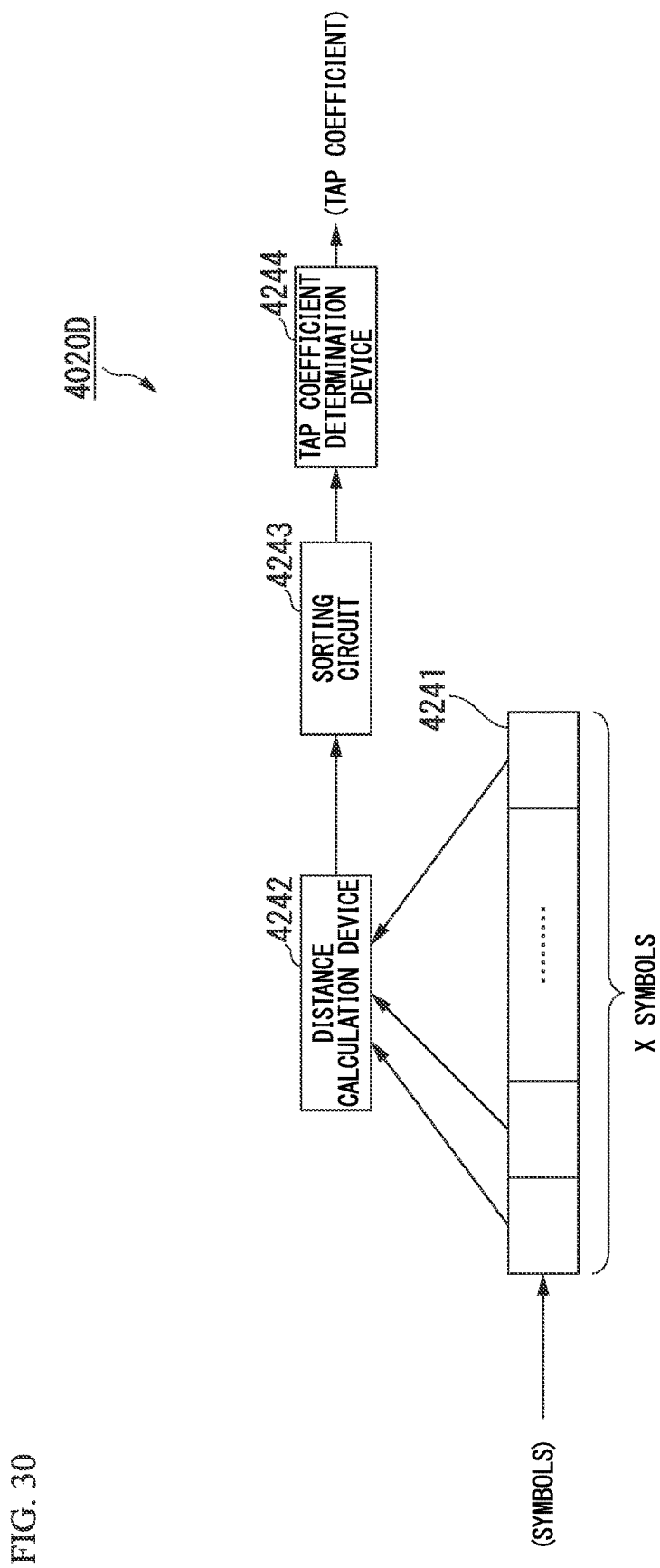
FIG. 30 is a block diagram showing the structure of a tap coefficient calculation circuit according to a thirteenth embodiment of the present invention.

FIG. 30 is a block diagram showing an example of the structure of a tap coefficient calculation circuit 4020D according to a thirteenth embodiment. The tap coefficient calculation circuit 4020D is used instead of the tap coefficient calculation circuit 4020 in the phase compensation unit 4008 (see FIG. 24). The tap coefficient calculation circuit 4020D has a buffer 4241, a distance calculation device 4242, a sorting circuit 4243, and a tap coefficient determination device 4244. Symbols input from the N-power circuit 4011 (see FIG. 24) into the tap coefficient calculation circuit 4020D are input into the buffer 4241. Because the buffer 4241 has the same structure as the buffer 4202 according to the ninth embodiment, a description thereof is omitted here.

The distance calculation device 4242 subtracts (X−1) number of differential values (i.e., Euclid distances) from the X number of symbols stored in the buffer 4241, and inputs the subtracted (X−1) number of differential values into the sorting circuit 4243. This calculation of the (X−1) number of differential values in the distance calculation device 4242 is performed in the same way as the calculation of the differential values in the tap coefficient calculation circuit 4020 in the ninth embodiment. Namely, using the newest symbol as a reference, the difference between this and the other (X−1) number of symbols is calculated. Alternatively, in the same way as in the calculation of the differential values in the tap coefficient calculation circuit 4020A of the tenth embodiment, it is also possible to calculate the differential value between mutually adjacent symbols. Moreover, in the same way as in the calculation of the differential values in the tap coefficient calculation circuit 4020B of the eleventh embodiment, it is also possible to calculate a central point of X number of symbols, and then calculate X number of differential values from the calculated central point and the X number of symbols.

The sorting circuit 4243 rearranges the (X−1) number of differential values input from the distance calculation device 4242 in an ascending sequence. The sorting circuit 4243 attaches to the differential values an identification number showing the number of the symbol in the input sequence that each differential value corresponds to, and outputs the result to the tap coefficient determination device 4244.

The tap coefficient determination device 4244 sets the tap coefficient for a high-order K number of symbols, which have a large differential value, to 0, and sets the tap coefficient for the other symbols (i.e., a low-order (X−1−K) number of symbols) to 1. Based on the identification numbers attached to the differential values, the tap coefficient determination device 4244 rearranges the set tap coefficients such that they match the symbol sequence, and then outputs them in this sequence to the multiplier circuit 4022 (see FIG. 24).

By providing the above-described structure, in the tap coefficient calculation circuit 4020D, the Euclid distances are calculated by the distance calculation device 4242 for M number of input symbols, and the tap coefficients for the high-order K number of Euclid distances when these Euclid distances are rearranged in an ascending sequence are output as 0, while the tap coefficients for the low-order (X−1−K) number of Euclid distances are output as 1.

Note that when the distance calculation device 4244 is calculating X number of differential values, the tap coefficient determination device 4244 sets the tap coefficient for the symbols that correspond to the high-order K number of differential values to 0, and sets the tap coefficient for the symbols that correspond to the low-order (X−K) number of differential values to 1. Moreover, it is also possible for the tap coefficient determination device 4244 to output to the divider circuit 4022 (see FIG. 24) the tap coefficient for the newest symbol instead of outputting a plurality of tap coefficients. Alternatively, it is also possible for the tap coefficient determination device 4244 to output to the divider circuit 4022 (see FIG. 24) a tap coefficient for a symbol that is stored in a predetermined position in the buffer 4241.

Fourteenth Embodiment

Figure 31:
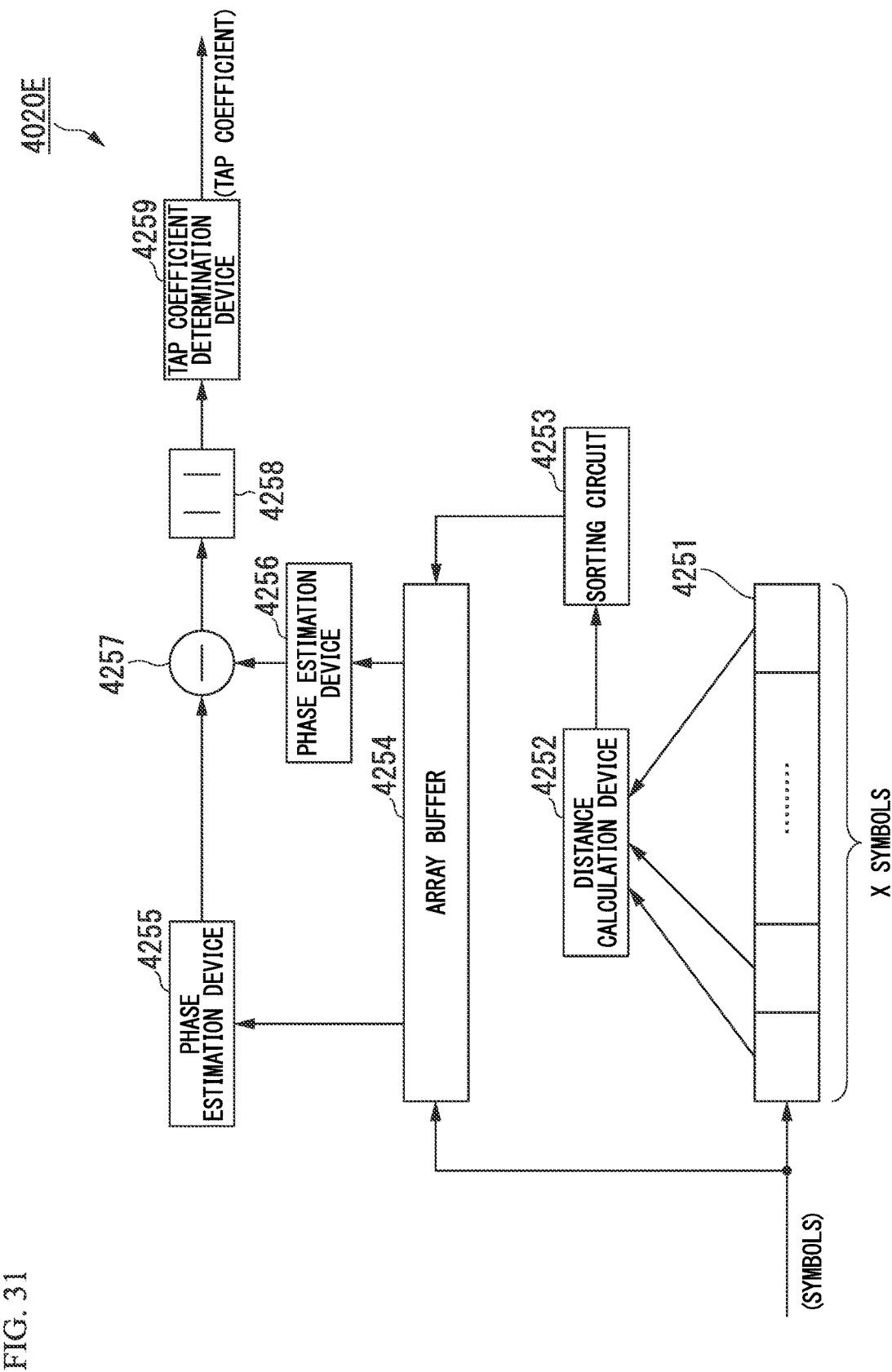
FIG. 31 is a block diagram showing the structure of a tap coefficient calculation circuit according to a fourteenth embodiment of the present invention.

FIG. 31 is a block diagram showing the structure of a tap coefficient calculation circuit 4020E according to a fourteenth embodiment. The tap coefficient calculation circuit 4020E is used instead of the tap coefficient calculation circuit 4020 in the phase compensation unit 4008 (see FIG. 24). The buffer coefficient calculation circuit 4020E has a buffer 4251, a distance calculation device 4252, a sorting circuit 4253, an array buffer 4254, phase estimation devices 4255 and 4256, a subtraction device 4257, an absolute value calculation device 4258, and a tap coefficient determination device 4259. Symbols input into the tap coefficient calculation circuit 4020E from the N-power circuit 4011 (see FIG. 24) are input into the buffer 4251 and the array buffer 4254. Because the buffer 4251 has the same structure as the buffer 4202 according to the ninth embodiment, a description thereof is omitted here.

In the same way as the distance calculation device 4242 according to the thirteenth embodiment, the distance calculation device 4252 calculates (X−1) number of differential values (i.e., Euclid distances) from the X number of symbols stored in the buffer 4251. The distance calculation device 4252 inputs the calculated (X−1) number of Euclid distances into the sorting circuit 4253. The sorting circuit 4253 rearranges the Euclid distances input from the distance calculation device 4252 in ascending sequence. The sorting circuit 4243 attaches to the Euclid distances an identification number showing the number of the symbol in the input sequence that each Euclid distance corresponds to, and inputs the result to the array buffer 4254.

The array buffer 4254 is able to store X number of input symbols. When a new symbol is input, the array buffer 4254 deletes the oldest symbol from among the stored symbols, and stores the new symbol. Moreover, the array buffer 4254 stores the Euclid distances whose sequence has been rearranged by the sorting circuit 4253. The array buffer 4254 rearranges (X−1) number of symbols from among the stored X number of symbols so that they match the sequence of the stored Euclid distances. The rearranged (X−1) number of symbols are obtained by removing either the newest symbol or the oldest symbol from the X number of symbols. Note that when the distance calculation device 4252 is calculating X number of differential values (i.e., Euclid distances), the sequence of the input X number of symbols is rearranged by the array buffer 4254.

The phase estimation device 4255 performs phase estimation using a high-order K number of symbols, which have a large differential value, from among the symbols that are stored in the array buffer 4254 and that have been rearranged in sequence. Specifically, the average of the K number of symbols is calculated, and the angle of deviation of the average value is calculated. The angle of deviation is calculated by means of arctan (Q/I) with the in-phase component of the average value taken as I, and the quadrature component taken as Q. The phase estimation device 4256 performs phase estimation using a high-order (K+1) number of symbols, which have a large differential value, from among the symbols that are stored in the array buffer 4254 and that have been rearranged in sequence. The subtraction device 4257 calculates an angular difference between a phase estimation angle calculated by the phase estimation device 4255 and a phase estimation angle calculated by the phase estimation device 4256. The subtraction device 4257 inputs the calculated angular difference into the absolute value calculation device 4258.

The absolute value calculation device 4258 calculates the absolute value of the angular difference input from the subtraction device 4257, and inputs the calculated absolute value into the tap coefficient determination device 4259. The tap coefficient determination device 4259 compares the absolute value input from the absolute value calculation device 4258 with a predetermined angle threshold value $\alpha$. If the absolute value is equal to or greater than the angle threshold value $\alpha$, the tap coefficient determination device 4259 sets the tap coefficient to 0, while if the absolute value $\alpha$ is less than the angle threshold value, the tap coefficient determination device 4259 sets the tap coefficient to 1. The tap coefficient determination device 4259 outputs the set tap coefficient to the multiplier circuit 4022 (see FIG. 24). The tap coefficient output by the tap coefficient determination device 4259 is, for example, the symbol from among the symbols input into the tap coefficient calculation circuit 4020E that corresponds to the newest symbol.

The angle threshold value $\alpha$ that is used in the tap coefficient determination device 4259 is (360°/m) when the modulation format used in the transmission system is m-PSK. When the modulation format is m-QAM, the angle threshold value $\alpha$ is set in accordance with how many symbol points are present on the same circumference on a constellation plane. For example, when the modulation format is 16 QAM, the angle threshold value $\alpha$ is set to 90° for symbols that are present on a circumference on the innermost side of a constellation plane and on a circumference on the outermost side of the constellation plane, and the angle threshold value $\alpha$ is set to 45° for symbols that are present on a circumference in the middle of the constellation plane.

By employing the above-described structure, in the tap coefficient calculation circuit 4020E, the input X number of symbols are duplicated and are input into two branches. In one branch, in the same way as in the distance calculation device 4242 according to the thirteenth embodiment, the Euclid distances on a complex plane are calculated for X number of input symbols. Next, the calculated Euclid distances are rearranged in ascending sequence in the sorting circuit 4253, and they are then stored in the array buffer 4254. The X number of symbols input into the other branch are rearranged so that they correspond to the Euclid distances that are stored in the array buffer 4254. After the two phase estimation angles, namely, the phase estimation angle calculated by the phase estimation device 4255 using the high-order K number of symbols, and the phase estimation angle calculated by the phase estimation device 4256 using the high-order (K+1) number of symbols have been subtracted, the absolute value of the angular difference which is the result of this subtraction is input into the tap coefficient determination device 4259. In the tap coefficient determination device 4259, if the angular difference is separated by the angle threshold value $\alpha$ or more, then 0 is output as the tap coefficient, and in all other cases, 1 is output as a tap coefficient.

Fifteenth Embodiment

Figure 32:
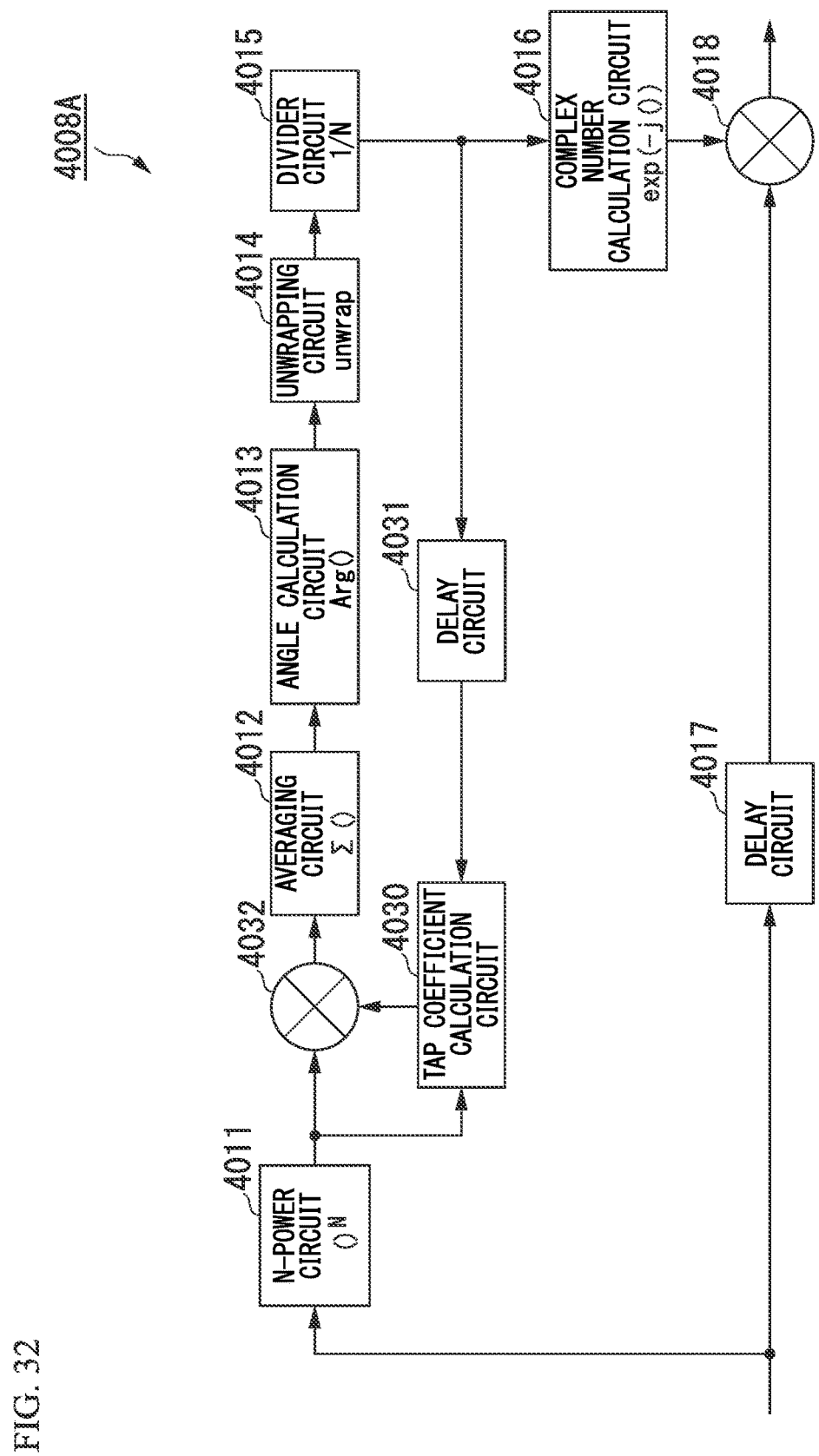
FIG. 32 is a block diagram showing the structure of a phase compensation unit according to a fifteenth embodiment of the present invention.

FIG. 32 is a block diagram showing an example of the structure of a phase compensation unit 4008A according to a fifteenth embodiment.

The phase compensation unit 4008A is used instead of the phase compensation unit 4008 in the digital signal processing unit (see FIG. 23). The phase compensation unit 4008A is provided with the N-power circuit 4011, the averaging circuit 4012, the angle calculation circuit 4013, the unwrapping circuit 4014, the divider circuit 4015, the complex number calculation circuit 4016, the delay circuit 4017, the multiplier circuit 4018, a tap coefficient calculation circuit 4030, a delay circuit 4031, and a multiplier circuit 4032. Compared with a conventional phase compensation unit, the phase compensation unit 4008A is additionally provided with the tap coefficient calculation circuit 4030, the delay circuit 4031, and the multiplier circuit 4032.

A predetermined delay is attached by the delay circuit 4031 to carrier phase estimation values that have been calculated in the divider circuit 4015, and these carrier phase estimation values are then input into the tap coefficient calculation circuit 4030. The tap coefficient calculation circuit 4030 calculates tap coefficients based on the input carrier phase estimation values. The calculation results (i.e., the symbols raised to the N-th power) from the N-power circuit 4011, and the tap coefficients calculated by the tap coefficient calculation circuit 4030 are input into the multiplier circuit 4032. The multiplier circuit 4032 multiplies the symbols that have been raised to the N-th power by the tap coefficients, and outputs the results of these multiplications to the averaging circuit 4012.

The delay amounts are set in the delay circuit 4031 such that, for example, the symbols that have been raised to the N-th power that are input into the multiplier circuit 4032 are multiplied by the tap coefficients obtained using the carrier phase estimation values that were calculated based on the X number of symbols preceding those particular symbols. Moreover, when necessary, is also possible to provide another delay circuit between the N-power circuit 4011 and the multiplier circuit 4032, and to match the timing at which the symbols that have been raised to the N-th power are input into the multiplier circuit 4032 with the timing at which the tap coefficients are input into the multiplier circuit 4032.

The phase compensation unit 4008A according to the present embodiment is a feedback type, and is provided with the tap coefficient calculation circuit 4030, the multiplier circuit 4032 that multiplies the tap coefficients with the respective symbols, and the delay circuit 4031. In the feedback type of tap coefficient calculation circuit 4030, tap coefficients are calculated based on information about the X symbol number of prior carrier phase estimation values. Because the actual X symbol number of prior carrier phase estimation values is itself used, this structure is referred to in the present embodiment as a feedback structure.

Figure 33:
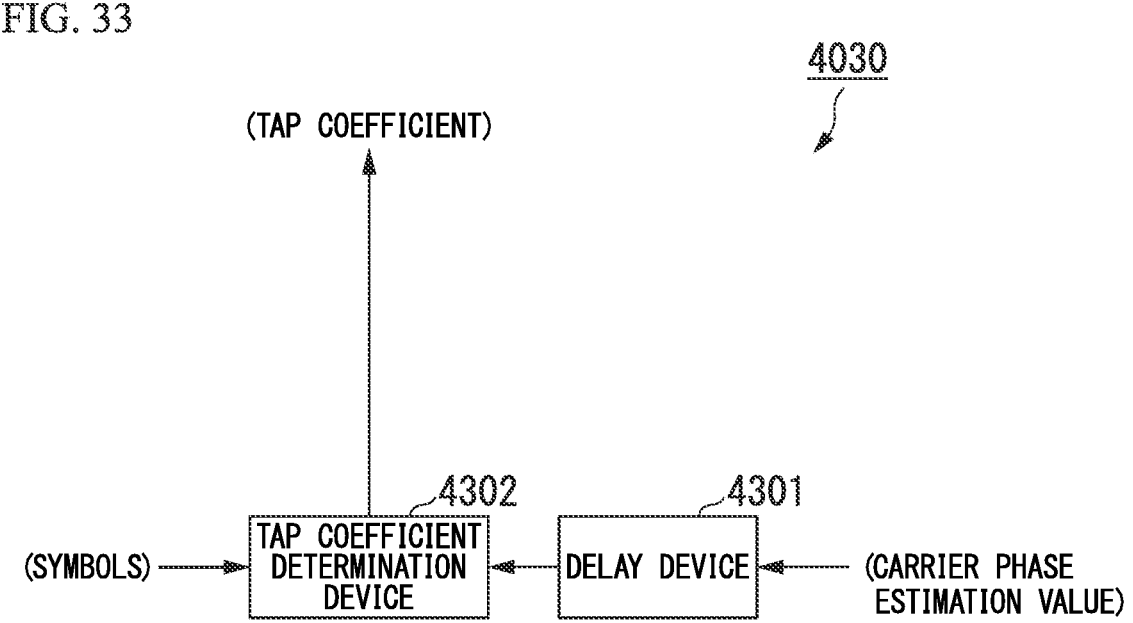
FIG. 33 is a block diagram showing the structure of a tap coefficient calculation circuit according to the fifteenth embodiment.

FIG. 33 is a block diagram showing an example of the structure of the tap coefficient calculation circuit 4030 according to the present embodiment. The tap coefficient calculation circuit 4030 has a delay device 4301, and a tap coefficient determination device 4302. Carrier phase estimation values input from the divider circuit 4015 (see FIG. 32) into the tap coefficient calculation circuit 4030 are input into the delay circuit 4301. The delay circuit 4301 attaches a delay corresponding to the amount of one symbol to the input carrier phase estimation values, and then outputs the carrier phase estimation values to the tap coefficient determination device 4302.

The symbols that have been raised to the N-th power that are input from the upper case N-power circuit 11 (see FIG. 32) into the tap coefficient calculation circuit 4030 are input into the tap coefficient calculation device 4302. The tap coefficient calculation device 4302 calculates the angle of deviation of the input symbols that have been raised to the N-th power, and compares the calculated angle of deviation with the carrier phase estimation value. The tap coefficient determination device 4302 determines whether or not the difference between the calculated angle of deviation and the carrier phase estimation value is equal to or greater than the angle threshold value α, and if this difference is equal to or greater than the angle threshold value α, it sets the tap coefficient to 0. If the difference is less than the angle threshold value α, the tap coefficient determination device 4302 sets the tap coefficient to 1. The tap coefficient determination device 4302 outputs set tap coefficients to the multiplier circuit 4032 (see FIG. 32).

By providing the above-described structure, in the tap coefficient calculation circuit 4013, input symbols are determined in the tap coefficient determination device 4302 with the carrier phase estimation value of the previous symbol used as a reference. In the tap coefficient determination device 4302, a determination is made as to whether or not the angle of deviation of an input symbol is separated from the carrier phase estimation value by the angle threshold value α or more, and if it is separated by this angle threshold value α or more, then it sets the tap coefficient to 0. If, on the other hand, it is not separated by this angle threshold value α, then it sets the tap coefficient to 1. Note that the angle threshold value α is 0° or greater and less than 360°. Note also that in the present embodiment, the tap coefficients are set with the carrier phase estimation value of the previous symbol used as a reference, however, provided that the carrier phase estimation value corresponds to a symbol within a period in which a phase relationship exists, then any carrier phase estimation value may be used as a reference.

Variant Examples of the Respective Embodiments

Figure 34:
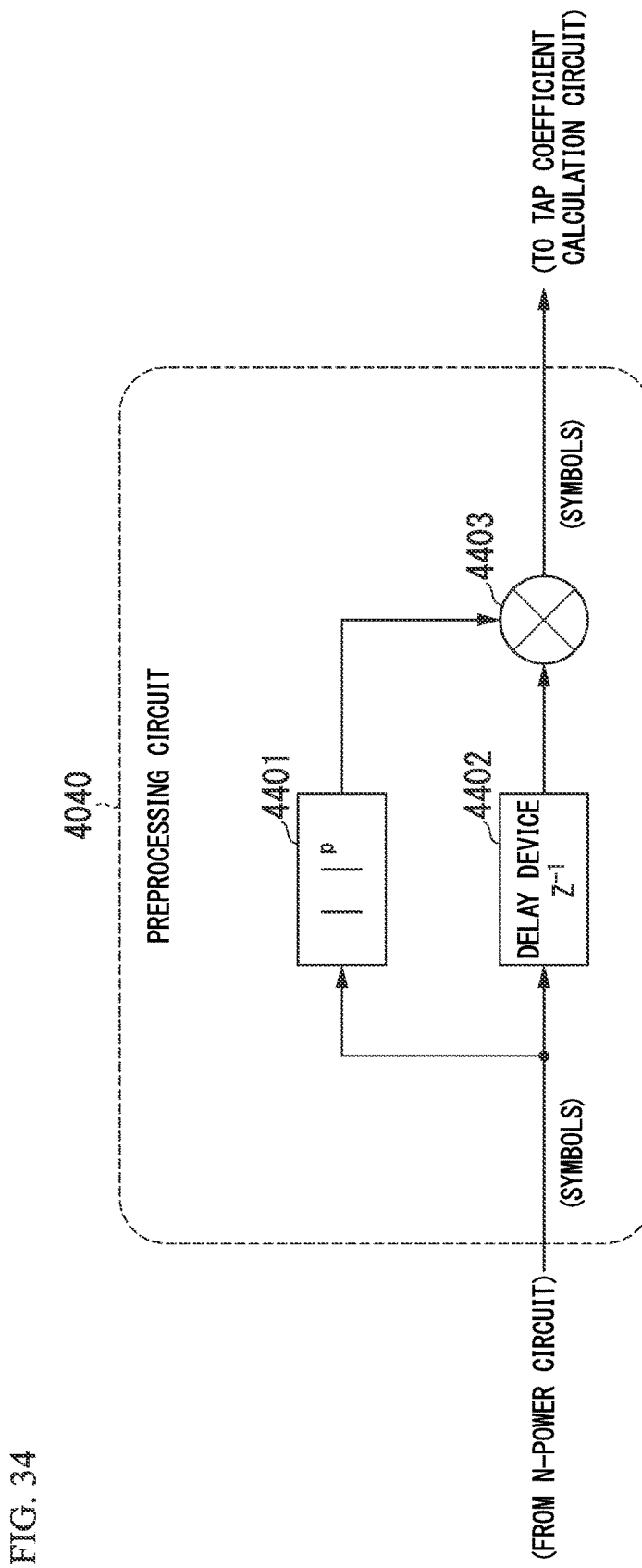
FIG. 34 is a block diagram showing the structure of a preprocessing circuit according to a variant example.

In the phase compensation units described in the ninth embodiment through the fifteenth embodiment, it is also possible for the pre-processing described below to be performed before the symbols are input into the tap coefficient calculation circuit, and for the symbols to be input into the tap coefficient calculation circuit after this pre-processing has been performed. FIG. 34 is a block diagram showing an example of the structure of a preprocessing circuit 4040 according to a variant example. The preprocessing circuit 4040 has a power device 4401, a delay device 4402, and a multiplier device 4403. Symbols input from the N-power circuit 4011 (i.e., symbols that have been raised to the N-th power) are input into the power device 4401 and the delay device 4402. The power device 4401 calculates the $p^{th}$ power of the absolute value of the input symbols, and inputs the calculation result into the multiplier device 4403 as a tap coefficient. The delay device 4402 attaches a delay corresponding to the length of time required for the calculation performed by the power device 4401 to the input symbol, and then inputs that symbol into the multiplier device 4403. The multiplier device 4403 multiplies the input symbol by the tap coefficient, and outputs the multiplication result to tap coefficient calculation circuit 4020 (or the tap coefficient calculation circuit 4030). In this case, in the tap coefficient calculation circuit 4020 (or the tap coefficient calculation circuit 4030), the tap coefficient is calculated by performing the processing described in the ninth through fifteenth embodiments on the symbols output from the preprocessing circuit 40.

Sixteenth Embodiment

Figure 35:
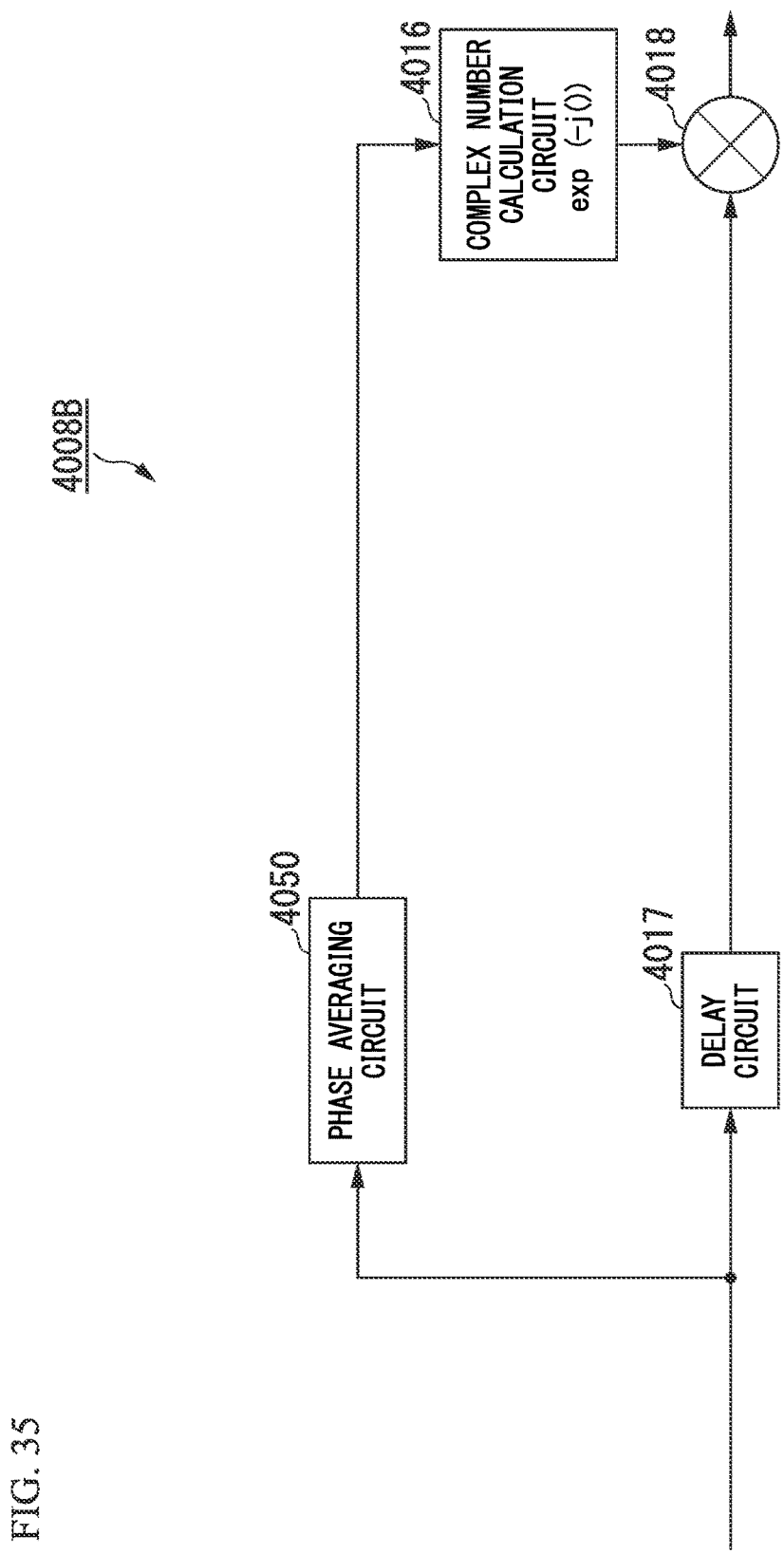
FIG. 35 is a block diagram showing the structure of a phase compensation unit according to a sixteenth embodiment of the present invention.

FIG. 35 is a block diagram showing an example of the structure of a phase compensation unit 4008B according to a sixteenth embodiment. The phase compensation unit 4008B is used instead of the phase compensation unit 4008 of the digital signal processing unit (see FIG. 23). The phase compensation unit 4008B is provided with a complex number calculation circuit 4016, a delay circuit 4017, a multiplier circuit 4018, and a phase averaging circuit 4050. Symbols that are input in sequence from the frequency offset compensation unit 4007 to the phase compensation unit 4008B are input into the delay circuit 4017 and the phase averaging circuit 4050. Based on these input symbols, the phase averaging circuit 4050 calculates an average of the phases of symbols that are included in a period during which there is a phase correlation. The phase averaging circuit 4050 calculates an average of the symbol phases using an exponential average that calculates an average by means of a coefficient that corresponds to the time when the phase correlation was decreasing.

Specifically, the phase averaging circuit 4050 uses the phase Θ(i) of the $i^{th}$ symbol, the coefficient β, and the coefficient γ to calculate the average θ(i) of the symbol phases when the $i^{th}$ symbol is input. The coefficient β is a coefficient that corresponds to a reduction in the coherence of the light source, and is an exponential average that attenuates the contribution to the phase average of past symbols. The coefficient γ is multiplied by the symbols that are greatly affected by noise and interference and the like on the transmission path, and by all other symbols. γ is set to 0≤γ<<1 for the greatly affected symbols, and is set to γ≈1 for the other symbols.

The phase averaging circuit 4050 calculates the average θ(i) of the phases of the symbols using the following Formula (5).

$$\theta(i)=\Theta(i)\times\beta\times\gamma+(1-\beta)\times\theta(i-1) \quad (5)$$

Alternatively, instead of excluding the symbols that have been greatly affected by noise and interference and the like, it is also possible to use Formula (6) and Formula (7) as an exponential average that ads together the averages of the phases at that point in time.

In the case of symbols that are greatly affected:

$$\theta(i)=\Theta(i)\times\beta+(1-\beta)\times\theta(i-1) \quad (6)$$

In the case of symbols that are less affected:

$$\theta(i)=\theta(i-1)\times\beta+(1-\beta)\times\theta(i-1) \quad (7)$$

In the phase averaging circuit 4050, by using exponential averages there is no need to hold a predetermined number (X) of past symbols, or to hold the corresponding phases thereof. As a result, the storage area can be reduced. Moreover, by switching the weighting (i.e., the coefficient γ) for the greatly affected symbols and the less affected symbols, compared with when a simple average is used, a large weighting can be attached to symbols having a large phase correlation, and a smaller weighting can be attached to symbols having a smaller phase correlation. As a result, the effect of improved estimation accuracy is obtained.

In the phase compensation units having the structures described above in the respective embodiments, a reference for the symbols is set at the same time as the effects of those symbols that have been greatly affected by noise and interference and the like from among the symbols contained in the period during which a phase correlation existed are being suppressed, and by using the set reference and the like, phases are estimated with the effects such as Gauss noise and the like having been reduced. By performing phase compensation using phases estimated in this manner, it is possible to reduce the occurrence of phase cycle slip. For example, in the estimation of phases that is based on differences between symbols contained in the period during which a phase correlation existed, because it is easy to detect outliers, by increasing the weighting coefficient for symbols that are greatly affected by noise and interference and the like, or by excluding these symbols, phases can be accurately estimated. Moreover, in the phase compensation unit, in the processing to suppress the effects of symbols (i.e., outliers) that have been greatly affected by noise and interference, because the processing is performed on the symbols contained in the period during which a phase correlation existed, it is possible to obtain a reference that includes the current symbol and also has a phase correlation, and it is possible to accurately reduce the effects of outliers.

In this manner, by performing phase compensation without using a differential coding method or a correction method based on pilot symbols, it is possible to reduce the occurrence of phase cycle slips without having to increase the bit error rate or lower the transmission efficiency.

Note that in the present embodiment, a structure is described in which the average $\theta(i)$ of the phases of the symbols is calculated using exponential averages, however, the present invention is not limited to this. For example, it is also possible for the phase averaging circuit 4050 to calculate as the average $\theta(i)$ of the phases of the symbols a moving average of measurement values during a period that corresponds to a time during which a phase correlation exists, for example, that corresponds to the coherence time.

Figure 36:
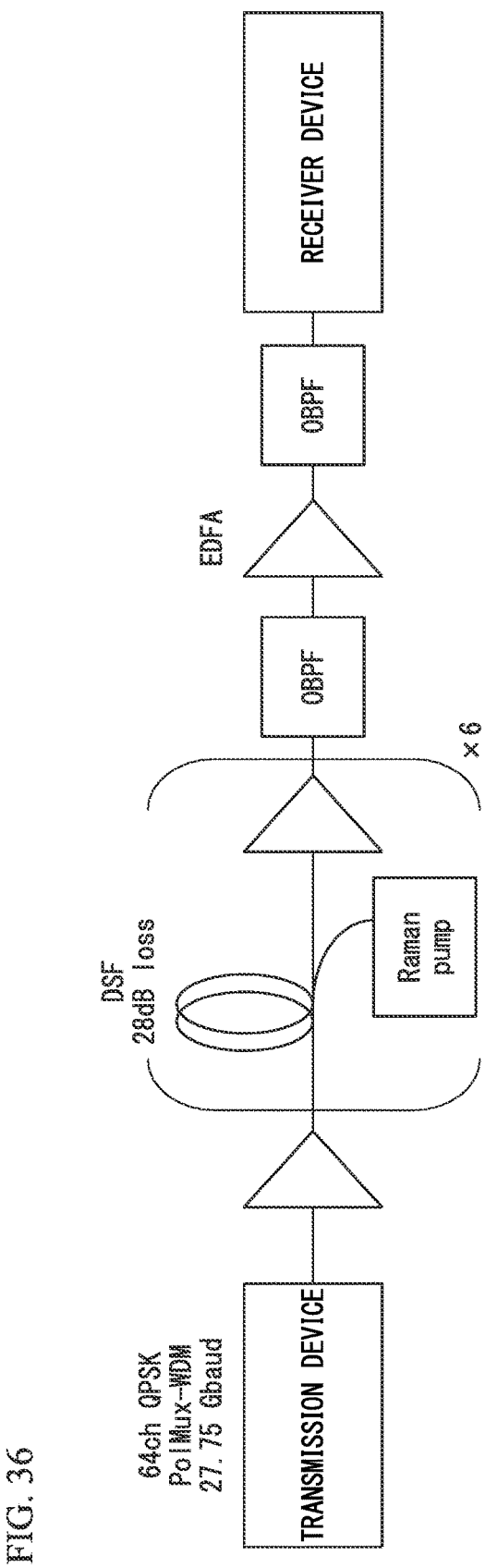
FIG. 36 is a view showing an outline of a test device used to acquire optical transmission test data.
Figure 37:
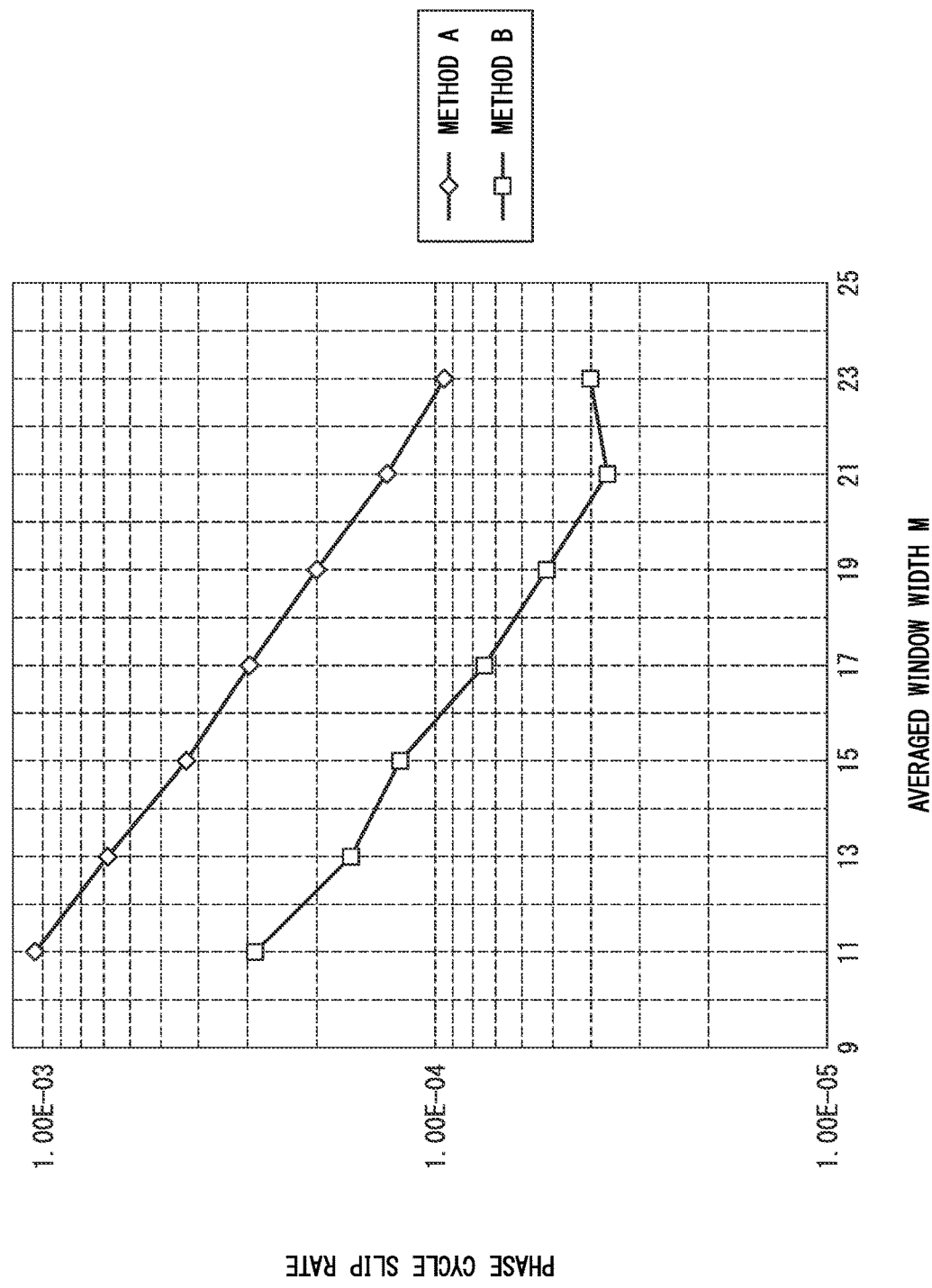
FIG. 37 is a graph showing the evaluation results of a phase cycle slip rate for the phase compensation unit according to the fifteenth embodiment.
Figure 38:
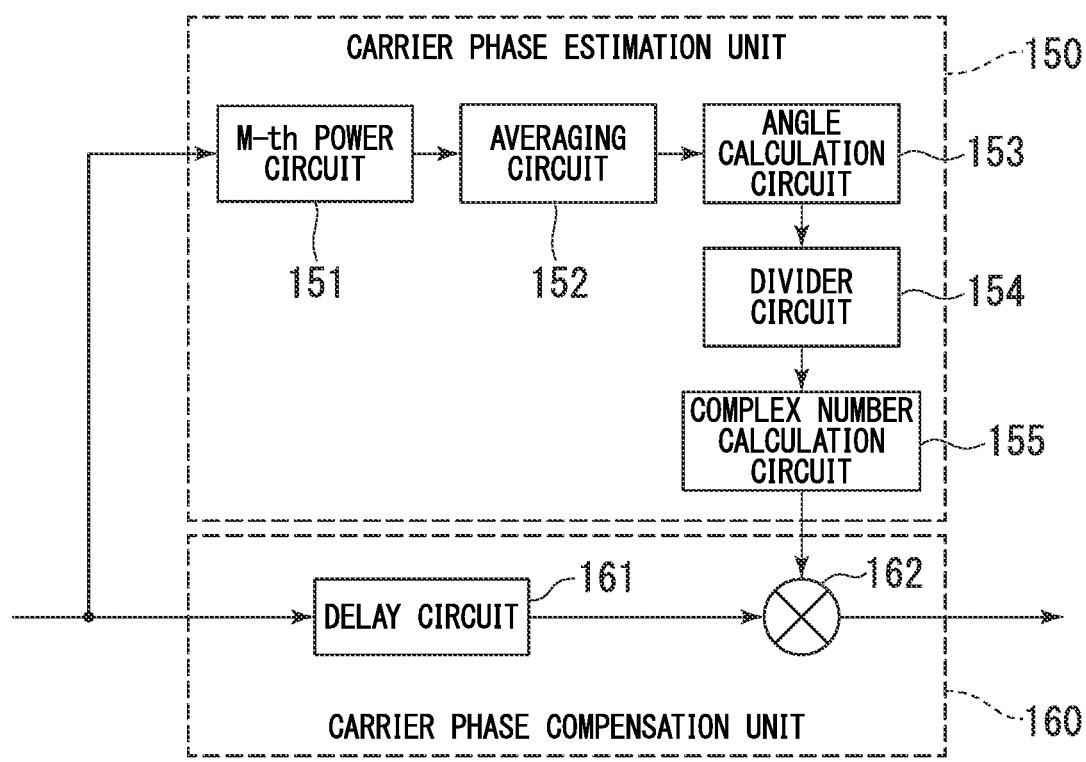
FIG. 38 is a block diagram showing a conventional carrier phase synchronization circuit.

In order to verify the effects of the phase compensation units according to the above-described embodiments, using a computer that is able to perform the functions of a digital signal processing unit, offline modulation of the optical transmission test data was performed, and the phase cycle slip rate was evaluated. FIG. 36 is a view showing an outline of a test device used to acquire this optical transmission data. FIG. 37 is a graph showing the evaluation results for a phase cycle slip rate that corresponds to the phase compensation unit 4008A according to the fifteenth embodiment.

The vertical axis in FIG. 37 shows the phase cycle slip rate, while the horizontal axis shows the average window width M. The graph indicated by Method A in FIG. 37 gives results that are shown as a comparative example, and are the results from a computer simulation that uses a conventional phase compensation unit. The graph indicated by Method B gives the results from a computer simulation that uses the phase compensation unit 4008A according to the fifteenth embodiment. Here, the threshold angle value $\alpha$ is ±45°. As is shown in FIG. 37, it was found that by applying the phase compensation unit according to the present embodiment, it is possible to reduce the frequency of phase cycle slip occurrence to approximately $\frac{1}{3}^{rd}$.

Note that in the ninth through sixteenth embodiments, a structure is described in which the tap coefficient is calculated without using a known signal such as a pilot symbol or the like, however, it is also possible to use this method in combination with a compensation method in which the estimation is performed using a pilot symbol or the like. For example, it is also possible to use phases estimated using pilot symbols in order to calculate the tap coefficient. At this time, because the accuracy of estimation results obtained using the pilot symbols is higher than the accuracy of estimations made using the Viterbi-Viterbi algorithm in which the estimation involves raising the symbols to the N-th power, it is possible to attach likelihood information or the like as a weighting to these estimation results and to then find the average thereof. Moreover, in each of the above-described embodiments a structure is described in which quadri-phase (QPSK) modulation is used as an example of the modulation format, however, the present invention is not limited to QPSK, and it is also possible to use phase modulation such as BPSK or 8 PSK, or to use amplitude phase modulation such as 8 QAM or 16 QAM. In this case, N (i.e., the power) in the N-power circuit 4011 and the angle threshold value $\alpha$ are set in accordance with the modulation format that is used.

Moreover, in each of the embodiments, a structure is described in which phase components are extracted using the N-power circuit 4011 with data phase modulation components being excluded, however, it is also possible to extract phase components using methods other than this, for example, by using a maximum likelihood determination method or the like.

Moreover, in each of the above-described embodiments, the determination as to whether or not an angular difference is separated by the angle threshold value $\alpha$ or more is used for the determination when setting the tap coefficient, however, the present invention is not limited to this. For example, it is also possible to decide whether or not the amount of offset from a reference angle of the phases of the symbols when the data phase modulation components have been excluded therefrom is equal to or greater than the phase noise of either one of the signal light in the transmission device, or the local oscillation light in the receiver device, or is equal to or greater than the sum of both of these phase noises, and to use this for the determination.

Moreover, in each of the above-described embodiments, a structure is described in which a coefficient of 0 or of less than 1 is multiplied by and added to the phase of the symbols that are greatly affected by noise or interference, namely, by the phases of symbols having a large Euclid distance, however, the present invention is not limited to this. For example, instead of the phases of symbols having a large Euclid distance, it is also possible to add a reference angle. By doing this, the effect is obtained that it is possible to solve the problem of a phase that is smaller than the original proper phase being added so that the calculated reference phase is smaller than the ideal value.

Moreover, in each of the above-described embodiments, a structure is described in which a digital signal processing unit is provided in the receiver device, however, it is also possible for the respective functional units provided in the receiver device to be formed by a plurality of devices, and for each of these devices to be connected via a network such that they are able to communicate with each other. In the same way, it is also possible for the respective functional units of the digital signal processing unit to be formed by a plurality of devices.

Moreover, it is also possible to match the values of the periods during which a phase correlation exists (i.e., of the X symbols) in each of the embodiments with the values of the average window widths M.

Moreover, it is also possible to record a program that is used to achieve the functions of the digital signal processing unit shown in FIG. 23 on a computer-readable recording medium, and to perform the processing by the digital signal processing unit, for example, the processing performed by the phase compensation unit to reduce phase cycle slips by means of phase compensation by causing a computer system to read and execute the program recorded on this recording medium. Note that the term 'computer system' used here includes both OS and hardware such as peripheral devices and the like. Moreover, the term 'computer system' may also include a WWW system which is provided with a homepage providing environment (or display environment). Moreover, the term 'computer readable recording medium' also refers to portable media such as flexible disks, magneto-optical disks, ROM, and CD-ROM and the like, and storage devices such as hard disks that are built into a computer system. Furthermore, the term 'computer readable recording medium' also includes devices that hold a program for a fixed time such as the internal volatile memory (RAM) in a computer system which forms the server or client when the program is transmitted via a network such as the Internet or via a communication line such as a telephone line.

Moreover, the aforementioned program may also be transmitted from a computer system in which the program is stored on a storage device or the like to another computer system via a transmission medium, or via a transmission wave within the transmission medium. Here, the term 'transmission medium' which transmits the program refers to a medium having a function of transmitting information such as a network such as the Internet or a communication line such as a telephone line. Moreover, the above described program may also be designed to fulfill a portion of the above described functions. Furthermore, the aforementioned program may also achieve the above described functions in combination with a program which is already recorded on the computer system, namely, may be what is known as a differential file (i.e., a differential program).

INDUSTRIAL APPLICABILITY

The present invention is able to reduce the effects caused by the occurrence of phase cycle slope in long-distance and high-volume optical communication.

Namely, the present invention can be applied to high-volume and long-distance optical transmissions in which the transmission distance is between approximately 100 kilometers and 1000 kilometers, and the transmission volume per channel is between 40 GB/s and 400 GB/s.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

DESCRIPTION OF REFERENCE SYMBOLS

1 . . . Carrier phase estimation unit
2 . . . Carrier phase compensation unit
3 . . . Delay difference unit
4 . . . Slip determination unit
5 . . . Slip compensation unit
11 . . . Optical signal transmission device
12 . . . Transmission path
13 . . . Optical signal receiver device
14 . . . Local oscillator laser emitter
15 . . . 90° optical hybrid
16 . . . Photoelectric converter
17 . . . Analog/digital converter
18 . . . Digital signal processing unit
19 . . . Wavelength dispersion compensation circuit
20 . . . Adaptive equalization circuit
21 . . . Frequency offset compensation circuit
22 . . . Phase compensation circuit
23 . . . Demodulation decoding circuit
24 . . . Client interface
220, 320, 420, 520 . . . Phase compensation block
221 . . . Carrier phase estimation circuit
222 . . . Carrier phase compensation circuit
223 . . . Delay circuit
224 . . . Low-pass filter
225, 225-1, 225-2, 225-3 . . . Delay difference circuit
226, 326, 426 . . . Slip determination circuit
227 . . . Slip compensation circuit
328 . . . Threshold value calculation circuit
527 . . . Slip transient compensation circuit
528 . . . Slope calculation circuit
2211 . . . Phase-m multiplier circuit
2212 . . . K symbol averaging circuit
2213 . . . Phase extraction circuit
2214 . . . Phase continuity circuit
2251 . . . N symbol delay device
2252, 3281, 3283 . . . Multiplier device
2253, 3282, 3285 . . . Adding device
3284 . . . Delay device
3286 . . . Subtraction device
22111 . . . Amplitude/phase separation circuit
22112 . . . Multiplier device
22113 . . . Amplitude/phase recombination circuit
4001 . . . Local oscillator laser emitter
4002 . . . Optical 90° hybrid
4003 . . . Photoelectric conversion unit
4004 . . . A/D converter
4005 . . . Wavelength dispersion compensation unit
4006 . . . Adaptive equalization unit
4007 . . . Frequency offset compensation unit
4008, 4008A, 4008B . . . Phase compensation unit
4009 . . . Error correction/determination unit
4010 . . . Client interface
4011 . . . N-power circuit
4012 . . . Averaging circuit
4013 . . . Angle calculation circuit
4014 . . . Unwrapping circuit
4015 . . . Divider circuit
4016 . . . Complex number calculation circuit
4017, 4021, 4031 . . . Delay circuit
4018, 4022, 4032 . . . Multiplier circuit
4020, 4020A, 4020B, 4020C, 4020D, 4020E, 4030 . . . Tap coefficient calculation circuit
4040 . . . Preprocessing circuit
4050 . . . Phase averaging circuit

The invention claimed is:
1. An optical receiving device that receives an optical signal that has been modulated by means of phase modulation or quadrature amplitude modulation, converts the received optical signal into an electrical signal using coherent detection, and performs phase compensation on the converted received signal, comprising:

a carrier phase estimation unit configured to estimate carrier phase errors in a received symbol string obtained from the received signal;

a gain adjustment unit configured to perform gain adjustment on symbols input into the carrier phase adjustment unit;

a phase cycle slip reduction unit configured to detect general noise that causes a phase cycle slip, and reduces the phase cycle slip; and a phase compensation circuit configured to compensate carrier phase errors contained in the received signal using an output from the carrier phase estimation unit wherein the phase cycle slip reduction unit includes:

a delay difference value calculation circuit configured to receive a signal output from the carrier phase estimation unit, and configured to calculate a delay difference value; and a slip determination unit configured to evaluate an output from the delay difference value calculation circuit and then determines whether or not a phase cycle slip exists, and the phase compensation circuit includes:

a circuit into which an output from the carrier phase estimation unit is supplied and so as to perform phase compensation; and a slip compensation unit configured to receive a determination signal showing that general noise has been detected so as to compensate a phase cycle slip.

2. The optical receiving device according to claim 1, wherein the gain adjustment unit includes:

an amplitude/phase separation unit configured to separate the amplitude and phase of each symbol in the symbol string that are expressed respectively as complex numbers;

an amplitude gain adjustment unit configured to perform operations on amplitude values separated by the amplitude/phase adjustment unit;

a phase gain adjustment unit configured to perform operations on phase values separated by the amplitude/phase adjustment unit; and an amplitude/phase recombination unit configured to recombine the amplitude values and phase values whose gains have been adjusted by the amplitude gain adjustment unit and the phase gain adjustment unit into complex numbers again.

3. The optical receiving device according to claim 2, wherein the phase cycle slip reduction unit includes: a symbol evaluation circuit configured to receive output symbol phase from a power unit and a multiplier unit that are contained in the gain adjustment unit, and a provisional phase estimation value that forms a reference and is calculated from an output from a finite impulse filter, and configured to specify the symbols with the largest noise by comparing them; and a tap coefficient setting circuit configured to decrease the weighting of taps that correspond to the symbols having the largest noise from among the taps of the finite impulse response filter, output from the phase estimation unit being supplied to the phase compensation circuit after the effects of the symbols containing the largest noise have been reduced by the tap coefficient setting circuit, so that the carrier phase errors in the received symbol string are compensated.

4. The optical receiving device according to claim 2, wherein the phase cycle slip reduction unit has: a symbol evaluation circuit configured to receive output symbol phase from a power unit and a multiplier unit that are contained in the gain adjustment unit, and a reference phase that is input from a feedback structure, and configured to specify the symbols with the largest noise by comparing them; and a tap coefficient setting circuit configured to decrease the weighting of taps that correspond to the symbols having the largest noise from among the taps of the finite impulse response filter, output from the phase estimation unit being supplied to the phase compensation circuit after the effects of the symbols containing the largest noise have been reduced by the tap coefficient setting circuit, so that the carrier phase errors in the received symbol string are compensated.

5. The optical receiving device according to claim 1, wherein the phase cycle slip reduction unit includes:

a symbol evaluation circuit configured to receive output symbol phase from a power unit and a multiplier unit that are included in the gain adjustment unit, and a provisional phase estimation value that forms a reference and is calculated from an output from a finite impulse filter, and configured to specify the symbols with the largest noise by comparing them; and a tap coefficient setting circuit configured to decrease the weighting of taps that correspond to the symbol having the largest noise from among the taps of the finite impulse response filter, output from the phase estimation unit being supplied to the phase compensation circuit after the effects of the symbols containing the largest noise have been reduced by the tap coefficient setting circuit, so that the carrier phase errors in the received symbol string are compensated.

6. The optical receiving device according to claim 1, wherein the phase cycle slip reduction unit includes:

a symbol evaluation circuit configured to receive output symbol phase from a power unit and a multiplier unit that are included in the gain adjustment unit, and a reference phase that is input from a feedback structure, and that specifies the symbols with the largest noise by comparing them; and a tap coefficient setting circuit configured to decrease the weighting of taps that correspond to the symbol having the largest noise from among the taps of the finite impulse response filter, output from the phase estimation unit being supplied to the phase compensation circuit after the effects of the symbols containing the largest noise have been reduced by the tap coefficient setting circuit, so that the carrier phase errors in the received symbol string are compensated.

7. The optical receiving device according to claim 1, wherein the slip determination unit determines that a positive rotation phase cycle slip has occurred when the delay difference value calculated by the delay difference circuit exceeds an upper-side detection threshold value, and determines that a negative rotation phase cycle slip has occurred when the delay difference value is below a lower-side detection threshold value that is less than the upper-side detection threshold value.

8. The optical receiving device according to claim 7, wherein the delay value of the delay difference value calculation circuit is within a range of between twice and four times the tap length of the finite impulse filter.

9. The optical receiving device according to claim 8, further including a threshold value calculation unit configured to calculate, based on the delay difference values calculated by the delay difference unit, the upper-side detection threshold value and the lower-side detection threshold value.

10. The optical receiving device according to claim 9, wherein the threshold calculation unit includes a finite impulse response filter that receives inputs of the delay difference values, and that, using a previously set forgetting coefficient, takes a weighted average of past delay difference values and then outputs them, and by either adding or subtracting a previously set constant to the output from the finite impulse response filter, calculates the upper-side detection threshold value and the lower-side detection threshold value.

11. A phase cycle slip reduction method in which, when an optical signal that has been modulated by means of phase modulation or quadrature amplitude modulation is received, and the received optical signal is converted into an electrical signal using coherent detection, and phase compensation is performed on a received signal obtained by converting the electrical signal into a digital signal, comprising:

performing mutually independent operations for amplitude and phase on a received symbol string that has been obtained from the received signal to improve the accuracy of carrier phase error estimation, and performing statistical processing on the estimation phase of each symbol to detect the general noise that is the cause of phase cycle slip;

a carrier phase estimation step in which carrier phase errors in a received symbol are estimated;

a carrier phase compensation step in which, based on the carrier phase errors estimated in the carrier phase estimation step, a phase of the received signal is compensated and the signal is then output;

a delay difference step in which, based on an amount of change in the carrier phase errors estimated in the carrier phase estimation step, a delay difference value is calculated;

a slip determination step in which, based on the delay difference value calculated in the delay difference step, a determination is made as to whether or not a phase cycle slip has occurred;

a first slip compensation step in which phase compensation is performed on the signal output in the carrier phase compensation step; and a second slip compensation step in which, if it is determined in the slip determination step that a phase cycled slip has occurred, the amount of phase compensation that is used when the compensation is performed and that is set in accordance with the modulation format used for the received signal is altered.

12. The phase cycle slip reduction method according to claim 11, wherein, among the symbol strings obtained from the received signal, those symbols included in a period when a phase correlation existed are targeted, and the phases of these symbols are estimated with the effects of outliers that were affected by the transmission being suppressed, and phase compensation is performed on the symbols using these estimated phases.

13. The phase cycle slip reduction method according to claim 11, wherein amplitude values and phase values are separated in the symbol strings obtained from the received signal, and by performing gain adjustment on each of these, the phases of the symbols are estimated, and using these estimated phases, phase compensation is performed on the symbols.

14. An optical receiving device that receives an optical signal that has been modulated by means of phase modulation or quadrature amplitude modulation, converts the received optical signal into an electrical signal using coherent detection, and performs phase compensation on the converted received signal, comprising:

a carrier phase estimation unit configured to estimate carrier phase errors in a received symbol string obtained from the received signal;

a gain adjustment unit configured to perform gain adjustment on symbols input into the carrier phase adjustment unit, the gain adjustment unit including an amplitude/phase separation unit configured to separate an amplitude and a phase of each symbol of the symbol string that are expressed respectively as complex numbers, an amplitude gain adjustment unit configured to perform operations on amplitude values separated by the amplitude/phase separation unit, a phase gain adjustment unit configured to perform operations on phase values separated by the amplitude/phase separation unit, and an amplitude/phase recombination unit configured to recombine the amplitude values and phase values whose gains have been adjusted by the amplitude gain adjustment unit and the phase gain adjustment unit into complex numbers again;

a phase cycle slip reduction unit configured to detect, by performing statistical processing on an output from the carrier phase estimation unit, general noise that causes a phase cycle slip, and reduces the phase cycle slip; and a phase compensation circuit configured to compensate carrier phase errors contained in the received signal using an output from the carrier phase estimation unit, wherein the phase cycle slip reduction unit includes: a delay difference value calculation circuit configured to receive a signal output from the phase estimation unit, and configured to calculate a delay difference value; a slip determination unit configured to evaluate an output from the delay difference value calculation circuit so as to determine whether or not a phase cycle slip exists; a symbol evaluation circuit configured to receive output symbol phase from a power unit and a multiplier unit that are included in the gain adjustment unit, and a provisional phase estimation value that forms a reference and is calculated from an output from a finite impulse filter, and configured to specify the symbols with the largest noise by comparing them; and a tap coefficient setting circuit configured to decrease the weighting of taps that correspond to the symbols having the largest noise from among the taps of the finite impulse response filter, output from the phase estimation unit being supplied to the phase compensation circuit after the effects of the symbols containing the largest noise have been reduced by the tap coefficient setting circuit, so that the carrier phase errors in the received symbol string are compensated, and wherein the phase compensation circuit includes: a circuit into which an output from the carrier phase estimation unit is input and configured to perform phase compensation; and a slip compensation unit into which a determination signal showing that general noise has been detected is input, and configured to compensate a phase cycle slip.

15. An optical receiving device that receives an optical signal that has been modulated by means of phase modulation or quadrature amplitude modulation, converts the received optical signal into an electrical signal using coherent detection, and performs phase compensation on the converted received signal, comprising:

a carrier phase estimation unit configured to estimate carrier phase errors in a received symbol string obtained from the received signal;

a gain adjustment unit configured to perform gain adjustment on symbols input into the carrier phase adjustment unit, the gain adjustment unit including: an amplitude/phase separation unit configured to separate an amplitude and a phase of each symbol of the symbol string that are expressed respectively as complex numbers; an amplitude gain adjustment unit configured to perform operations on amplitude values separated by the amplitude/phase separation unit; a phase gain adjustment unit configured to perform operations on phase values separated by the amplitude/phase separation unit; and an amplitude/phase recombination unit configured to recombine the amplitude values and phase values whose gains have been adjusted by the amplitude gain adjustment unit and the phase gain adjustment unit into complex numbers again;

a phase cycle slip reduction unit configured to detect, by performing statistical processing on an output from the carrier phase estimation unit, general noise that causes a phase cycle slip, and reduces the phase cycle slip; and a phase compensation circuit configured to compensate carrier phase errors contained in the received signal using an output from the carrier phase estimation unit, wherein the phase cycle slip reduction unit includes: a delay difference value calculation circuit configured to receive an input of a signal output from the phase estimation unit, and that calculates a delay difference value; a slip determination unit configured to evaluate an output from the delay difference value calculation circuit and then determines whether or not a phase cycle slip exists; a symbol evaluation circuit configured to receive inputs of output symbol phases from a power unit and a multiplier unit that are contained in the gain adjustment unit, and of a reference phase that is input from a feedback structure, and that specifies the symbols with the largest noise by comparing these two together; and a tap coefficient setting circuit configured to decrease the weighting of taps that correspond to the symbols having the largest noise from among the taps of the finite impulse response filter, output from the phase estimation unit being supplied to the phase compensation circuit after the effects of the symbols containing the largest noise have been reduced by the tap coefficient setting circuit, so that the carrier phase errors in the received symbol string are compensated, and wherein the phase compensation circuit includes: a circuit into which an output from the carrier phase estimation unit is input and configured to perform phase compensation; and a slip compensation unit into which a determination signal showing that general noise has been detected is input, and configured to compensate a phase cycle slip.

* * * * *